(12) United States Patent
Ishiguro

(10) Patent No.: US 7,085,648 B2
(45) Date of Patent: Aug. 1, 2006

(54) INFORMATION DELIVERING SERVER AND CLIENTS AND METHOD THEREOF AND STORING MEDIUM STORED PROGRAMS TO EXECUTE INFORMATION DELIVERY

(75) Inventor: Yoshihide Ishiguro, Tokyo (JP)

(73) Assignee: NEC Corporation, Tokyo (JP)

( * ) Notice: Subject to any disclaimer, the term of this patent is extended or adjusted under 35 U.S.C. 154(b) by 1153 days.

(21) Appl. No.: 09/987,919

(22) Filed: Nov. 16, 2001

(65) Prior Publication Data

US 2002/0062360 A1     May 23, 2002

(30) Foreign Application Priority Data

Nov. 17, 2000    (JP)    ............................. 2000-351500

(51) Int. Cl.
     *G01C 21/30*      (2006.01)

(52) U.S. Cl. ....................... 701/208; 701/201; 701/207; 709/203; 340/995.12

(58) Field of Classification Search ........ 701/200–213; 709/203; 340/995.1, 995.12–995.19, 995.2
See application file for complete search history.

(56) References Cited

U.S. PATENT DOCUMENTS

| | | | | |
|---|---|---|---|---|
| 6,434,482 | B1 * | 8/2002 | Oshida et al. | 701/209 |
| 6,542,814 | B1 * | 4/2003 | Polidi et al. | 701/208 |
| 6,937,934 | B1 * | 8/2005 | Kuroda et al. | 701/202 |
| 6,947,837 | B1 * | 9/2005 | Fukushima et al. | 701/209 |
| 6,950,743 | B1 * | 9/2005 | Kainuma et al. | 701/208 |
| 6,993,421 | B1 * | 1/2006 | Pillar et al. | 701/33 |
| 6,995,675 | B1 * | 2/2006 | Curkendall et al. | 340/573.3 |

FOREIGN PATENT DOCUMENTS

| | | |
|---|---|---|
| JP | 8-16930 | 2/1996 |
| JP | 2576483 | 3/1998 |
| JP | 11-72347 | 3/1999 |

\* cited by examiner

*Primary Examiner*—Richard M. Camby
(74) *Attorney, Agent, or Firm*—Foley & Lardner LLP

(57) ABSTRACT

An information delivery server and clients, which can deliver geographic information to a user based on a reaching possibility such as a physical distance or time from a place such as a location of the user or a place where the user had an interest, is provided. A user inputs his/her interested place information and a range condition at a place condition inputting means. A user managing means manages user IDs and identifies a user and attaches the user ID of the user to the inputted information, and stores them in a user interested place database. A map information retrieving means retrieves a map database under the conditions of the interested place information and the range condition storing in the user interested place database, and obtains information such as a list of building names, and place names, and so on within the range from the map database. A document database retrieving means retrieves a document database by making the obtained building names and place names as keywords, and obtains a document to be delivered to the user. And the obtained document is delivered to the user from a document informing means.

58 Claims, 25 Drawing Sheets

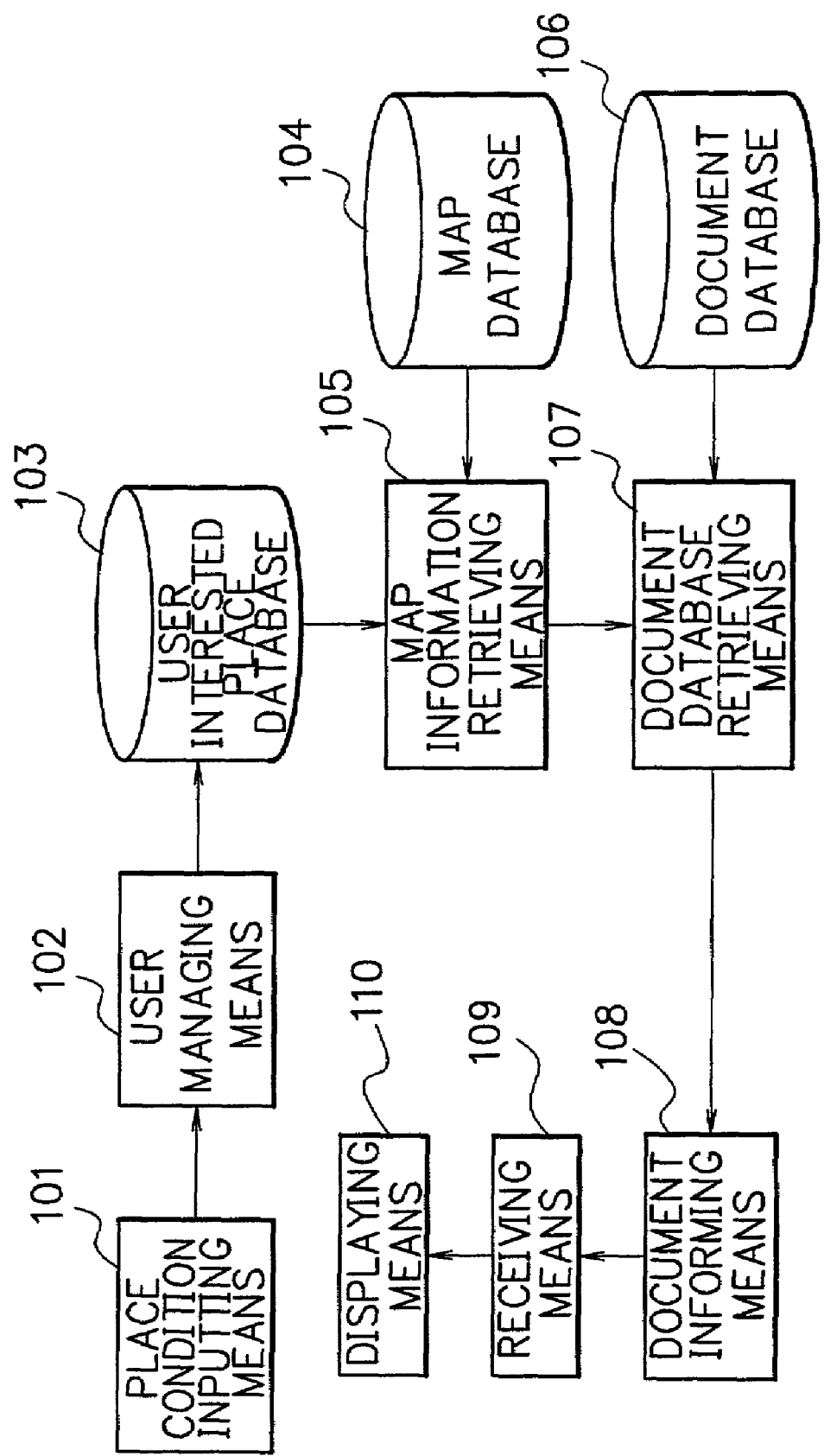

FIG. 2

((USER ID "1234")
(PLACE NAME "7-1, SHIBA 5-CHOME, MINATO-KU, TOKYO")
(LATITUDE & LONGITUDE " ")
(RANGE CONDITION "WITHIN A RADIUS OF 500m"))

FIG. 3

| RANGE CONDITION TYPE | RANG CONDITION EXPRESSION | PLACE EXPRESSION |
|---|---|---|
| DISTANCE IN A STRAIGHT LINE | WITHIN A RADIUS OF $X m | POINT |
| ROUTE | DESIGNATING ROUTE | LIST |
| REACHING POSSIBILITY | WITHIN $X MINUTES ON FOOT | POINT |
| REACHING POSSIBILITY | WITHIN $X YEN OF A FARE | POINT |
| REACHING POSSIBILITY | WITHIN $X REQUIRING MINUTES | POINT |
| -------- | -------- | -------- |

FIG. 6
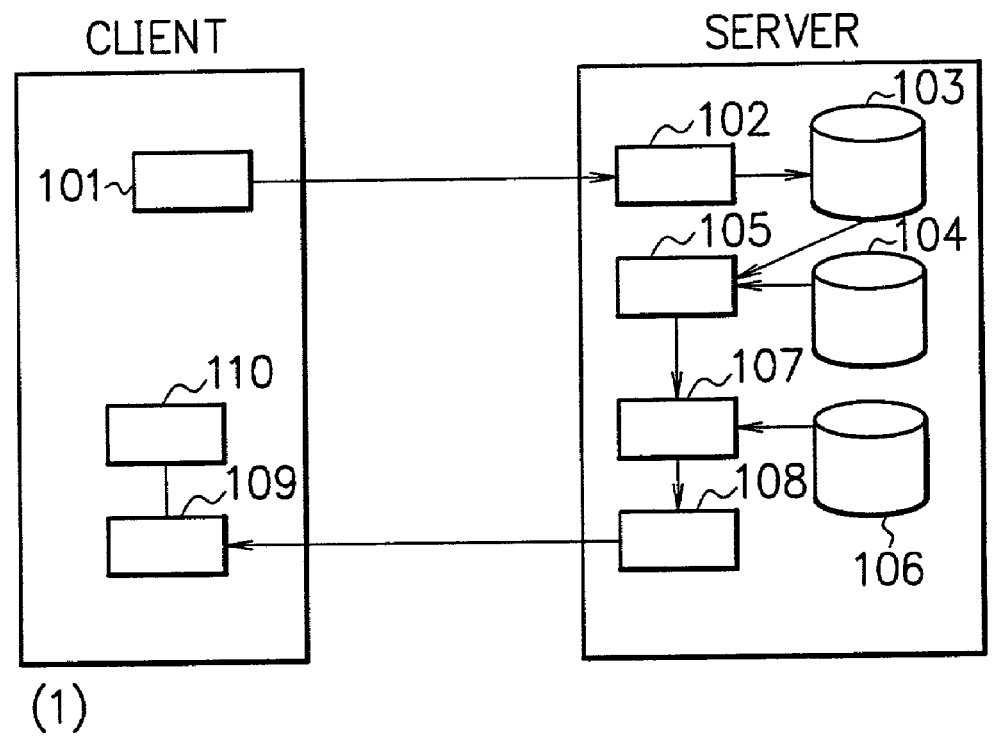
(1)
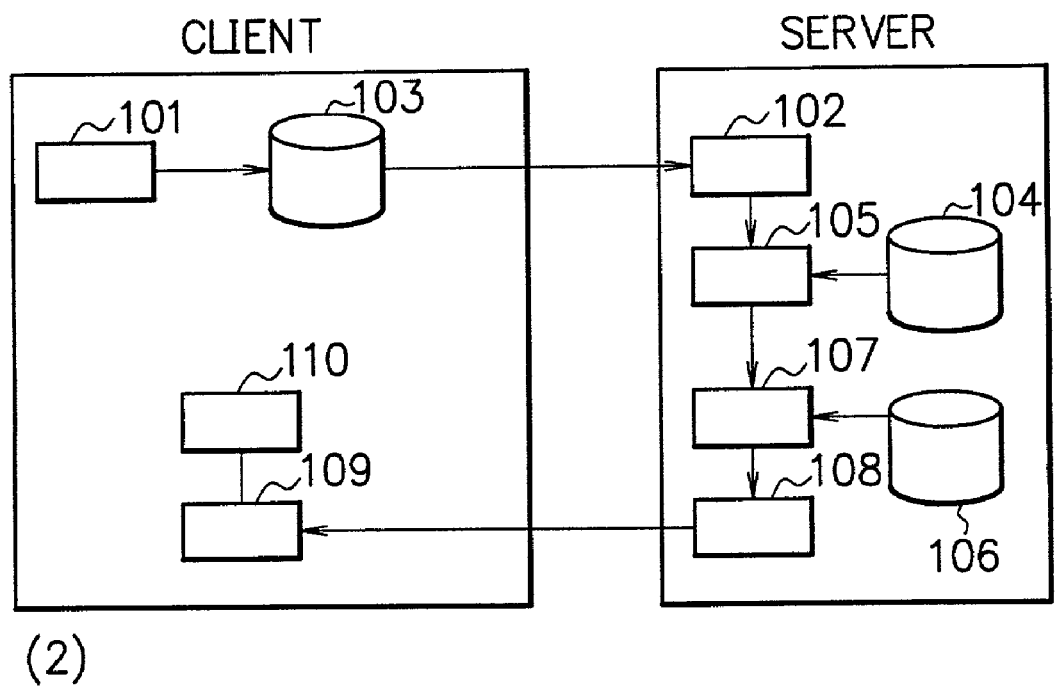
(2)

F I G. 8

| USER ID | RANGE CONDITION TYPE | PLACE NAME | LATITUDE & LONGITUDE | RANGE CONDITION |
|---|---|---|---|---|
| 5678 | DISTANCE IN A STRAIGHT LINE | 2-3, Z CHO 1-CHOME, Y CITY, X PREFECTURE | | WITHIN A RADIUS OF 500m |
| 5678 | ROUTE | 2-3, Z CHO 1-CHOME, Y CITY, X PREFECTURE TO 6-7, Z CHO 5-CHOME, Y CITY, X PREFECTURE | | DESIGNATING ROUTE |
| 5678 | REACHING POSSIBLITY | 2-3, Z CHO 1-CHOME, Y CITY, X PREFECTURE | | WITHIN 15 MINUTES ON FOOT |

FIG. 13
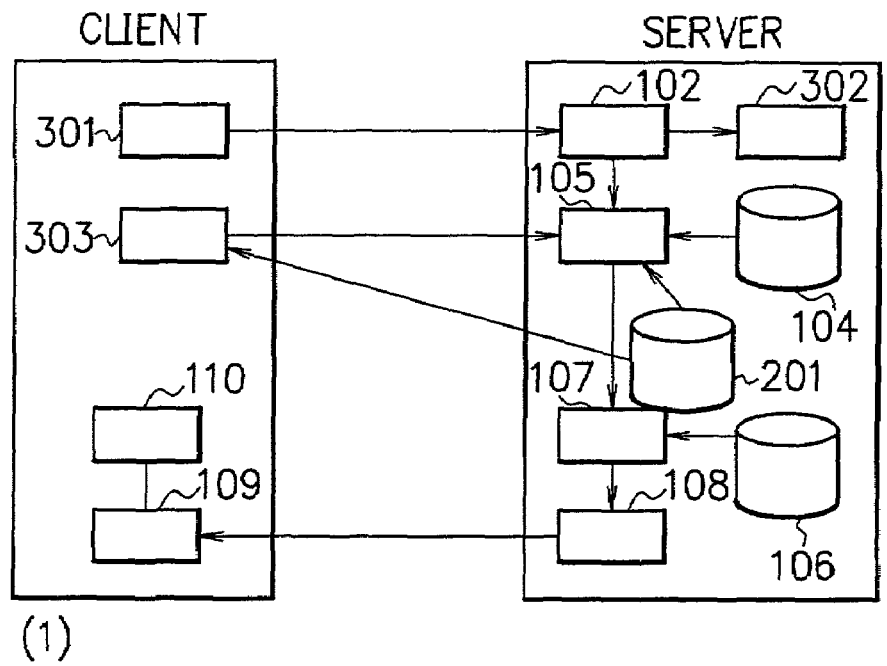
(1)
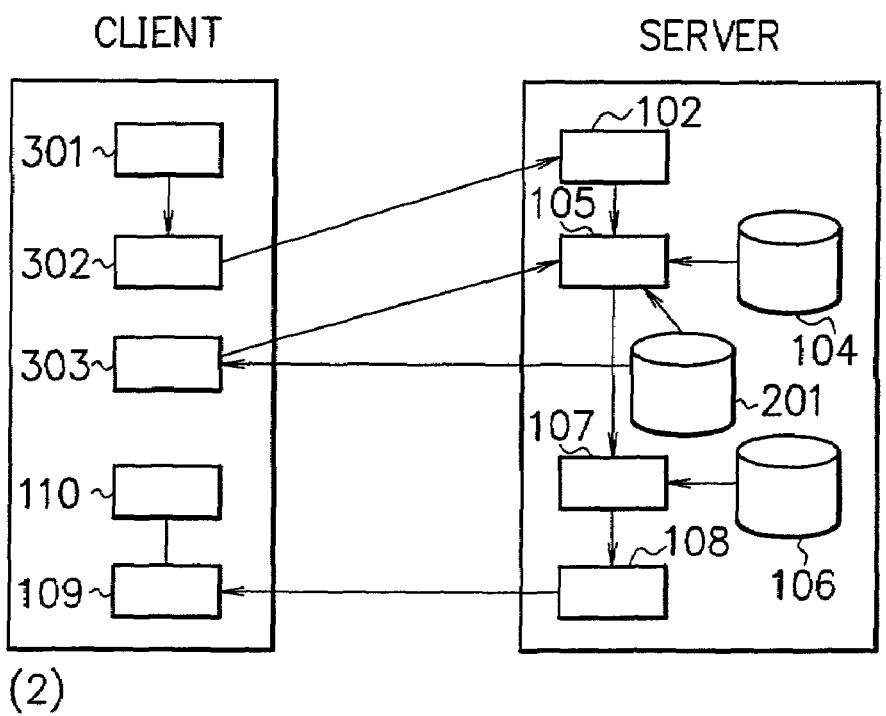
(2)

FIG. 14
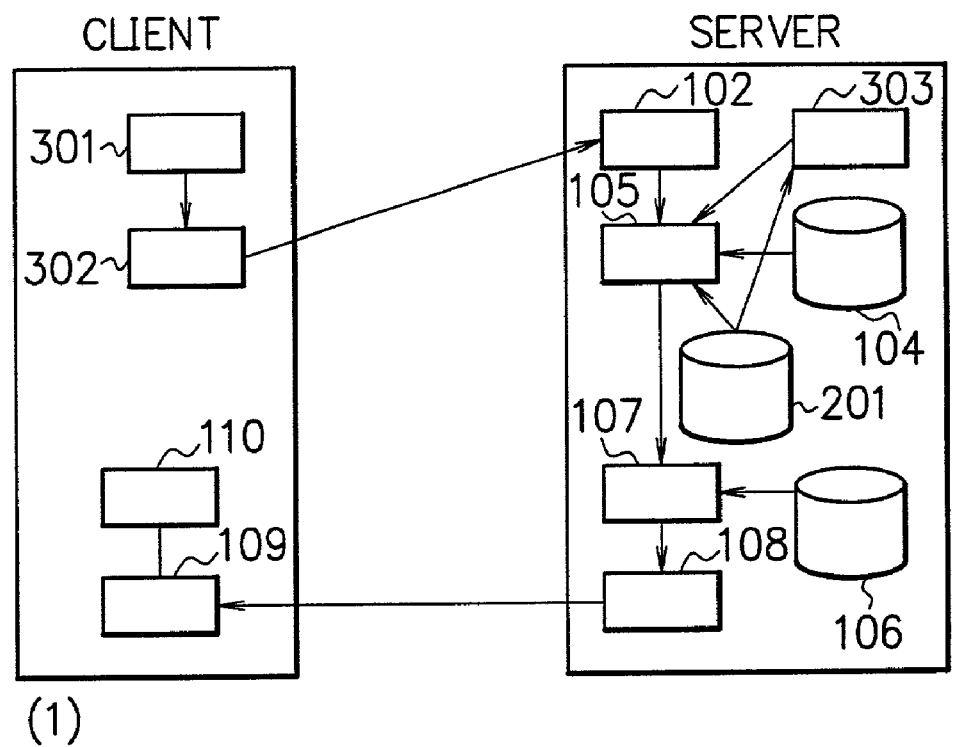
(1)
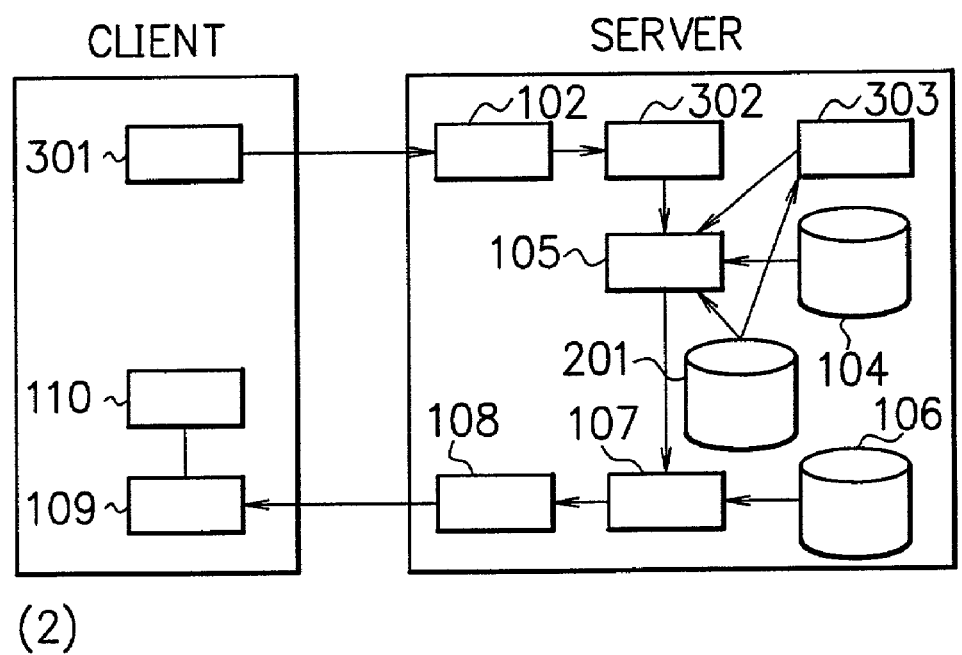
(2)

F I G. 17
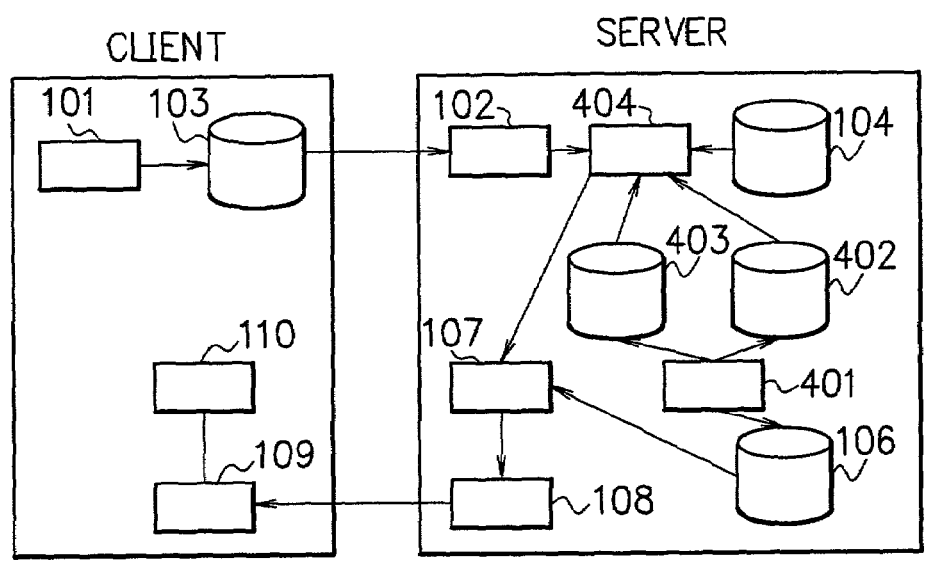
F I G. 18
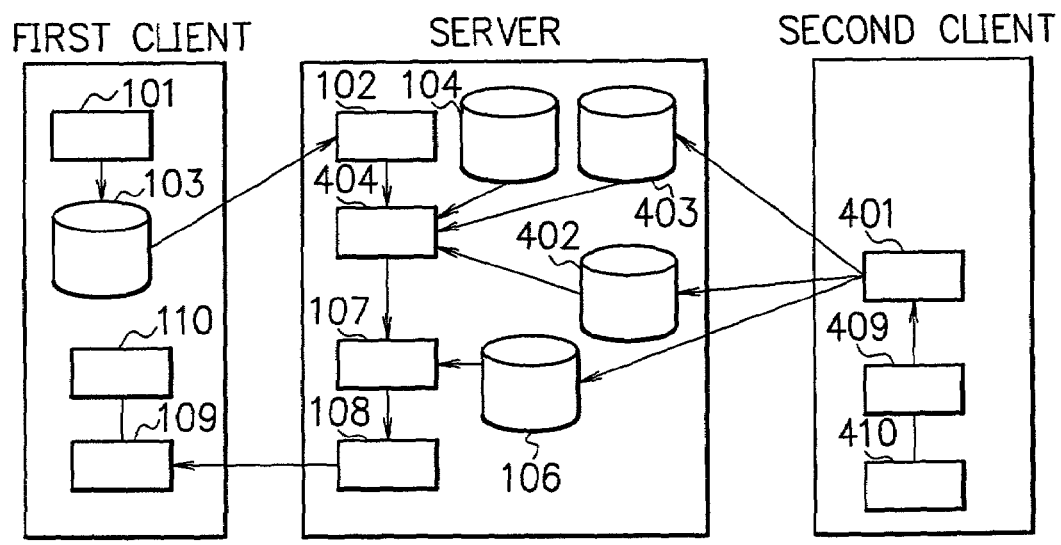

INFORMATION DELIVERING SERVER AND CLIENTS AND METHOD THEREOF AND STORING MEDIUM STORED PROGRAMS TO EXECUTE INFORMATION DELIVERY

BACKGROUND OF THE INVENTION

The present invention relates to an information delivery server and clients, an information delivery method thereof, and a storing medium stored programs to execute information delivery, in which information is delivered to users by retrieving such as document databases, in particular, in which the information is delivered to the users under the condition that the users and information suppliers designate their object places.

DESCRIPTION OF THE RELATED ART

As daily life information deeply relating to a geographic place where a user actually lives, there are a weather forecast informed by such as a TV, a radio, and a newspaper, and information of a sale on goods and an advertisement of goods of neighborhood shops informed by using such as an advertising insert in a newspaper. And as another information relating to the geographic place, there is a tourist guide pamphlet of sightseeing places. In some cases, the information in the tourist guide pamphlet is information that the user wants to know immediately, because there is a possibility that the user will visit in the near future. This kind of information can be obtained by accessing to a search engine on the Internet by using a URL in the WWW. For example, the weather forecast at a place where a user lives can be obtained by accessing to Yahoo (http://www.yahoo.co.jp/) being one of the search engines, and also the information of tourist spots at the traveling destination of the user or at near places where the user lives can be obtained at real time from the search engines. In order to make this possible, the search engines such as Yahoo classify the information obtained through the WWW into each area such as prefecture and city and the classified information is inputted to the search engines manually, and the information is delivered to the user. And the user can finally obtain information about a place and an area where the user wants to know by tracing links described "area information" at a Web site such as the Yahoo and focusing on his/her desiring place (geographic information) and a desiring area on the Web site.

Japanese Patent No. 2756483 describes "Delivering Method of Advertisement Information and Registering Method thereof". In this patent, an information supplier can dispose his/her information, which he/she desires to deliver, on a plane map. This patent has been realized as MAPION (http://www.mapion.co.jp/). A user accesses to the Web site of MAPION and focuses on his/her desiring place and can make an area map, where the desiring place of the user is included, display. For example, in case that information "firework display" registered by an information supplier exists in the area, the information is displayed on the map with an icon and letters (characters).

At Japanese Patent Application Laid-Open No. HEI 11-72347 "Information Delivery System Corresponding to Positions", it is described that information corresponding to the present position of a user is obtained from the information delivery system and this obtained information is delivered to the user. In this system, the position coordinate showing the present position of a user is converted into a format that the plural position relating retrieval servers, working on the Internet in public, can receive from such as the address of the user. With this, the information relating to the present position of the user can be obtained from the plural retrieval servers.

However, at the systems mentioned above, there are following problems. At the first existing example, Yahoo, the information to be retrieved is classified into each area by the convenience of the information suppliers, consequently, the information is retrieved in only an area unit. That is, it is not easy for a user to retrieve a range extending plural areas or a wide range designated by the user on a map.

At the second existing example, the Japanese Patent No. 2756483, MAPION, the information is disposed on a plane map and displayed. Therefore, the problem mentioned at the first existing example is solved, but it is necessary for the user to investigate and estimate the time and a means of transportation to reach the place independently. That is, in case that a user wants to use the information actually, the user cannot effectively use the information by using items such as the requiring time to reach a place where the user is going to from the present position of the user and the distance to the destination from his/her present position at the same time. For example, even when the user wants to know tourist spots within his/her walk-able distance from his/her staying place, the user cannot obtain its suitable information easily.

At the third existing example, the Japanese Patent Application Laid-Open No. HEI 11-72347, a retrieval request is executed by that position information is made to be an only retrieving key for the position relating information retrieval servers, which are working in public. Therefore, the information not relating to the position cannot be obtained. For example, there is a branch office of a company near a user, and in case that the user wants to obtain the information of the company, when the information of the branch office has not been registered in the server beforehand as an object relating to the position, the user cannot obtain the information of the company. Further, as the position relating information retrieval sever, a special server, in which position information is linked with the information of specific facilities such as branch offices, is used. Therefore, there is a problem that an existing database cannot be utilized as an information source so easily.

At the three existing examples mentioned above, an information supplier registers information by making position information as the only keyword, and users obtain the information by making the position information as the keyword. However, at this method, in case that the information supplier wants to limit the delivering range of information under a geographic condition, it is not possible. For example, in case that an information supplier wants to deliver information to residents and persons having an interest within the range of 3 km from the shop of the information supplier, it is not easy for the information supplier to choose users. Consequently, an information delivery apparatus (information delivery server and clients), in which information suppliers can set their information delivery condition arbitrary, has been required.

SUMMARY OF THE INVENTION

It is therefore an object of the present invention to provide an information delivery server and clients, an information delivery method thereof, and a storing medium stored programs to execute information delivery, in which information can be delivered to users effectively by satisfying with actual conditions. That is, according to the present invention, the information is delivered to residents and persons having an interest within a physical distance range from an aimed place or within a range where the residents and persons having the interest can reach the aimed place within a certain time. And also, according to the present invention, an information supplier can deliver information to registered users within a range from the aimed place of the information supplier or within a range where the users can reach the aimed place within a certain time. That is, the information can be delivered within a permissible range in time and distance.

And, according to the present invention, the information can be delivered to the users by using a simple structure, by not using a specific position relating information retrieval server, and also, processes, in which position information is registered in and is classified at existing databases beforehand, can be omitted. Further, according to the present invention, information suppliers can deliver area information such as product information, advertisement information, and service information to the users within a range designated by the information supplier.

According to a first aspect of the present invention, there is provided an information delivery server. The information delivery server provides a map information retrieving means to which place information having position information and range conditions that include at least one of a distance, a route, time, and a fare from a place or a place of the position information are inputted, and extracts at least one of facility information and place information relating to the position information under the range conditions from a map database that has facility names and road information connecting and relating to the facility names with coordinate information on a map, and a document database retrieving means that receives the facility information and/or the place information extracted from the map information retrieving means, and retrieves a document to be delivered to a user from a document database that has documents by making the received information as keywords.

According to a second aspect of the present invention, the information delivery server provides a user managing means that manages user IDs and receives place information of a place where a user had an interest from a terminal of the user, or receives the place information and range conditions that include at least one of a distance, a route, time, and a fare from a place or the place, and identifies the user and attaches a user ID to the received information, a user interested place database that stores the place information, or the range conditions and the place information, with the user ID received from the user managing means, a map information retrieving means to which the place information or the place information and the range conditions are inputted, and extracts at least one of facility information and place information relating to the place information under the range conditions or a range condition from a map database that has facility names and road information connecting and relating to the facility names with coordinate information on a map, and a document database retrieving means that receives the facility information and/or the place information extracted from the map information retrieving means, and retrieves a document to be delivered to the user from a document database that has documents by making the received information as keywords.

According to a third aspect of the present invention, the information delivery server provides a user managing means that manages user IDs and receives place information of a place where a user had an interest from a terminal the user, or receives the place information and range conditions that include at least one of a distance, a route, time, and a fare from a place or the place, and identifies the user and attaches a user ID to the received information, a map information retrieving means to which the place information or the place information and the range conditions are inputted, and extracts at least one of facility information and place information relating to the place information under the range conditions or a range condition from a map database that has facility names and road information connecting and relating to the facility names with coordinate information on a map, and a document database retrieving means that receives the facility information and/or the place information extracted from the map information retrieving means, and retrieves a document to be delivered to the user from a document database that has documents by making the received information as keywords.

According to a fourth aspect of the present invention, in the first, second, and third aspects, the information delivery server further provides a range condition rule database that stores the range conditions including at least one of a distance, a route, time, and a fare from a place in a rule format, and the map information retrieving means provides a place condition analyzing means, one or more range calculating means, and a map range retrieving means, and the place condition analyzing means classifies the inputted range conditions by referring to range condition rules storing in the range condition rule database, the one or more range calculating means calculates a range by receiving the classified range conditions, and the map range retrieving means retrieves the document by using the calculated results from at least one of the one or more range calculating means.

According to a fifth aspect of the present invention, in the fourth aspect, the one or more range calculating means provides a distance in a straight line range calculating means that calculates a range within a radius of a designated length by making a place designated by the place information as a center, by receiving the place information and the range condition from the place condition analyzing means, in case that a distance in a straight line is designated as the range condition, a route range calculating means that calculates a range along a designated route, by receiving the place information and the range condition from the place condition analyzing means, in case that a route is designated as the range condition, and a reaching possibility range calculating means that calculates a reaching possible range under the received range condition, by receiving the place information and the range condition from the place condition analyzing means, in case that a reaching possible range is designated as the range condition, and at least one or more the one or more range calculating means is chosen by the place condition analyzing means under the received range conditions.

According to a sixth aspect of the present invention, in the first, second, and third aspects, the information delivery server further provides a document informing means that informs the user about the document retrieved at the document database retrieving means.

According to a seventh aspect of the present invention, there is provided a client. The client provides a place condition inputting means to which a user inputs place information of a place where the user had an interest, or inputs the place information and range conditions including at least one of a distance, a route, time, and a fare from the place or a place, a document receiving means that receives a document retrieved at an information delivery server, by that the place condition inputting means inputs the place information and/or the range condition to the information delivery server, and makes the information delivery server extract at least one of facility information and place information from a map database that has facility names and roads connecting and relating to the facility names with coordinate information on a map by using the place information and the range condition, and makes the information delivery server retrieve the document by making the extracted facility information and place information as keywords, and a displaying means that displays the received document.

According to an eighth aspect of the present invention, the client provides a place condition inputting means to which a user inputs place information of a place where the user had an interest, or inputs the place information and range conditions including at least one of a distance, a route, time, and a fare from the place or a place, a user interested place database that stores the place information and the range conditions inputted at the place condition inputting means, a document receiving means that receives a document transmitted from an information delivery server, by that the place condition inputting means inputs the place information and/or the range condition to the information delivery server, and makes the information delivery server extract at least one of facility information and place information from a map database that has facility names and roads connecting and relating to the facility names with coordinate information on a map by using the place information and the range condition, and makes the information delivery server retrieve the document by making the extracted facility information and place information as keywords, and makes the information delivery server transmit the retrieved document, and a displaying means that displays the received document.

According to a ninth aspect of the present invention, there is provided an information delivery method. The information delivery method provides the steps of, inputting place information having position information and range conditions that include at least one of a distance, a route, time, and a fare from a place or a place of the position information, extracting at least one of facility information and place information relating to the position information under the range conditions from a map database that has facility names and road information connecting and relating to the facility names with coordinate information on a map, receiving extracted the facility information and/or the place information, and retrieving a document to be delivered to the user from a document database that has documents by making the received information as keywords.

According to a tenth aspect of the present invention, there is provided a storing medium stored programs to make a server execute information delivery. And the programs provides the steps of, receiving place information having position information and range conditions that include at least one of a distance, a route, time, and a fare from a place or a place of the position information from a client, extracting at least one of facility information and place information relating to the position information under the range conditions from a map database that has facility names and road information connecting and relating to the facility names with coordinate information on a map, receiving extracted the facility information and/or the place information, retrieving a document to be delivered to the client from a document database that has documents by making the received information as keywords, and sending the retrieved document to the client.

According to an eleventh aspect of the present invention, there is provided a storing medium stored programs to make a client execute information inputting and information receiving. And the programs provides the steps of, inputting place information of a place where a user had an interest and range conditions that include at least one of a distance, a route, time, and a fare from a place or the place, outputting the place information and the range conditions to an information delivery server, making the information delivery server extract at least one of facility information and place information relating to the place information under the range conditions from a map database that has facility names and road information connecting and relating to the facility names with coordinate information on a map, making the information delivery server retrieve a document to be delivered to the user from a document database that has documents by making the extracted information as keywords, making the information delivery server transmit the retrieved document to the client, receiving the document, and displaying the document on the user.

According to a twelfth aspect of the present invention, the information delivery server provides a map information retrieving means that obtains a virtual or actual position of a user at real time, and shows range conditions that include at least one of a distance, a route, time, and a fare from a place or the place of the virtual or actual position of the user to a terminal of the user, and receives range conditions designated by the terminal, and decides a range on a map under the designated range conditions, and extracts at least one of facility names and place names matching with the range conditions from a map database that has facility names and road information connecting and relating to the facility names with coordinate information on a map, and a document database retrieving means that receives the facility names and/or the place names extracted from the map information retrieving means, and retrieves a document to be delivered to the user from a document database that has documents by making the received names as keywords.

According to a thirteenth aspect of the present invention, the information delivery server provides a user managing means that manages user IDs and receives place information of a virtual or actual place of a user at real time and identifies the user and attaches a user ID to the place information, and sends the place information and the user ID, a user position memorizing means that receives the place information and the user ID from the user managing means and memorizes them, a range condition rule database that has range conditions that include at least one of a distance, a route, time, and a fare from a place in a rule format, a map information retrieving means that obtains the place information of the user from the user position memorizing means, and shows the range conditions to a terminal of the user by referring to the range condition rules from the range condition rule database, and receives the range conditions designated by the terminal at real time, and decides a range on a map under the designated range conditions by referring to the range condition rule database, and extracts at least one of facility names and place names matching with the range conditions from a map database that has facility names and road information connecting and relating to the facility names with coordinate information on the map, and a document database retrieving means that receives the facility names and/or the place names extracted from the map information retrieving means, and retrieves a document to be delivered to the user from a document database that has documents by making the received names as keywords.

According to a fourteenth aspect of the present invention, the information delivery server provides a user managing means that manages user IDs and receives place information of a virtual or actual place of a user at real time and identifies the user and attaches a user ID to the place information, and sends the place information and the user ID, a range condition rule database that has range conditions that include at least one of a distance, a route, time, and a fare from a place in a rule format, a map information retrieving means that obtains the place information of the user from the user managing means, and shows the range conditions to a terminal of the user by referring to the range condition rules from the range condition rule database, and receives the range conditions designated by the terminal at real time, and decides a range on a map under the designated range conditions by referring to the range condition rule database, and extracts at least one of facility names and place names matching with the range conditions from a map database that has facility names and road information connecting and relating to the facility names with coordinate information on the map, and a document database retrieving means that receives the facility names and/or the place names extracted from the map information retrieving means, and retrieves a document to be delivered to the user from a document database that has documents by making the received names as keywords.

According to a fifteenth aspect of the present invention, in the twelfth. thirteenth, and fourteenth aspects, the information delivery server further provides a document informing means that informs the user about the document retrieved at the document database retrieving means.

According to a sixteenth aspect of the present invention, the client provides a place obtaining means that obtains place information of a virtual or actual place of a user at real time, a range condition designating means that designates the present position of the user at real time by using the place information of the user by making range conditions that set a distance, a route, time, and a fare from the place or a place renew for the present position, a document receiving means that makes an information delivery server renew the place information of the user at real time, and makes the range conditions show at real time for the present position of the user by using the place information of the user, and makes the range conditions output, and makes the information delivery server extract at least one of facility information and place information from a map database that has facility names and roads connecting and relating to the facility names with coordinate information on a map by using the place information and the range condition, and makes the information delivery server retrieve a document to be delivered to the user by making the extracted facility information and place information as keywords from a document database that has documents, and receives the retrieved document from the information delivery server, and a displaying means that displays the received document.

According to a seventeenth aspect of the present invention, the client provides a place obtaining means that obtains place information of a virtual or actual place of a user at real time, a user position memorizing means that memorizes the place information that is renewed at real time at the place obtaining means, a document receiving means that makes an information delivery server renew the place information of the user at real time, and makes the range conditions show at real time for the present position of the user by using the place information of the user, and makes the range conditions output, and makes the information delivery server extract at least one of facility information and place information from a map database that has facility names and roads connecting and relating to the facility names with coordinate information on a map by using the place information and the range condition, and makes the information delivery server retrieve a document to be delivered to the user by making the extracted facility information and place information as keywords from a document database that has documents, and receives the retrieved document from the information delivery server, and a displaying means that displays the received document.

According to an eighteenth aspect of the present invention, the information delivery method, comprising the steps of, obtaining place information of a virtual or actual place of a user at real time, showing range condition rules that include at least one of a distance, a route; time, and a fare from a place to the user, inputting the range condition rules designated by the user, memorizing the position of the user, informing the position of the user every time when the position of the user is renewed, retrieving a range on a map from a map database by receiving the informed position of the user and the inputted range condition, obtaining keywords from the map database, retrieving a document to be delivered to the user from a document database by using the obtained keywords, informing the document retrieved from the document database, receiving the document, and displaying the document to the user.

According to a nineteenth aspect of the present invention, there is provided a storing medium stored programs to make a server execute information delivery. The programs provides the steps of, obtaining place information of a virtual or actual place of a user at real time, showing range condition rules that include at least one of a distance, a route, time, and a fare from a place to a terminal of the user, receiving range conditions designated by the terminal, deciding a range on a map under the range conditions, retrieving at least one of facility names and place names that matches with the range conditions from a map database that has facility names and roads connecting and relating to the facility names with coordinate information on a map, receiving at least one of the facility names and the place names, and retrieving a document to be delivered to the user from a document database that has documents by making the received names as keywords.

According to a twentieth aspect of the present invention, there is provided a storing medium stored programs to make a client execute information inputting and information receiving. The programs provides the steps of, obtaining place information of a virtual or actual place of a user at real time, making range condition rules that includes a distance, a route, time, and a fare from a place show, designating at least one of the range conditions at real time for the virtual or actual place of the present position of the user, making an information delivery sever renew the place information of the user at real time, and show the range conditions at real time for the present position of the user by using the place information of the user, and output the range conditions, making the information delivery server retrieve at least one of facility information and place information that matches with the range conditions from a map database that has facility names and roads connecting and relating to the facility names with coordinate information on a map, making the information delivery server retrieve a document to be delivered to the user from a document database that has documents by making the facility information or the place information as keywords, making the information delivery server send the retrieved document, receiving the document, and displaying the document at the terminal of the user.

According to a twenty-first aspect of the present invention, the information delivery server provides a user interested place database that stores place information of users with user IDs of the users, a document registering place index that stores a registering delivery place of a document registered from a terminal of an information supplier with a document ID of the document, a document delivery condition database that stores a document delivery condition that is a range condition under which the document is delivered in a range and is one of range conditions that include a distance, a route, time, and a fare from a place inputted from the terminal with the document ID, a map and user retrieving means that retrieves the registering delivery place from the document registering place index, and obtains the document delivery condition of the document corresponding to the document ID from the document delivering condition database, and decides a range where the document is delivered from the registering delivery place and document delivery condition, and retrieves a map database that has facility names and road information connecting and relating to the facility names with coordinate information on a map, and the user interested place database, under the range condition, and obtains a list of user IDs of users who have registered within a range that matches with the range condition, and outputs the list of the user IDs with the document ID, and a document database retrieving means that receives the list of the user IDs with the document ID from the map and user retrieving means, and retrieves a document to be delivered to the users in the list of the user IDs from a document database that has documents by using the document ID.

According to a twenty-second aspect of the present invention, the information delivery server provides a user managing means that manages user IDs and receives place information having position information of a place from a terminal of a user, and identifies the user and attaches a user ID to the received information, a user interested place database that stores the place information with the user ID by receiving from the user managing means, a document registering place index that stores a registering delivery place of a document registered from a terminal of an information supplier with a document ID of the document, a map and user retrieving means that outputs a document delivery condition that is a range condition under which the document is delivered in a range and is one of range conditions that include a distance, a route, time, and a fare from a place inputted from the terminal of the information supplier with the document ID, and retrieves a map database and obtains a list of user IDs of users who have registered within a range that matches with the range condition, and outputs the list of the user IDs with the document ID, a document database retrieving means that receives the list of the user IDs with the document ID from the map and user retrieving means, and retrieves a document to be delivered to the users in the list of the user IDs from a document database that has documents by using the document ID, and a document informing means that informs the users in the list of the user IDs about the document retrieved at the document database retrieving means.

According to a twenty-third aspect of the present invention, in the twenty-first aspect, the information delivery server further provides a range condition rule database that stores the range conditions including a distance, a route, time, and a fare from a place in a rule format, a place condition analyzing means that receives the registering delivery place with the document ID from the document registering place index and also receives the document delivery condition corresponding to the document ID from the document delivery condition database, and classifies the range conditions by referring to range condition rules storing in the range condition rule database, a distance in a straight line range calculating means that calculates a range within a radius of a designated length by making a place designated by the place information as a center, by receiving the place information and the range condition from the place condition analyzing means, in case that a distance in a straight line is designated as the range condition, a route range calculating means that calculates a range along a designated route, by receiving the place information and the range condition from the place condition analyzing means, in case that a route is designated as the range condition, a reaching possibility range calculating means that calculates a reaching possible range under the received range condition, by receiving the place information and the range condition from the place condition analyzing means, in case that a reaching possible range is designated as the range condition, a user within range retrieving means that receives at least one of the calculated results at the distance in a straight line range calculating means, the route range calculating means, and the reaching possibility range calculating means, and also receives the range condition designated by the terminal of the information supplier, and obtains a list of user IDs of users who have registered in the range from the map database and the user interested place database, and sends the list of the user IDs and the document ID to the document database retrieving means.

According to a twenty-fourth aspect of the present invention, there is provided a client being an information supplier. The client being an information supplier provides an inputting means from which an information supplier inputs a document that is delivered to users in an information delivery server. And the information supplier further inputs a registering delivery place where the document is delivered and a delivery condition under which the document is delivered from the inputting means to the information delivery server, and the information delivery server delivers the document to the users who matched with the registering delivery place and the delivery condition.

According to a twenty-fifth aspect of the present invention, the client provides a place condition inputting means to which a user inputs place information of a place where the user had an interest, or inputs the place information and range conditions including at least one of a distance, a route, time, and a fare from the place or a place, a user interested place database that stores the place information and the range conditions inputted at the place condition inputting means, a document receiving means that receives a document transmitted from an information delivery server, by that the place condition inputting means inputs the place information and the range condition to the information delivery server, and makes the information delivery server decide obtain a document delivery condition corresponding to a document ID, and makes the information delivery server decide a range where the document is delivered by a document registering delivery place and a document delivery condition, and makes the information delivery server retrieve a map database that has facility names and roads connecting and relating to the facility names with coordinate information on a map and the user interested place database under the range condition, and makes the information delivery server obtain a list of user IDs that match with the conditions and a document from a document database, and makes the information delivery server transmit the retrieved document with the list of the user IDs, and a displaying means that displays the received document.

According to a twenty-sixth aspect of the present invention, the client being an information supplier provides an inputting means from which an information supplier inputs a document that is delivered to users in an information delivery server. And the client makes the information delivery server store the document with a document ID and a registering delivery place, and makes the information delivery server retrieve the document under a document delivery condition and obtains a list of user IDs that match with the document deliver condition, and makes the information delivery server send the document to the list of the user IDs.

According to a twenty-seventh aspect of the present invention, the information delivery method provides the steps of, obtaining place information of a virtual or actual place of a user at real time, showing range condition rules that include at least one of a distance, a route, time, and a fare from a place, inputting the range condition rules designated by the user, memorizing the position of the user, informing the position of the user every time when the position of the user is renewed, retrieving a range on a map from a map database by receiving the informed position of the user and the inputted range condition, obtaining keywords from the map database, retrieving a document to be delivered to the user from a document database by using the obtained keywords, informing the document retrieved from the document database, receiving the document, and displaying the document to the user.

According to a twenty-eighth aspect of the present invention, there is provided a storing medium stored programs to make a client execute information inputting and information receiving. The programs provides the steps of, inputting place information of a place where a user had an interest or the place information and range conditions that include at least one of a distance, a route, time, and a fair from the place or a place, outputting the place information and the range conditions to an information delivery server, making the information delivery server obtain a document delivery condition corresponding to a document ID, making the information delivery sever decide a range where a document is delivered from a document registering delivery place and the document delivery condition, making the information delivery server retrieve a map database that has facility names and roads connecting and relating to the facility names with coordinate information on a map and a user interested place database, under the conditions, making the information delivery server obtain a list of user IDs that have been registered in a range that matches with the conditions and a document that matches with the condition, making the information delivery server send the obtained document, receiving the document, and displaying the document at the terminal of the user.

According to a twenty-ninth aspect of the present invention, there is provided a storing medium stored programs to make a client being an information supplier execute information registering and information delivering. The programs provides the steps of, registering a document that is delivered to users in an information delivery server, making the information delivery server store the document with a document ID and a registering delivery place, making the information delivery server retrieve the document under a document delivery condition, making the information delivery server obtain a list of user IDs that match with the document deliver condition, and making the information delivery server send the document to the list of the user IDs.

According to a thirtieth aspect of the present invention, there is provided a storing medium stored programs to make a server execute information delivery. The programs provides the steps of, storing place information of users with user IDs in a user interested place database, storing a registering delivery place of a document registered from a terminal of an information supplier with a document ID of the document in a document registering place index, storing a document delivery condition that is a range condition under which the document is delivered in a range and is one of range conditions that include a distance, a route, time, and a fare from a place inputted from the terminal with the document ID in a document delivery condition database, retrieving the registering delivery place from the document registering place index, obtaining the document delivery condition of the document corresponding to the document ID from the document delivering condition database, deciding a range where the document is delivered from the registering delivery place and document delivery condition, retrieving a map database that has facility names and road information connecting and relating to the facility names with coordinate information on a map, and the user interested place database, under the range condition, obtaining a list of user IDs of users who have registered within a range that matches with the range condition, retrieving a document to be delivered to the users in the list of the user IDs from a document database that has documents by using the document ID.

According to a thirty-first aspect of the present invention, the information delivery server provides a place condition obtaining means that obtains place information of a virtual or actual place of a user at real time, a user position memorizing means that receives the place information of the virtual or actual place of the user from the place condition obtaining means and memorizes them, a document registering place index that stores a registering delivery place of a document registered from a document registering means of a terminal of an information supplier with a document ID of the document, a document delivery condition database that stores a document delivery condition that is a range condition under which the document is delivered in a range and is one of range conditions that include a distance, a route, time, and a fare from a place inputted from the terminal with the document ID, a map and user retrieving means that obtains the registering delivery place from the document registering place index, and also obtains the document delivery condition of the document corresponding to the document ID from the document delivering condition database, and decides a range where the document is delivered from the registering delivery place and document delivery condition, and retrieves a map database that has facility names and road information connecting and relating to the facility names with coordinate information on a map, and the user position memorizing means, under the range condition, and obtains a list of user IDs of users who have registered within a range that matches with the range condition, and outputs the list of the user IDs with the document ID, a document database retrieving means that receives the list of the user IDs with the document ID from the map and user retrieving means, and retrieves a document to be delivered to the users in the list of the user IDs from a document database that has documents by using the document ID, a document informing means that receives the document from the document database retrieving means and informs the users in the list of the user IDs about the document, an informing user managing means that manages the document ID of the document, which is informed to the users from the document informing means, and the user IDs, and informs a document deleting means about the document ID so that the document deleting means deletes the document of the document ID when the number of users whom the document was delivered exceeded a number designated by the document registering means, and the document deleting means that receives the document ID of the document whose delivered number of users exceeded the designated number (an upper limit), and deletes the document delivery condition and the document registering place index corresponding to the received document ID from document delivery condition database and the document registering place index.

According to a thirty-second aspect of the present invention, the information delivery server provides a user managing means that manages user IDs and identifies a user and attaches the user ID of the user to place information of a virtual or actual place of a user obtained from a first terminal at real time, a user position memorizing means that receives the place information and the user ID of the user from the user managing means and memorizes them, a document registering place index that stores a registering delivery place of a document registered from a document registering means of a second terminal with a document ID of the document, a document delivery condition database that stores a document delivery condition that is a range condition under which the document is delivered in a range and is one of range conditions that include a distance, a route, time, and a fare from a place inputted from the second terminal with the document ID, a map and user retrieving means that obtains the registering delivery place from the document registering place index, and also obtains the document delivery condition of the document corresponding to the document ID from the document delivering condition database, and decides a range where the document is delivered from the registering delivery place and document delivery condition, and retrieves a map database that has facility names and road information connecting and relating to the facility names with coordinate information on a map, and the position memorizing means, under the range condition, and obtains a list of user IDs of users who have registered within a range that matches with the range condition, and outputs the list of the user IDs with the document ID, a document database retrieving means that receives the list of the user IDs with the document ID from the map and user retrieving means, and retrieves a document to be delivered to the users in the list of the user IDs from a document database that has documents by using the document ID, a document informing means that receives the document from the document database retrieving means and informs the users in the list of the user IDs about the document, an informing user managing means that manages the document ID of the document, which is informed to the users from the document informing means, and the user IDs, and informs a document deleting means about the document ID so that the document deleting means deletes the document of the document ID when the number of users whom the document was delivered exceeded a number designated by the document registering means, and the document deleting means that receives the document ID of the document whose delivered number of users exceeded the designated number (an upper limit), and deletes the document delivery condition and the document registering place index corresponding to the received document ID from document delivery condition database and the document registering place index.

According to a thirty-third aspect of the present invention, the information delivery server provides a user position memorizing means that memorizes place information of a virtual or actual place of a user with a user ID of the user, a document registering place index that stores a registering delivery place of a document registered from a document registering means of a second terminal with a document ID of the document, a document delivery condition database that stores a document delivery condition that is a range condition under which the document is delivered in a range and is one of range conditions that include a distance, a route, time, and a fare from a place inputted from the second terminal with the document ID, a map and user retrieving means that obtains the registering delivery place from the document registering place index, and also obtains the document delivery condition of the document corresponding to the document ID from the document delivering condition database, and decides a range where the document is delivered from the registering delivery place and document delivery condition, and retrieves a map database that has facility names and road information connecting and relating to the facility names with coordinate information on a map, and the user position memorizing means, under the range condition, and obtains a list of user IDs of users who have registered within a range that matches with the range condition, and outputs the list of the user IDs with the document ID, a document database retrieving means that receives the list of the user IDs with the document ID from the map and user retrieving means, and retrieves a document to be delivered to the users in the list of the user IDs from a document database that has documents by using the document ID, and an informing user managing means that manages the document ID of the document that is informed to the users and the user IDs of users whom the document is delivered, and does not instruct to deliver the document when the number of users whom the document was delivered exceeded a number designated by the document registering means.

According to a thirty-fourth aspect of the present invention, the information delivery server provides a user managing means that manages user IDs and identifies a user and attaches the user ID of the user to place information of a virtual or actual place of the user obtained from a first terminal at real time, a user position memorizing means that receives the place information and the user ID of the user from the user managing means and memorizes them, a document registering place index that stores a registering delivery place of a document registered from a document registering means of a second terminal with a document ID of the document, a document delivery condition database that stores a document delivery condition that is a range condition under which the document is delivered in a range and is one of range conditions that include a distance, a route, time, and a fare from a place inputted from the second terminal with the document ID, a map and user retrieving means that obtains the registering delivery place from the document registering place index, and also obtains the document delivery condition of the document corresponding to the document ID from the document delivering condition database, and decides a range where the document is delivered from the registering delivery place and document delivery condition, and retrieves a map database that has facility names and road information connecting and relating to the facility names with coordinate information on a map, and the user position memorizing means, under the range condition, and obtains a list of user IDs of users who have registered within a range that matches with the range condition, and outputs the list of the user IDs with the document ID, a document database retrieving means that receives the list of the user IDs with the document ID from the map and user retrieving means, and retrieves a document to be delivered to the users in the list of the user IDs from a document database that has documents by using the document ID, an informing user managing means that manages the document ID of the document that is informed to the users and the user IDs of users whom the document is delivered, and does not instruct to deliver the document when the number of users whom the document was delivered exceeded a number designated by the document registering means, and a document informing means that informs the users in the list of the user IDs about the document by an instruction from the informing user managing means.

According to a thirty-fifth aspect of the present invention, the client provides a place condition obtaining means that obtains place information of a virtual or actual place of a user at real time, a receiving means that receives a document from an information delivery server, by making the information deliver server register a document to be delivered to the user by attaching a document registering place index and a document delivery condition, and store the place information that is renewed from the place obtaining means at real time, and extract at least one of facility names and place names from a map database that has facility names and road information connecting and relating to the facility names with coordinate information on a map, by using the place information and the document delivery condition, and retrieve a document to be delivered to the user from a document database that has document by making the extracted facility names or place names as keywords, and confirms whether the document has its upper limit delivery number or not, and delete the document, the document registering place, and the document delivery condition of the document, when the delivered number of the document exceeded the upper limit, and send the document when the delivered number of the document did not exceed the upper limit, and a displaying means that receives the document and displays the document.

According to a thirty-sixth aspect of the present invention, the client provides a place condition obtaining means that obtains place information of a virtual or actual place of a user at real time, a receiving means that receives a document from an information delivery server, by making an information deliver server register a document to be delivered to the user by attaching a document registering place index and a document delivery condition, and store the place information that is renewed from the place obtaining means at real time, and extract at least one of facility names and place names from a map database that has facility names and road information connecting and relating to the facility names with coordinate information on a map, by using the place information and the document delivery condition, and retrieve a document to be delivered to the user from a document database that has document by making the extracted facility names or place names as keywords, and confirm whether the document has its upper limit delivery number or not, and instruct not to deliver the document when the delivered number of the document exceeded the upper limit, and instruct to send the document when the delivered number of the document did not exceed the upper limit, and a displaying means that receives the document and displays the document.

According to a thirty-seventh aspect of the present invention, the client being an information supplier provides an inputting means from which an information supplier inputs a document that is delivered to users in an information delivery server. And the information supplier further inputs a registering delivery place where the document is delivered and a document delivery condition under which the document is delivered to the information delivery server from the inputting means, and makes the information delivery server deliver the document to the users under conditions of the registering delivery place and the document delivery condition.

According to a thirty-eighth aspect of the present invention, the client being an information supplier provides an inputting means from which an information supplier inputs a document that is delivered to users in an information delivery server. And the information supplier further inputs a registering delivery place where the document is delivered and a document delivery condition under which the document is delivered to the information delivery server from the inputting means, and makes the information delivery server deliver the document to the users under conditions of the registering delivery place and the document delivery condition, and further inputs an upper limit of delivering number of the document as a document delivery condition to the information delivery server from the inputting means, and when the delivered number of the document exceeded the upper limit, makes the information delivery server stop delivering the document and delete the registering delivery place and the document delivery condition of the document, and when the delivered number of the document did not exceed the upper limit, makes the information delivery server deliver the document.

According to a thirty-ninth aspect of the present invention, the client being an information supplier provides an inputting means from which an information supplier inputs a document that is delivered to users in an information delivery server. And the information supplier further inputs a registering delivery place where the document is delivered and a document delivery condition under which the document is delivered to the information delivery server from the inputting means, and makes the information delivery server deliver the document to the users under conditions of the registering delivery place and the document delivery condition, and further inputs an upper limit of delivering number of the document as a document delivery condition to the information delivery server from the inputting means, and when the delivered number of the document exceeded the upper limit, makes the information delivery server stop delivering the document, and when the delivered number of the document did not exceed the upper limit, makes the information delivery server continue to deliver the document.

According to a fortieth aspect of the present invention, the information delivery method provides the steps of, registering a document that a second client wants to deliver to users in a document database, registering a registering delivery place where the document is delivered in a document registering place index from the second client, and storing them with a document ID, registering a document deliver condition under which the document is delivered to users in a document delivery condition database from the second client, and storing them with the document ID, judging whether the document has an upper limit of delivering number as one of the document delivery condition or not, informing the upper limit of delivering number of the document and the document ID, when the upper limit of delivering number exists, attaching a user ID to the present position of user and memorizing the present position of the user, informing the present position of the user when the present position of the user is renewed, obtaining the document delivery condition every document ID from the document delivery condition database, obtaining the registering delivery place every document ID from the document registering place index, obtaining a list of user IDs of users under conditions of the present position of users, the registering delivery place, and the document delivery condition, obtaining a document to be delivered to the users in the list of the user IDs by retrieving the document database by using the document ID and the list of the user IDs, sending the document, the document ID, and the list of the user IDs, delivering the document to the users in the list of the user IDs, judging whether the delivered number of the document exceeded the upper limit or not in case that the document has the upper limit, stopping delivering the document and deleting the document delivery condition and the registering delivery place from respective the document delivery condition database and the document registering place index when the delivered number of the document exceeded the upper limit, and continuing delivering the document when the delivered number of the document did not exceed the upper limit.

According to a forty-first aspect of the present invention, the information delivery method provides the steps of, registering a document that a second client wants to deliver to users in a document database, registering a registering delivery place where the document is delivered in a document registering place index from the second client, and storing them with a document ID, registering a document deliver condition under which the document is delivered to users in a document delivery condition database from the second client, and storing them with the document ID, judging whether the document has an upper limit of delivering number as one of the document delivery condition or not, informing the upper limit of delivering number of the document and the document ID, when the upper limit of delivering number exists, attaching a user ID to the present position of user and memorizing the present position of the user, informing the present position of the user when the present position of the user is renewed, obtaining the document delivery condition every document ID from the document delivery condition database, obtaining the registering delivery place every document ID from the document registering place index, obtaining a list of user IDs of users under conditions of the present position of users, the registering delivery place, and the document delivery condition, obtaining a document to be delivered to the users in the list of the user IDs by retrieving the document database by using the document ID and the list of the user IDs, sending the document, the document ID, and the list of the user IDs, delivering the document to the users in the list of the user IDs, counting the number of users whom the document was delivered every document ID, judging whether the delivered number of the document exceeded the upper limit or not by the counted result, and stopping delivering the document when the counted number exceeded the upper limit, and continuing delivering the document when the counted number did not exceed the upper limit.

According to a forty-second aspect of the present invention, the information delivery method provides the steps of, registering a document that a second client wants to deliver to a first client in a document database, registering a registering delivery place where the document is delivered and a document delivery condition under which the document is delivered to the first client in a server from the second client, attaching a document ID to the registering delivery place and the document delivery condition by the server, judging whether the document has an upper limit of delivering number as one of the document delivery condition or not by the server, informing the upper limit of delivering number of the document and the document ID, when the upper limit of delivering number exists, receiving the present position of the first client from the first client, and attaching a user ID to the present position of the first client, and memorizing the present position of the first client with the user ID by the server, receiving the present position of the first client every time when the present position of the first client was renewed by the server, obtaining the registering delivery place and the document delivery condition every document ID by the server, obtaining a document that matches with the present position of the first client, the registering delivery place, and the document delivery condition, from the document database by the server, informing the first client about the obtained document by the server, counting the number of users being the first client whom the document was delivered by the server, stopping delivering the document to the users being the first client when the counted number reached the upper limit of delivering number by the server, and continuing delivering the document to the users being the first client when the counted number did not reach the upper limit of delivering number by the server.

According to a forty-third aspect of the present invention, the information delivery method provides the steps of, registering a document that a second client wants to deliver to a first client in a document database, registering a registering delivery place where the document is delivered and a document delivery condition under which the document is delivered to the first client in a server from the second client, attaching a document ID to the registering delivery place and the document delivery condition by the server, registering an upper limit of delivering numbers of the document with the document ID in the server from the second client, receiving the present position of the first client from the first client, and attaching a user ID to the present position of the first client, and memorizing the present position of the first client with the user ID by the server, receiving the present position of the first client every time when the present position of the first client was renewed by the server, obtaining the registering delivery place and the document delivery condition every document ID by the server, obtaining a list of user IDs of the first client being users that match with the present position of the first client, the registering delivery place, and the document delivery condition by the server, obtaining a document that match with the present position of the first client, the registering delivery place, and the document delivery condition, from the document database by the server, informing the users in the list of the user IDs being the first client about the obtained document by the server, recording the number of user IDs of the users being the first client whom the document was delivered by the server, judging whether the recorded number of user IDs reached the upper limit of delivering number at the sever, stopping delivering the document to the users being the first client and deleting the registering delivery place and the document delivery condition when the recorded number reached the upper limit of delivering number by the server, and continuing delivering the document to the users being the first client when the recorded number did not reach the upper limit of delivering number by the server.

According to a forty-fourth aspect of the present invention, the information delivery method provides the steps of registering a document that a second client wants to deliver to a first client in a document database, registering a registering delivery place where the document is delivered and a document delivery condition under which the document is delivered to the first client in a server from the second client, attaching a document ID to the registering delivery place and the document delivery condition by the server, registering an upper limit of delivering numbers of the document with the document ID in the server from the second client, receiving the present position of the first client from the first client, and attaching a user ID to the present position of the first client, and memorizing the present position of the first client with the user ID by the server, receiving the present position of the first client every time when the present position of the first client was renewed by the server, obtaining the registering delivery place and the document delivery condition every document ID by the server, obtaining a list of user IDs of the first client being users that match with the present position of the first client, the registering delivery place, and the document delivery condition by the server, obtaining a document that match with the present position of the first client, the registering delivery place, and the document delivery condition, from the document database by the server, informing the users in the list of the user IDs being the first client about the obtained document by the server, counting the number of user IDs of the users being the first client whom the document was delivered by the server, judging whether the counted number of user IDs reached the upper limit of delivering number at the sever, stopping delivering the document to the users being the first client when the recorded number reached the upper limit of delivering number by the server, and continuing delivering the document to the users being the first client when the recorded number did not reach the upper limit of delivering number by the server.

According to a forty-fifth aspect of the present invention, there is provided a storing medium stored programs to make a server execute information delivery. And the programs provides the steps of; memorizing place information of a virtual or actual place of each of users with each user ID in a user position memorizing means, storing a registering delivery place, where a document is delivered, of the document inputted from a terminal, with a document ID in a document registering delivery place index, storing a document delivery condition, which is a range condition, within the range the document is delivered, and is at least one of a distance, a route, time, a fare from a place where the terminal inputted, with the document ID in a document delivery condition database, obtaining the registering delivery place with the document ID from the document registering delivery place index and also the document delivery condition with the document ID from the document delivery condition database, retrieving a map database that has facility names and roads connecting and relating to the facility names with coordinate information on a map and the place information of the users memorizing in the user position memorizing means, under conditions of the obtained registering delivery place and the document delivery condition, obtaining a list of user IDs of the users within a geographic range that match with the place information of the users, the registering delivery place, and the document delivery condition, and sending the obtained list of the user IDs with the document ID to a document database retrieving means, retrieving a document that matches with the document ID from a document database that has documents to be delivered to the users at the document retrieving means, and sending the document to a document informing means with the list of the user IDs, informing the users in the list of the user IDs about the retrieved document at the document informing means, stopping delivering the document to the users when the delivered number of the document exceeded a predetermined upper limit at an informing user managing means that manages the user IDs and the document IDs, and deleting the registering delivery place and the document delivery condition of the document ID of the document whose delivered number exceeded the upper limit.

According to a forty-sixth aspect of the present invention, there is provided a storing medium stored programs to make a server execute information delivery. And the programs provides the steps of; memorizing place information of a virtual or actual place of each of users with each user ID in a user position memorizing means, storing a registering delivery place, where a document is delivered, of the document inputted from a terminal, with a document ID in a document registering delivery place index, storing a document delivery condition, which is a range condition, within the range the document is delivered, and is at least one of a distance, a route, time, a fare from a place where the terminal inputted, with the document ID in a document delivery condition database, obtaining the registering delivery place with the document ID from the document registering delivery place index and also the document delivery condition with the document ID from the document delivery condition database, retrieving a map database that has facility names and roads connecting and relating to the facility names with coordinate information on a map and the place information of the users memorizing in the user position memorizing means, under conditions of the obtained registering delivery place and the document delivery condition, obtaining a list of user IDs of the users within a geographic range that match with the place information of the users, the registering delivery place, and the document delivery condition, and sending the obtained list of the user IDs with the document ID to a document database retrieving means, retrieving a document that matches with the document ID from a document database that has documents to be delivered to the users at the document database retrieving means, and sending the document to a document informing means with the list of the user IDs, informing the users in the list of the user IDs about the retrieved document at the document informing means, and stopping delivering the document to the users when the delivered number of the document exceeded a predetermined upper limit at an informing user managing means that manages the user IDs and the document IDs.

According to forty-seventh aspect of the present invention, there is provided a storing medium stored programs to make a client execute information inputting and information receiving. And the programs provides the steps of, obtaining place information of a virtual or actual place of each of users at real time at the client, making an information delivery server register a document that is delivered to the users with a registering delivery place where the document is delivered and a document delivery condition under which the document is delivered, making the information delivery server memorize the place information that is renewed at real time from the place obtaining means, making the information delivery server retrieve at least one of facility names and place names from a map database that has facility names and roads connecting and relating to the facility names with coordinate information on a map by using the registering delivery place and the document delivery condition, making the information delivery server retrieve a document to be delivered to the users from a document database that has documents by making the facility names or the place names as keywords, and confirm whether the document has an upper limit of delivering number or not, making the information delivery server send the retrieved document to the client, receiving the document at the client, displaying the document at the client, and making the information delivery server stop informing the client about the document when the delivered number exceeded the upper limit, and delete the document and the registering delivery place and the document delivery condition.

According to a forty-eighth aspect of the present invention, there is provided a storing medium stored programs to make a client execute information inputting and information receiving. And programs provides the steps of, obtaining place information of a virtual or actual place of each of users at real time at the client, making an information delivery server register a document that is delivered to the users with a registering delivery place where the document is delivered and a document delivery condition under which the document is delivered, making the information delivery server memorize the place information that is renewed at real time from the place obtaining means, making the information delivery server retrieve at least one of facility names and place names from a map database that has facility names and roads connecting and relating to the facility names with coordinate information on a map by using the registering delivery place and the document delivery condition, making the information delivery server retrieve a document to be delivered to the users from a document database that has documents by making the facility names or the place names as keywords, and confirm whether the document has an upper limit of delivering number or not, making the information delivery server send the retrieved document to the client, receiving the document at the client, displaying the document at the client, and making the information delivery server stop informing the client about the document when the delivered number exceeded the upper limit.

According to a forty-ninth aspect of the present invention, there is provided a storing medium stored programs to make a client being an information supplier execute information registering and information delivering. And the programs provides the steps of, registering a document that is delivered to users in an information delivery server; registering a registering delivery place where the document is delivered and a document delivery condition under which the document is delivered in the information delivery server, registering an upper limit of delivering number of the document in the information delivery server, if necessary, making the information delivery server deliver the document to the users under conditions of the registering delivery place and the document delivery condition, and making the information delivery server stop delivering the document to the users when the delivered number of the document exceeded the upper limit, delete the document, the registering delivery place, and the document delivery condition.

According to a fiftieth aspect of the present invention, there is provided a storing medium stored programs to make a client being an information supplier execute information registering and information delivering. And the programs provides the steps of, registering a document that is delivered to users in an information delivery server, registering a registering delivery place where the document is delivered and a document delivery condition under which the document is delivered in the information delivery server, registering an upper limit of delivering number of the document in the information delivery server, if necessary, making the information delivery server deliver the document to the users under conditions of the registering delivery place and the document delivery condition, and making the information delivery server stop delivering the document to the users when the delivered number of the document exceeded the upper limit.

BRIEF DESCRIPTION OF THE DRAWINGS

The objects and features of the present invention will become more apparent from the consideration of the following detailed description taken in conjunction with the accompanying drawings in which:

FIG. 1 is a block diagram showing a structure at a first embodiment of an information delivery apparatus of the present invention;

FIG. 2 is a diagram showing a data that is inputted to a user interested place database at the first embodiment of the information delivery apparatus of the present invention;

FIG. 3 is a diagram showing a range condition rule at a third embodiment of the information delivery apparatus of the present invention;

FIG. 6 is a block diagram showing a second embodiment of the information delivery apparatus of the present invention;

FIG. 8 is a diagram showing an example of data storing in the user interested place database 103 at the third embodiment of the information delivery apparatus of the present invention;

FIG. 13 is a block diagram showing a structure of a fifth embodiment of the information delivery apparatus of the present invention;

FIG. 14 is a block diagram showing another structure of the fifth embodiment of the information delivery apparatus of the present invention;

FIG. 17 is a block diagram showing a structure at a seventh embodiment of the information delivery apparatus of the present invention;

FIG. 18 is a block diagram showing another structure at the seventh embodiment of the information delivery apparatus of the present invention;

DESCRIPTION OF THE PREFERRED EMBODIMENTS

Figure 4:
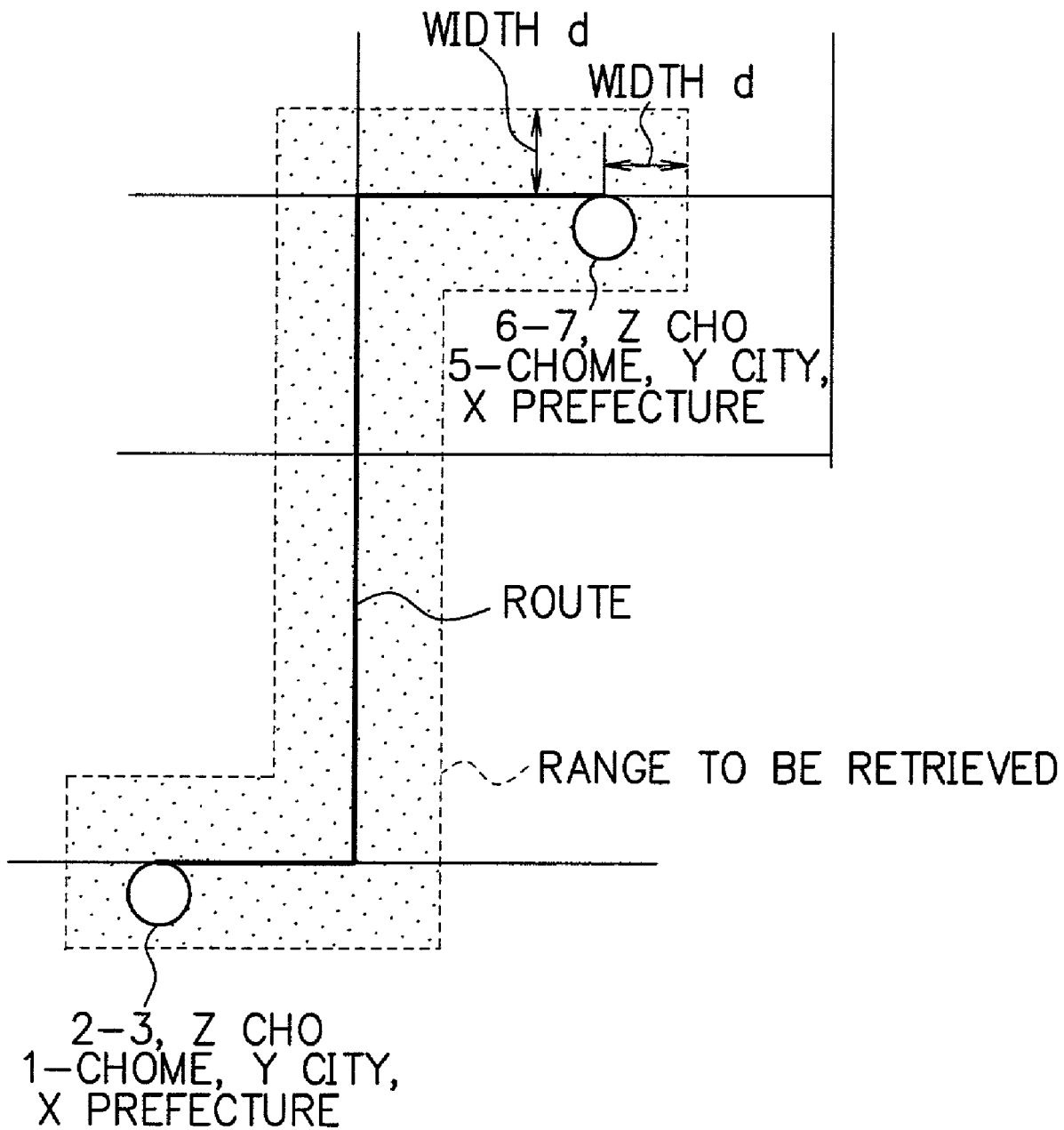
FIG. 4 is a diagram showing a range to be retrieved in case that a route is designated as the range condition type in the range condition rules at the third embodiment of the information delivery apparatus of the present invention.

Referring now to the drawings, embodiments of the present invention are explained in detail. At the embodiments of the present invention, an information delivery server and clients is explained in some embodiments as an information delivery apparatus. However, actually, the information delivery apparatus can be divided into a server and clients, and in some embodiments, further, the clients are composed of a first client (user) and a second client (information supplier). And actually, plural first clients (users) and plural second clients (information suppliers) are connected to the server, however, in order to make the explanation concise, basically one first client (user) and one second client (information supplier) are used at the explanation.

FIG. 1 is a block diagram showing a structure at a first embodiment of an information delivery apparatus of the present invention. Referring to FIG. 1, the first embodiment of the information delivery apparatus of the present invention is explained.

As shown in FIG. 1, the first embodiment of the information delivery apparatus of the present invention consists of a place condition inputting means 101, a user managing means 102, a user interested place database 103, a map database 104, a map information retrieving means 105, a document database 106, a document database retrieving means 107, a document informing means 108, a receiving means 109, and a displaying means 110.

At the first embodiment, the structure is not divided into a server and a client, however, the structure can be divided into the server and the client as explaining later at a second embodiment. In this case, the client provides at least the place condition inputting means 101, the receiving means 109, and the displaying means 110. In a case, either the receiving means 109 or the displaying means 110 can be omitted, in this case, the function of the omitted one is included in the function of the not omitted one. The server provides at least the map information retrieving means 105 and the document database retrieving means 107. And the user managing means 102 and the user interested place database 103 can be provided either in the client or the server, or are provided in both of the client and the server.

In case that the user managing means 102 and the user interested place database 103 are provided in the server, as shown in FIG. 1, the client is connected to the user interested place database 103 via the user managing means 102, and the user interested place database 103 is connected to the map information retrieving means 105.

In case that the user managing means 102 and the user interested place database 103 are provided in the client, the client is connected to the map information retrieving means 105 via the user interested place database 103. And as shown in FIG. 1, the map information retrieving means 105 is connected to the document database retrieving means 107. And the map information retrieving means 105 is connected to the map database 104, and the document database retrieving means 107 is connected to the document database 106.

At the first embodiment of the information delivery apparatus of the present invention, information in a specific area neighboring a spot is retrieved by making the spot as a reference. At the first embodiment of the present invention, place information having position information (for example, latitude and longitude) and a range condition, in which a range within a specific distance from a specific place is set, are inputted. And the map information retrieving means 105 extracts facility information and/or place information from the map database 104, which has facility names on a map and/or connection relating information of facilities with coordinate information. And the document database retrieving means 107 receives the facility information and/or the place information from the map information retrieving means 105 and extracts a document that is delivered to a user by making the received information as keywords. These facilities are ones that users can use or look, and not limited to specific facilities. And the connection relating information includes the facilities, roads, and natural places such as beaches, parks, and mountains.

At the place condition inputting means 101, user interested place information, which is user living place information and/or place information at the places where a user has an interest, and a range condition, which shows a geographic range that is used when information is retrieved, are registered. The user managing means 102 manages an identifier (ID) of each user, and identifies the user and attaches the user ID to the user interested place information and the range condition received from the place condition inputting means 101, and registers the ID attached information in the user interested place database 103. The user interested place database 103 stores the user interested place information and the range condition with the user ID. The map database 104 stores facility names and place names on a map, road information connecting to the facilities and the places, and the connection relating information with the coordination information.

The map information retrieving means 105 receives the user interested place information and the range condition from the user interested place database 103, and retrieves facility names, place names, and so on which match with the received user interested place information and range condition, from the map database 104. The document database 106 stores documents delivering to users. The document database retrieving means 107 receives the facility names and the place names being the retrieved result at the map information retrieving means 105, and retrieves a document, which matches with the retrieved result at the map information retrieving means 105, from the document database 106, by making the retrieved result at the map information retrieving means 105 as keywords. The document informing means 108 informs the user about the retrieved document.

Next, an operation at the first embodiment of the information delivery apparatus of the present invention is explained. FIG. 2 is a diagram showing a data that is inputted to the user interested place database 103 at the first embodiment of the information delivery apparatus of the present invention. A user, who uses the information delivery apparatus, registers his/her interested place information, which includes his/her address and a place name where the user has an interest and wants to obtain information from, individually or combining the both, at the place condition inputting means 101. There are several methods for registering the data. At the present invention, the user inputs the address of a place (user address, user location, or area from which the user wants to obtain information), or points the place on the displaying means 110, on which a map of the desiring place of the user is displayed, by using an interface, and the latitude and longitude of the place is obtained by using an existing technology. In this, as the displaying means 110, an LCD, a plasma display, an EL element screen, and a CRT can be used, and as the interface, there is no limitation and any interface can be used, when the user can input his/her information. That is, as the interface, an input device including a pointer can be used, and further as the input device, one of the devices with which the user can input his/her information, such as inputting by a viewing point, by using fingers, and by voice of the user, can be used.

As mentioned above, the user also inputs a range condition that limits the geographic retrieving range for delivering information from the place condition inputting means 101 at the same time when the user inputs the interested place information. Inputting method of this range condition is the same as that of the interested place information, for example, a character string "within a radius of 500 m" is inputted as the range condition. As another inputting method, the user decides a place point on the displaying means 110 and displays a distance range from the place point and decides the range condition by using an interface, or the user selects one of the distance ranges displayed on the displaying means 110 by interacting with the displaying means 110. In this, as the interface, an interface, which can be worked by using voice or by pointing a point, is used. And the user can input the value of the distance range by tapping a keyboard, by using voice, or by selecting one of the values displayed on the displaying means 110.

Next, referring to FIG. 2, the operation registering the interested place information is explained in more detail. As shown in FIG. 2, it is assumed that a place name "7-1, Shiba 5-Chome, Mminato-ku, Tokyo", and a range condition "within a radius of 500 m" are inputted to the place condition inputting means 101, as the interested place information and the range condition. And as shown in FIG. 2, the data registering in the user interested place database 103 consists of "user ID", "place name", "latitude and longitude", and "range condition". At the information delivery apparatus of the present invention, place information, which a user wants to obtain, can be retrieved by that the user inputs the interested place information (a spot or an area). And it is enough that the user only inputs the interested place information including the place name and the range condition by using an inputting means, and the interested place information is not limited to the attribute data such as "7-1, Shiba 5-Chome, Mminato-ku, Tokyo", and "within a radius of 500 m". That is, in case that the interested place information is a data that the user shows an area by using any method, this information can be used. And it is enough that at least one of the attribute data of the "place name" and "latitude and longitude" is inputted, or the combination of the attribute data can be used as the input data. That is, it is not necessary for the user to input "latitude and longitude".

The interested place information inputted at the place condition inputting means 101 is inputted to the user managing means 102. The user managing means 102 manages a user ID of each user, in order to identify the user who uses the information delivery apparatus. A user identifying means can be provided independently of the information delivery apparatus, for example, by that the user logs-in the information delivery apparatus by a process using an ID and a password issued for each user. In this, in order to prevent a person from illegally accessing to a server, the user identifying means (not shown) is provided, therefore, the user identifying means, with which the place condition inputting means 101 can connect to the server by using the password or another means, can be provided separately from the server. The user managing means 102 attaches the user ID to the user interested place information and the range condition inputted from the place condition inputting means 101 and registers the ID attached result in the user interested place database 103.

As shown in FIG. 2, the user ID "1234" is shown in a data format registering in the user interested place database 103. In FIG. 2, the user interested place database 103 consists of attribute values of "place name", "latitude and longitude" (these are place information), "user ID", and "range condition". In this, it is enough when at least either attribute value, "place name" or "latitude and longitude" is described as the place information. As mentioned above, the interested place information includes the place information and the range condition, however, there is a case that the interested place information does not include the range condition.

At the embodiments of the present invention, address information is stored in the attribute name "place name" as its attribute value, inputted by using a text data as character information, however, any character information can be used regardless of its data format. And, as mentioned above, when the place information is inputted by using a pointer on a map, the place information is inputted in the attribute name "latitude and longitude" as its attribute value, for example, like as "latitude 35 degrees 38 minutes 45 seconds north, longitude 139 degrees 45 minutes 5 minutes east" instead of the address. In this case, as mentioned above, the value inputted by the pointer can be converted into the latitude and longitude information by using the existing technology, or the latitude and longitude information can be inputted by the character information. Further, it is possible that the user directly inputs this place information, however, in case that the place information is inputted through a place condition inputting means of a mobile communication terminal, the server can receive the present position of the user. As mentioned above, the user can retrieve the information by not inputting directly the present position of the user.

Further, the "range condition" including in the interested place information is not an indispensable item, and when any range condition is not designated, the retrieval can be executed by using "range condition" provided beforehand in the information delivery apparatus. For example, a point is made to be the origin and a threshold value is set from the origin, and the "range condition" is decided by using this threshold value. This threshold value can be set to be a radius from the origin. Or a rectangular area can be set as the "range condition" by that plural threshold values are set and the origin is made to be its center. Or the threshold value can be set as that the "range condition" is set to be "within N meters east from a reference point". Or an area including a point can be set to be the "range condition", for example, an address like M-chome, Town, or City, or all areas adjacent to this address is set to be the "range condition" by using the threshold values. As mentioned above, the "range condition" can be defined freely by that the threshold values are not limited to specific values. FIG. 3 is a diagram showing a range condition rule at a third embodiment of the information delivery apparatus of the present invention. As shown in FIG. 3, the range condition rule consists of a range condition type, a range condition expression, and a place expression. And the range condition type includes a distance in a straight line, a route, and a reaching possibility. The distance in a straight line shows a range within a radius of $X meters from a center, and the route shows a range from a route that is designated from a starting point. And the reaching possibility shows ranges within $X minutes on foot, within $X yen of a fare, and within $X requiring minutes from each starting point, and the $X signifies a variable. In this, the third embodiment of the present invention is explained in detail later.

The data to be stored in the user interested place database 103 is expressed by, for example, a data format, in which the attribute name "user ID" and its attribute value "1234" are expressed as a pair, as shown in FIG. 2. FIG. 4 is a diagram showing a range to be retrieved in case that a route is designated as the range condition type in the range condition rules at the third embodiment of the information delivery apparatus of the present invention. As shown in FIG. 4, the attribute value can be shown as a concrete value or a data value "2-3, Z-Cho 1-Chome, Y-city, X prefecture" as the attribute value of the attribute name "place name". That is, the attribute name shows each item name or data name, and the attribute value shows a concrete value or a data value of the attribute name. At the present invention, a general relational database system can be used to realize the user interested place database 103. That is, a database schema is defined as that each attribute is made to be a field, and one interested place information (at least either the place information or the range condition is included) is expressed by one record. In this case, when a user designates plural places and conditions, plural records are registered with one user ID, or the plural places and conditions are made to be a series of data. The arithmetic operation mentioned above keeps the rule of the relational database system, and the arithmetic operation is realized by that the data are selected, connected, or separated by the arithmetic operation, or by that the arithmetic operation is combined. This relational range is not limited to a range relating to the concepts relating to a dictionary function, and includes the concepts having close relations in the area, and the condition of the relational range can be decided arbitrary. In this, at the embodiments of the present invention, other systems, in which the relational range can be set or the arithmetic operation can be executed, can be used, instead of the relational database system, or the relational database system and other capable systems can be combined. At the explanation mentioned above, processes, with which a user registers his/her interested place information, are explained.

The map information retrieving means 105 works independently of the processes at registering the interested place information by a user mentioned above. First, the map information retrieving means 105 retrieves the user interested place database 103, and obtains the user interested place information and the range condition every registering user ID. As shown in FIG. 2, at the present invention, as the information that the user ID is "1234", "7-1, Shiba 5-Chome, Mminato-ku, Tokyo" is obtained as the place information, and "within a radius of 500 m" is obtained as the range condition. Next, a map region, satisfying the user interested place information and the range condition mentioned above, is retrieved by using the map database 104. In the map database 104, building names, place names, and so on describing in a general map have been already stored with position information, and the map database 104 can be realized by a database equal to the database utilizing by the geographic information system (GIS). That is, at the present invention, any map database, with which a map data can be retrieved under the geographic conditions, such as a distance in a straight line, a neighboring relation, a rectangular area, can be used.

The map information retrieving means 105 obtains a list of building names, place names, shop names, and so on existing in a range to be retrieved by retrieving the map database 104. For example, as the result of the range retrieval under the condition "within a radius of 500 m" from "7-1, Shiba 5-Chome, Mminato-ku, Tokyo", range information such as facility names of "Tamachi Station", "NEC Corporation", and "Tamachi Library", and an address "Shiba 4-Chome, Minato-Ku, Tokyo" is included in the list. The map information retrieving means 105 sends the retrieved result with the user ID to the document database retrieving means 107. This range information includes character information.

The document database retrieving means 107 retrieves a document from the document database 106 by using the retrieved result received from the map information retrieving means 105, preferably by using the character information including in the retrieved result by making the character information as keywords. In the document database 106, documents delivering to users have been stored, and the document can be retrieved by the keywords. As the document database 106, any retrievable document database, in which documents with geographical information have been stored, can be used. And further, Web sites in the WWW can be used as the document database 106. In this case, the Web sites are accessed by using their URLs, or a search engine in the WWW is accessed by using the retrieving function of the document database retrieving means 107. And at the present invention, these retrieving methods can be combined.

The document database retrieving means 107 sends the retrieved result being the document obtained at the processes mentioned above to the document informing means 108 with the user ID. At this sending time, when the keyword used at the document retrieval and the keyword recorded in the document are matched completely, the retrieved result being the document is sent to the document informing means 108. However, even when they are not matched completely, the document can be informed to the user with an expression showing its matching rate by an existing expression such as a % expression. The document informing means 108 informs the user about the retrieved document by referring to the user ID. The document informing means 108 is not limited to a specific means, for example, an e-mail or a facsimile can be used, and also the document can be informed to the user on the Web site directly. And when the user uses the same information delivery apparatus again, the document can be informed to the user again at the next time. Preferably, the document is informed to the user on the Web site directly.

Figure 5:
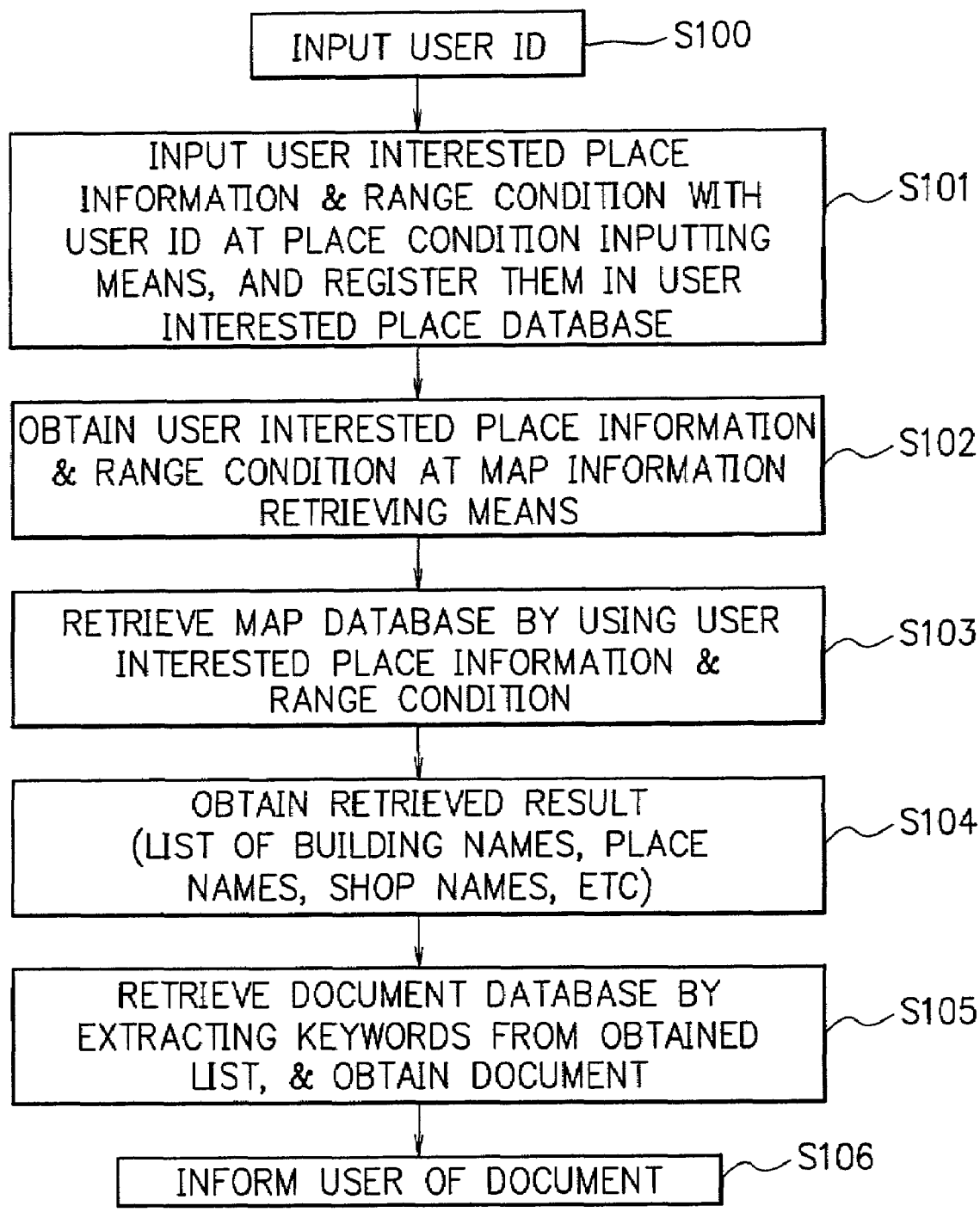
FIG. 5 is a flowchart showing an operation at the first embodiment of the information delivery apparatus of the present invention.

FIG. 5 is a flowchart showing an operation at the first embodiment of the information delivery apparatus of the present invention. Referring to FIGS. 1 and 5, the operation at the first embodiment of the information delivery apparatus of the present invention is explained in detail.

First, a user inputs his/her user ID at the place condition inputting means 101 (step S100). And also the user inputs user interested place information and a range condition at the place condition inputting means 101, and the inputted user interested place information and range condition with the user ID are registered in the user interested place database 103 via the user managing means 102 (step S101). This registration can be executed beforehand at any time by the user. Next, the map information retrieving means 105 obtains the user interested place information and the range condition from the user interested place database 103 every user ID (step S102). And the map information retrieving means 105 retrieves the map database 104 by using the obtained user interested place information and range condition (step S103). With this retrieving process, the map information retrieving means 105 obtains a list of building names, place names, shop names, and so on (step S104). This list is sent to the document database retrieving means 107 with the user ID, and the document database retrieving means 107 retrieves the document database 106 by extracting keywords of character information including in the list, and obtains a document (step S105). The retrieved document is sent to the document informing means 108 and is informed to the user via the receiving means 109 and the displaying means 110 (step S106). With these processes mentioned above, the user can watch the retrieved result being the document by receiving the information directly or via a medium. Preferably, the information is displayed on the displaying means 110.

As mentioned above, at the first embodiment of the present invention, at the step S100, the user is identified, and at the step S101, the user interested place information and the range condition are inputted by the user, and the user interested place information and the range condition are registered, and at the steps S102 to S105, the document related to the geographic information of the user interested place information and the range condition is retrieved, and at the step S106, the information being the retrieved document is informed to the user. In this, in case that the user interested place database 103 is in the client, the user ID is attached after the step S101. Identifying the user ID is executed at an input port of the server. The user ID is not limited to character information such as Arabic numerals, alphabets, and Chinese characters, for example, the voice print and the fingerprint of the user, with which a user can be identified, can be used as the user ID. And further, in case that the user ID satisfies the identification of each user, any means, which identifies each user, can be used. For example, an individual user can be identified by reading a physical change of the user by electrically, magnetically, or optically, and this can be used as the user ID. And in case that the same interested place information is registered by plural users in the user interested place database 103, the interested place information is made to be shared information among the plural users with plural user IDs, and the storage capacity of the user interested place database 103 can be used effectively, and the retrieving time can be reduced.

As mentioned above, at the first embodiment of the present invention, a user can obtain information by limiting a physical distance range from a place where the user registered. Further, any process is not required by the user for the document database 106, therefore, the total structure can be simplified. As the document database 106, existing databases can be utilized and also some of the existing databases can be combined arbitrary and used.

Next, referring to the drawings, a second embodiment of the information delivery apparatus of the present invention is explained. FIG. 6 is a block diagram showing the second embodiment of the information delivery apparatus of the present invention. At the first embodiment shown in FIG. 1, in the means and databases of which the information delivery apparatus are composed, the means and databases except the receiving means 109 and the displaying means 110 are provided in the server. However, at the second embodiment, the information delivery apparatus is divided into a server and a client (user), and the server and the client are connected with each other. In this, actually, as mentioned above, plural clients are connected to the server, however, in order to make the explanation concise, one client is used at the second embodiment.

As shown in FIG. 6, the client and server are connected with wired communication channels or radio communication channels. In case of FIG. 6(1), the client provides the place condition inputting means 101, the receiving means 109, and the displaying means 110. And the server provides the user managing means 102, the user interested place database 103, the map database 104, the map information retrieving means 105, the document database 106, the document database retrieving means 107, and the document informing means 108. In this, the following structure can be also applied. That is, the map database 104 and the document database 106 are not provided in the server, and are provided separately from both the client and the server, and are connected to the server with communication channels. Consequently, the server provides the user managing means 102, the user interested place database 103, the map information retrieving means 105, the document database retrieving means 107, and the document informing means 108. Further, the server provides at least the map information retrieving means 105 and the document database retrieving means 107, and, preferably provides the document informing means 108. This structure of the server can be used at other embodiments.

In case of FIG. 6(2), the client provides the place condition inputting means 101, the user interested place database 103, the receiving means 109, and the displaying means 110. And the server provides the user managing means 102, the map database 104, the map information retrieving means 105, the document database 106, the document database retrieving means 107, and the document informing means 108. In this case, identifying the user ID is executed after the registration of the user interested place information and the range condition at the user managing means 102 in the server. At the second embodiment, as mentioned above, the map database 104 and the document database 105 can be provided independently of the server and used via a network.

And also, the user managing means 102 can be provided independently of the server, in this case, after identifying the user ID of the client at the user managing means 102, the client is connected to the server. Further the user interested place database 103 can be provided independently of both the server and the client. In this case, after the user managing means 102 matched the user ID with ID data storing in the user managing means 102, the client accesses to the server. And when the client accessed the server once, the server does not need to match the user ID with the user managing means 102 again, and the server and client can connect with the user interested place database 103 via the Internet. As mentioned above, at the second embodiment of the present invention, the user interested place database 103, the map database 104, and the document database 106 are provided in the server, or are provided at the outside of the server and the client, and are connected to the server and/or the client via the Internet.

In case of FIG. 6(1), at the steps S100 and S101 shown in FIG. 5, the user ID and the user interested place information and the range condition are inputted at the place condition inputting means 101 in the client, and are registered in the user interested place database 103 via the user managing means 102 in the server. After this, at the step S 102 to the step S106 are executed in the server, and the document informing means 108 in the server sends the document to the receiving means 109 in the client.

In case of FIG. 6(2), the step S101 is executed in the client except the user ID identification, after this, the user ID is identified at the user managing means 102 in the server, and the following steps are the same as those mentioned at the case of FIG. 6(1).

Figure 7:
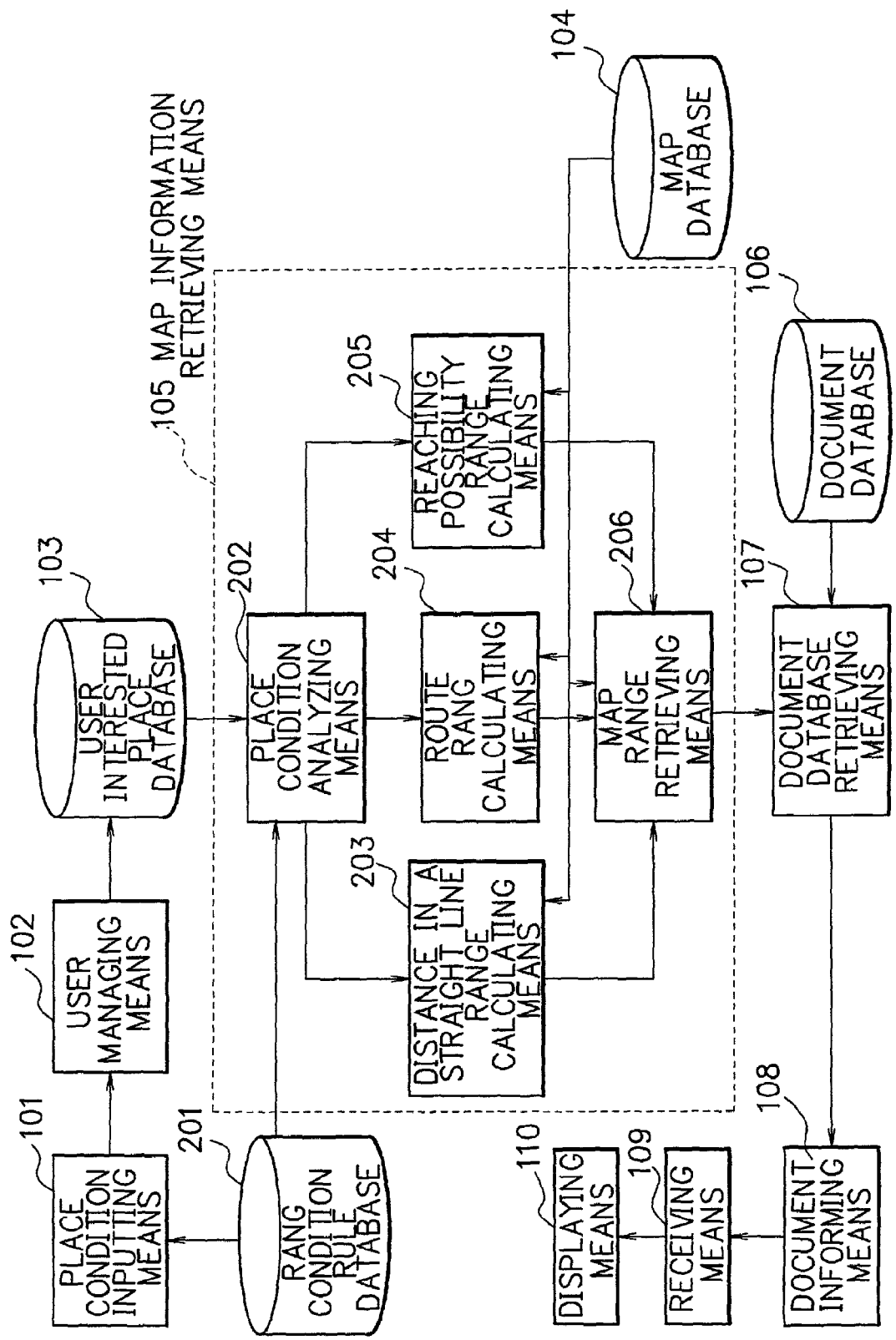
FIG. 7 is a block diagram showing a structure at the third embodiment of the information delivery apparatus of the present invention.

Next, referring to drawings, the third embodiment of the information delivery apparatus of the present invention is explained. FIG. 7 is a block diagram showing a structure at the third embodiment of the information delivery apparatus of the present invention. At the structure of the third embodiment, in addition to the means and databases at the first embodiment, a range condition rule database 201 is added. Further, the map information retrieving means 105 consists of a place condition analyzing means 202, a distance in a straight line range calculating means 203, a route range calculating means 204, a reaching possibility range calculating means 205, and a map range retrieving means 206. And the place condition analyzing means 202 and the place condition inputting means 101 are connected to the range condition rule database 201.

At the third embodiment, as the place condition, a function, which designates a distance, a route, requiring time, and so on, is added to the functions of the first embodiment. And the range condition rule database 201 has range condition rules that a user can designate.

The map information retrieving means 105 receives user interested place information and range conditions (at least one of range conditions of a distance, a route, time and a fare, from a place) from the user interested place database 103. The "a distance in a straight line from a place" is the same range condition used at the first embodiment. The "a route" is used as a concept including a continuous region such as a road including more than one place. And the "time" signifies a certain time from a starting point and is used for the time under several conditions. And the "a fare" is used as expenses that are consumed to reach a point from the starting point. For example, a transportation fare, an admission fee, and a participation fee are included in the "a fare", further, fees such as a guide charge and a service charge calculated under certain conditions are also included in the "a fare".

The place condition analyzing means 202 analyzes the received user interested place information and range condition by referring to rule information registering in the range condition rule database 201, and sends the user interested place information and the range condition to each corresponding range calculating means.

When the distance in a straight line range is designated as the range condition, the distance in a straight line range calculating means 203 receives the user interested place information and the range condition from the place condition analyzing means 202, and calculates a range within a radius of a designated meter from a designated place by making the designated place as its center. At the third embodiment of the present invention, it is explained that the range is calculated by using a radius from a certain place, however, as mentioned above, the distance in a straight line range calculating means 203 can calculate the range by using "distances from a certain place" and can make the range a rectangular range.

When the route is designated as the range condition, the route range calculating means 204 receives the user interested place information and the range condition from the place condition analyzing means 202, and calculates a range along a designated route. When the reaching possibility is designated as the range condition (for example, "time" and "a fare"), the reaching possibility range calculating means 205 receives the user interested place information and the range condition from the place condition analyzing means 202, and calculates a reaching possibility range under given conditions. And the map range retrieving means 206 receives range information from at least one of the distance in a straight line range calculating means 203, the route range calculating means 204, and the reaching possibility range calculating means 205, and retrieves building names, place names, and shop names, and so on including in the received range information by using the map database 104.

At the explanation mentioned above, the place condition analyzing means 202 sends the user interested place information and the range condition to one of the range calculating means. However, the place condition analyzing means 202 can send them to one or more the range calculating means of the distance in a straight line range calculating means 203, the route range calculating means 204, and the reaching possibility range calculating means 205. And the map range retrieving means 206 can receive plural range information from more than one of the range calculating means. That is, the data input and output inside the map information retrieving means 105 can be set arbitrary.

Next, an operation of the third embodiment is explained. The processes, which a user inputs his/her interested place information and a range condition with the user ID, is the same as that at the first embodiment. However, in order to make that plural range conditions are designated possible, the place condition inputting means 101 reads range condition types from the range condition rule database 201, and sends the range condition types of the range condition rules to the user.

As shown in FIG. 3, the range condition rule database 201 provides the range condition types, and the range condition expressions and the place expressions corresponding to the range condition types, which the user can choose. FIG. 3 is an example of the range condition rules storing in the range condition rule database 201. As shown in this example, it is defined what expression is used for each range condition expression and place expression corresponding to each range condition type. For example, in case that a reaching possibility on foot is designated as the range condition type, the range condition expression is described as "within 10 minutes on foot" by the definition of the range condition expression "within $X minutes on foot", and information of a point is stored as an attribute value of the place name or the latitude and longitude, by the information of the place expression "point". In this, the expression "$X" signifies a variable on the rule. And in case that a route is designated as the range condition type, a character string "designating route" is stored, and a list of plural place information is stored as an attribute value of the place name or the latitude and longitude.

Next, cases, in which a user, whose user ID is "5678", designates the following three place conditions (user interested place information and range condition) via the place condition inputting means 101, are explained. A first case is its place condition is "distance in a straight line" and "within a radius of 500 m" from "2-3, Z Cho 1-Chome, Y City, X Prefecture". And a second case is its place condition is "route" and the route is from "2-3, Z Cho 1-Chome, Y City, X Prefecture" to "6-7, Z Cho 5-Chome, Y City, X Prefecture". And a third case is its place condition is "reaching possibility" and "within 15 minutes on foot" from "2-3, Z Cho 1-Chome, Y City, X Prefecture". FIG. 8 is a diagram showing an example of data storing in the user interested place database 103 at the third embodiment of the information delivery apparatus of the present invention. And as shown in FIG. 8, the three cases mentioned above are shown in FIG. 8.

The map information retrieving means 105 reads the place conditions shown in FIG. 8 storing in the user interested place database 103 every user ID, and retrieves building names, place names, and so on, on a map in the map database 104 based on the place conditions, and sends the retrieved results to the document database retrieving means 107. The processes being different from the first embodiment are that different range calculating means 203, 204, and 205 shown in FIG. 7 are used corresponding to range condition types of the range conditions at the third embodiment, in order to process the plural place conditions.

In more detail, first, the place condition analyzing means 202 in the map information retrieving means 105 reads the place conditions (the user interested place information and the range condition with the user ID) storing in the user interested place database 103 every user ID. In this, the range condition is the one read from the range condition rule database 201 shown in FIG. 8. And the place condition analyzing means 202 confirms whether the range condition type is "distance in a straight line", "route", or "reaching possibility" from the read range condition type of the range condition in the place condition, by referring to the range condition rule database 201. In case that the range condition type is "distance in a straight line", the place condition analyzing means 202 sends the place condition with the user ID to the distance in a straight line range calculating means 203. As the same as the case mentioned above, in cases that the range condition types are "route" and "reaching possibility", each corresponding place condition with user ID is sent to the respective range calculating means.

In case that the range condition of the read user interested place information is the first case in which the "distance in a straight line" was designated, the distance in a straight line range calculating means 203 calculates a map range to be retrieved based on the place condition. For example, the distance in a straight line range calculating means 203 converts the place name information "2-3, Z Cho 1-chome, Y City, X Prefecture" into latitude and longitude information by using the map database 104, and obtains the circle range data of the "within a radius of 500 m" based on the converted latitude and longitude information, and sends the obtained data with the user ID to the map range retrieving means 206.

In case that the range condition of the read user interested place information is the second case in which the "route" was designated, the route range calculating means 204 calculates a map range to be retrieved based on the place condition. For example, the route range calculating means 204 calculates a route which passes through plural points given by the range condition and obtains a set of rectangular regions having a certain width along the route, and sends the obtained the set of rectangular regions with the user ID to the map range retrieving means 206. This set of rectangular regions is shown in FIG. 4. In FIG. 4, the area, which has a certain width "d" along the calculated route, is the area to be retrieved. In this, it is not necessary that the width "d" is set to be the same value in all along the route, for example, at a part along the route, the width "d" can be set to be, for example, 1.5 times of a road width of a road being the part of the route.

In order to calculate the route, several existing methods can be used, for example, a route searching system using at a car navigation system can be used. With this, route information between plural points can be obtained.

In case that the range condition of the read user interested place information is the third case in which the "reaching possibility" was designated, the reaching possibility range calculating means 205 calculates a map range to be retrieved based on the place condition. That is, the reaching possibility range calculating means 205 calculates a reaching possible distance by using the condition "within 15 minutes on foot", and obtains a set of reaching possible routes from the place name information "2-3, Z Cho 1-Chome, Y City, X Prefecture" by using this calculated distance and road connecting information in the map database 104. And as the same that the route range calculating means 204 obtained, the reaching possibility range calculating means 205 obtains a set of rectangular regions having a certain width and sends the obtained the set of rectangular regions with the user ID to the map region retrieving means 206. At the calculation of the reaching possible distance on foot, generally, the distance can be calculated by that the standard walking speed of a person is 4 km/hour. In this, the distance can be also calculated by not only using the standard walking speed but also adding the conditions of age of the person and the geographical conditions such as the undulation of a land and further adding average time crossing a road. Further, the distance can be calculated by that a walking speed is calculated by considering the undulation of the land by using the map database 104.

As the conditions signifying the reaching possibility, in addition to the reaching possible distance, there are a fare that includes a transportation fare by a bus, a taxi, a train, and so on, and a requiring time that is taken by on foot, a bicycle, a motor cycle, a car, and so on. For example, an area (for example, a rectangular area) along the reaching possible routes under a give condition can be calculated by using timetable data issued by transportation facilities and the map data.

The map range retrieving means 206 receives the user interested place information and the range condition being the map range data to be retrieved from at least one of the distance in a straight line range calculating means 203, the route range calculating means 204, and the reaching possibility range calculating means 205. After this, the map range retrieving means 206 retrieves the map database 104 and obtains building names, place names, shop names, and so on existing in the range. This operation is the same at the first embodiment, therefore, the same explanation is omitted. And also, the processes at the document database retrieving means 107 and the document informing means 108 are the same at the first embodiment, therefore, the same explanation is also omitted.

As mentioned above, a user can obtain information relating to a place where the user had an interest, under the conditions that the user designates a distance, a requiring time, or a fare from his/her location or from the place where the user had the interest. Further under the conditions that the user designates routes such as a user usually passing through route, or a route which the user desires to retrieve, the user can obtain the information relating to the place. In other words, the user can obtain the information of the place from where the user desires to have the retrieved result under the conditions that a specific point is made to be a starting point, or that a range from routes is designated.

Figure 9:
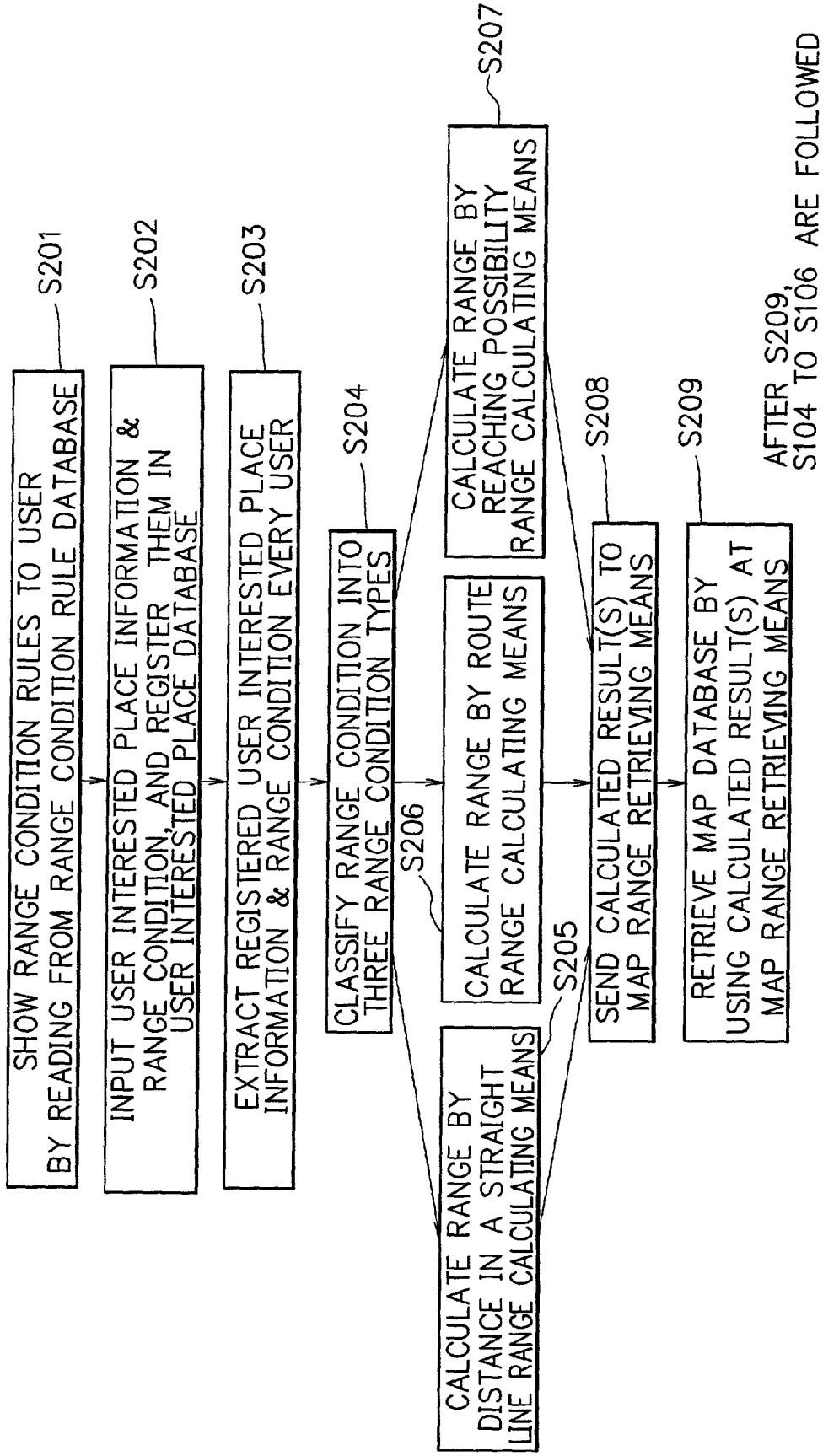
FIG. 9 is a flowchart showing an operation at the third embodiment of the information delivery apparatus of the present invention.

FIG. 9 is a flowchart showing an operation at the third embodiment of the information delivery apparatus of the present invention. Referring to FIGS. 3, 7, and 9, the operation at the third embodiment of the information delivery apparatus of the present invention is explained.

First, the place condition inputting means 101 reads the range condition rules shown in FIG. 3, in which range condition types, range condition expressions, and place expressions are stored, from the range condition rule database 201, and shows the read range condition rules to a user (a first client) (step S201). The user inputs necessary conditions at the place condition inputting means 101 by referring to the shown range condition rules, and registers user interested place information including place information and a range condition in the user interested place database 103 via the user managing means 102 (step S202). The place condition analyzing means 202 extracts the user interested place information and the range condition every user ID from the user interested place database 103 (step S203). The place condition analyzing means 202 classifies the range condition in the extracted place condition into three range condition types, by referring to the range condition rule database 201 (step S204). At the third embodiment of the present invention, the range condition is classified into three range condition types, that is, a distance in a straight line, a route, a reaching possibility. In this, the range condition that is inputted by the user is one or plural, and the range condition is calculated at the distance in a straight line calculating means 203, the route range calculating means 204, or the reaching possibility range calculating means 205 respectively, by referring to the map database 104 (steps S205, S206, and S207). In this, in case that plural range condition types are used, the plural of the range calculating means 203 to 205 refer to the map database 104. The calculated range and the user interested place information are sent to the map range retrieving means 206 (step S208). The map range retrieving means 206 retrieves the map database 104 by using the calculated range and the user interested place information (step S209). After the step S209, the steps S104 to S106 at the first embodiment are also applied to the third embodiment, and the retrieved document is informed to the user.

The third embodiment consists of the user identification (the step S100, not shown) that is the same at the first embodiment, the range condition is shown (the step S202), the registration of the user interested place information including the range condition and the classification of the range condition (the steps S203 to S207), and the retrieval of the map database (the steps S208 and S209), and after this, the retrieved document is informed to the user (the steps S104 to S106). At the third embodiment, the identification of the user ID is executed by the same step at the first embodiment being before the step S201, however, the identification of the user ID can be executed after the step S 201. For example, as shown in FIG. 6(2) at the second embodiment, in case that the user interested place database 103 is included in the client and the user managing means 102 is included in the server, preferably, the user identification is executed right after the step S202. And as shown in FIG. 6(1), in case that both of the user interested place database 103 and the user managing means 102 are not included in the client, the user identification is executed in between the step S202 at the user managing means 102, when the client (user) accessed to the server.

At the third embodiment, as the same as at the second embodiment, the structure can be divided into a server and a client. That is, only the map information retrieving means 105, the document database retrieving means 107, and the document informing means 108 are provided in the server, and remaining the place condition inputting means 101, the user managing means 102, the user interested place database 103, the map database 104, the document database 106, and the range condition rule database 201 are provided in the client in addition to the receiving means 109 and the displaying means 110. With this structure, the client connects to the server via a network.

And also, the server provides the map database 104, the map information retrieving means 105, the document database 106, the document database retrieving means 107, and the document informing means 108, and the client provides the place condition inputting means 101, the user managing means 102, the user interested place database 103, and the range condition rule database 201, in addition to the receiving means 109 and the displaying means 110, this structure is also possible.

And also, the server provides the user managing means 102, the map database 104, the map information retrieving means 105, the document database 106, the document database retrieving means 107, and the document informing means 108, and the client provides the place condition inputting means 101, the user interested place database 103, and the range condition rule database 201, in addition to the receiving means 109 and the displaying means 110, this structure is also possible.

And also, the server provides the user managing means 102, the user interested place database 103, the map database 104, the map information retrieving means 105, the document database 106, the document database retrieving means 107, and the document informing means 108, and the client provides the place condition inputting means 101, the receiving means 109, the displaying means 110, and the range condition rule database 201, this structure is also possible.

In this, the user interested place database 103 can be provided independently of the server and client. And also the user managing means 102 can be provided independently of the server and client, in this case, the client connects to the server after that the user ID was identified at the user managing means 102.

And at the third embodiment, the user interested place database 103, the map database 104, the document database 106, and the range condition rule database 201 can be provided independently of the server and the client. And when the server or the client accesses to its necessary database, these databases are utilized. For example, in case that the user interested place database 103 is provided independently of the server and the client, the client accesses to the server after the client matched its user ID with data in the user managing means 102. And after the client accessed to the server, the server does not need to match the user ID with the user managing means 102, and after the identification of the user ID, the user interested place database 103 is connected to the server and the client. This is also possible. As mentioned above, these databases can be provided in the server, or independently of the server and the client and are connected to the server and the client via a network such as the Internet. At the third embodiment, the range condition rule database 201 is newly added, and this range condition rule database 201 can be provided in the server, at this time, at the step S201, a process, in which the range condition rule database 201 in the server shows the range condition rules to the place condition inputting means 101 in the client, is newly added.

Figure 10:
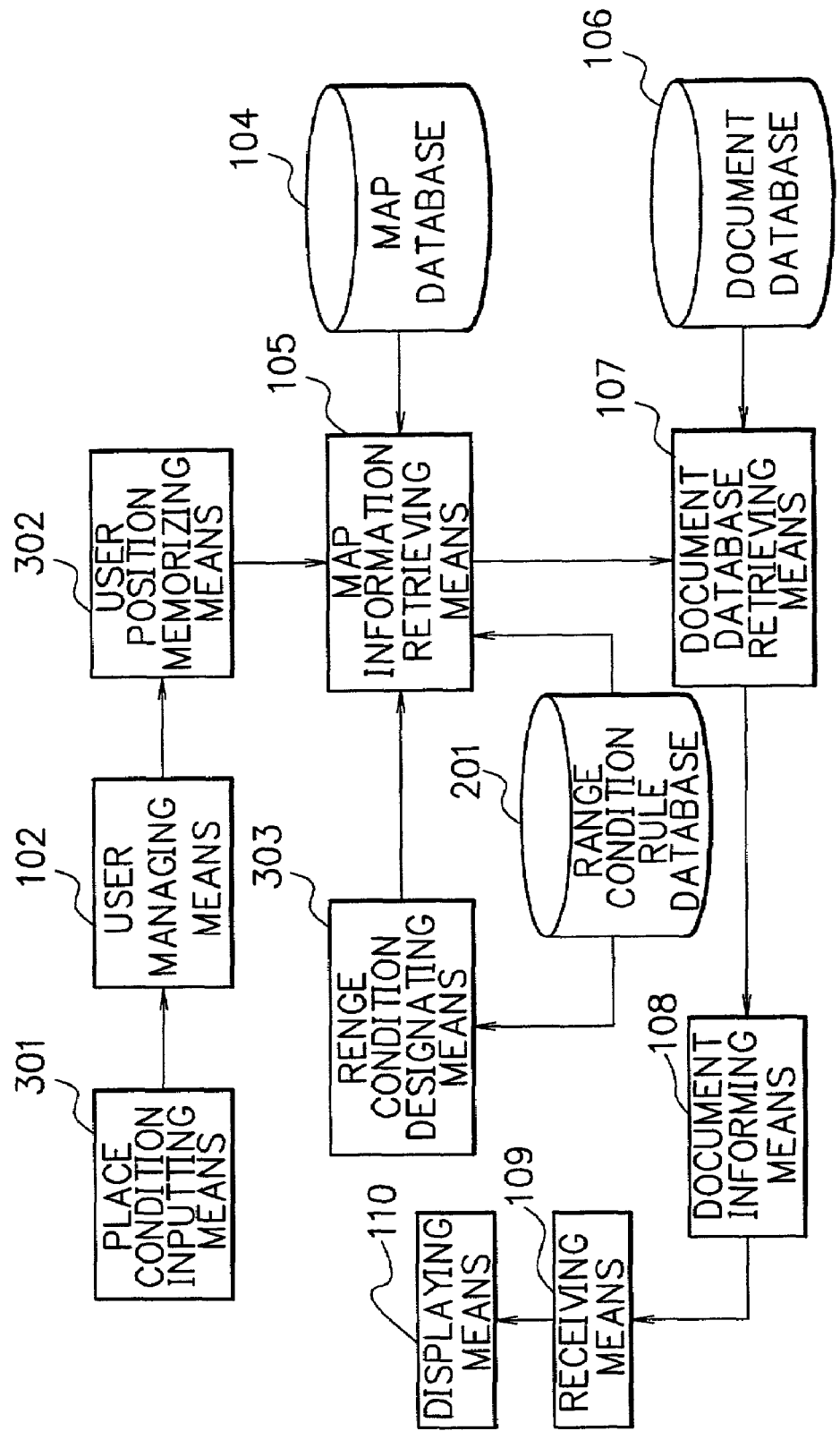
FIG. 10 is a block diagram showing a structure at a fourth embodiment of the information delivery apparatus of the present invention.

FIG. 10 is a block diagram showing a structure at a fourth embodiment of the information delivery apparatus of the present invention. Referring to FIG. 4, the fourth embodiment of the information delivery apparatus of the present invention is explained. At the fourth embodiment of the present invention, compared with the first and third embodiment, a place designated by a user (user interested place) and its range condition are obtained at real time, and information matching with the designated place and the range condition is delivered to the user, this function is newly added.

As shown in FIG. 10, at the fourth embodiment of the present invention, compared with the third embodiment shown in FIG. 7, a place obtaining means 301, a user position memorizing means 302, and a range condition designating means 303 are provided, instead of the place condition inputting means 101 and the user interested place database 103 at the third embodiment. The place obtaining means 301 obtains a place designated by a user at real time. The user position memorizing means 302 obtains designated place information of the user and the user ID from the place obtaining means 301 via the user managing means 102, and memorizes the received information by combining the place information and the user ID. At the range condition designating means 303, the user designates a range condition for the present position of the user at real time.

Next, an operation of the fourth embodiment of the present invention is explained. The place obtaining means 301 is a means that obtains a place designated by a user at real time or virtually. For example, at the place obtaining means 301, a map is displayed on a terminal and the user can obtain the user position that is changed in the passage of time by a user position pointer that moves in the passage of time. And also the user can input the present position of the user and a place where the user wants to visit on the screen of the terminal of the place obtaining means 301, by moving the user position pointer or inputting letters (characters). In this, the terminal is one of terminals that can connect to the Internet such as a mobile communication terminal, a personal computer, and so on. And the map displaying on the terminal is a two-dimensional plane map or a three-dimensional map. And the user can obtain the moving present position of the user at real time on the three-dimensional map reproduced an actual scene by moving the user position pointer. Further, the user can obtain the present position of the user at real time by using a global positioning system (GPS) apparatus (including D-GPS), by not inputting the present position of the user. At the first to third embodiments, the user inputs his/her position frequently in the passage of time at the place condition inputting means 101, and the server receives the changing present position of the user in order, and the server informs the user about retrieved result information (document) corresponding to the changing position of the user. This is possible at the first to third embodiments.

The user managing means 102 attaches the user ID every user to the position information of the user inputted from the place obtaining means 301, and sends the information attached the user ID to the user position memorizing means 302. The user position memorizing means 302 memorizes the position information of the user with the user ID received from the user managing means 102, and informs the map information retrieving means 105 about the position information of the user every time when new position information of the user is informed from the place obtaining means 301 via the user managing means 102. In this, the position information of the user can be expressed by the latitude and longitude. The range condition designating means 303 obtains a usable range condition rule, in which range condition types, range condition expressions, and place expressions are described, from the range condition rule database 201, and shows the usable range condition rule to the user. The user inputs his/her range condition by using the range condition rule at the range condition designating means 303. The range condition inputted from the user is sent to the map information retrieving means 105. After this, the processes at the map information retrieving means 105, the document database retrieving means 107, the document informing means 108, the receiving means 109, and the displaying means 110 are the same at the first to third embodiments.

That is, the map information retrieving means 105 receives the present position of the user from the user position memorizing means 302 and the range condition designated by the user from the range condition designating means 303, and retrieves a range on a map based on the place condition (the present position and the range condition), and obtains building names, place names, shop names, and so on including in the range. Next, the document database retrieving means 107 retrieves a document in the document database 106 by using the retrieved result at the map information retrieving means 105, and shows the retrieved document to the user via the document informing means 108, the receiving means 109, and the displaying means 110. The difference between the fourth embodiment and the first to third embodiments is that the processes from the map information retrieving means 105 to the document informing means 108 are executed at real time every time when the new position information of the user is informed from the user position memorizing means 302.

Figure 11:
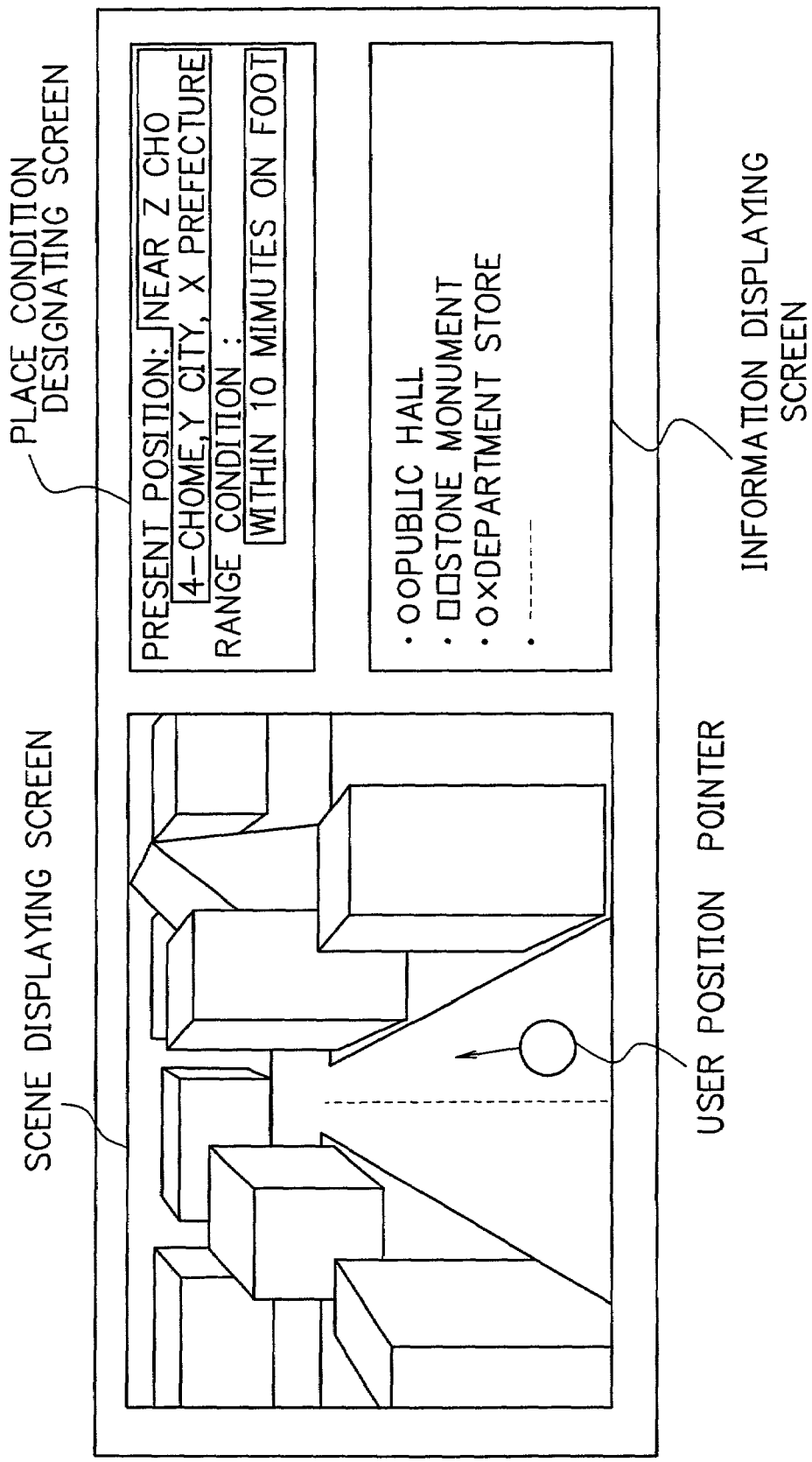
FIG. 11 is a diagram showing a user interface by a three-dimensional expression at a place obtaining means, a range condition designating means, and a map information retrieving means at the fourth embodiment of the information delivery apparatus of the present invention.

FIG. 11 is a diagram showing a user interface by a three-dimensional expression at the place obtaining means 301, the range condition designating means 303, and the map information retrieving means 105 at the fourth embodiment of the information delivery apparatus of the present invention. This screen is displayed when a user accessed to the information delivery apparatus of the present invention by designating an area. And the user designates the present position of the user or a place where the user wants to visit by using the user position pointer on the left side three-dimensional scene displaying screen. This scene displaying screen being the left side of the screen corresponds to the place obtaining means 301.

In the screen mentioned above, the input field described as the place condition designating screen being in the right upper part of the screen corresponds to the range condition designating means 303. And an information displaying screen in the right lower part of the screen shows the retrieved result at the map information retrieving means 105.

The three-dimensional expression of a scene of a place or a town displaying on the scene displaying screen at the present invention can be realized by, for example, Japanese Patent Publication No. HEI 8-16930 "Method to Obtain Three-Dimensional Value Data from Stereo Image Data". As described in this publication, first, a stereo matching (obtaining corresponding points of left and right images) is applied to images obtaining from an aerial photograph or a digital data from an artificial satellite, as the result, a three-dimensional data of a topography is obtained, and the existing technology describing in the publication is applied to the obtained three-dimensional data, and the three-dimensional expression of the scene of the place or the town can be obtained. At the present invention, this existing technology can be used.

However, at the present invention, for example, information of places, where a user may visit in high possibility, is memorized beforehand, and when the user designates one of the places to visit by a pointer, one of the memorized places is extracted and its three-dimensional expression of the place is displayed on the screen. This method can be also used at the present invention.

As mentioned above, the user can obtain the retrieved result of the information geographically relating to the place at real time by that the user makes the position of the user and the range condition change continuously.

Figure 12:
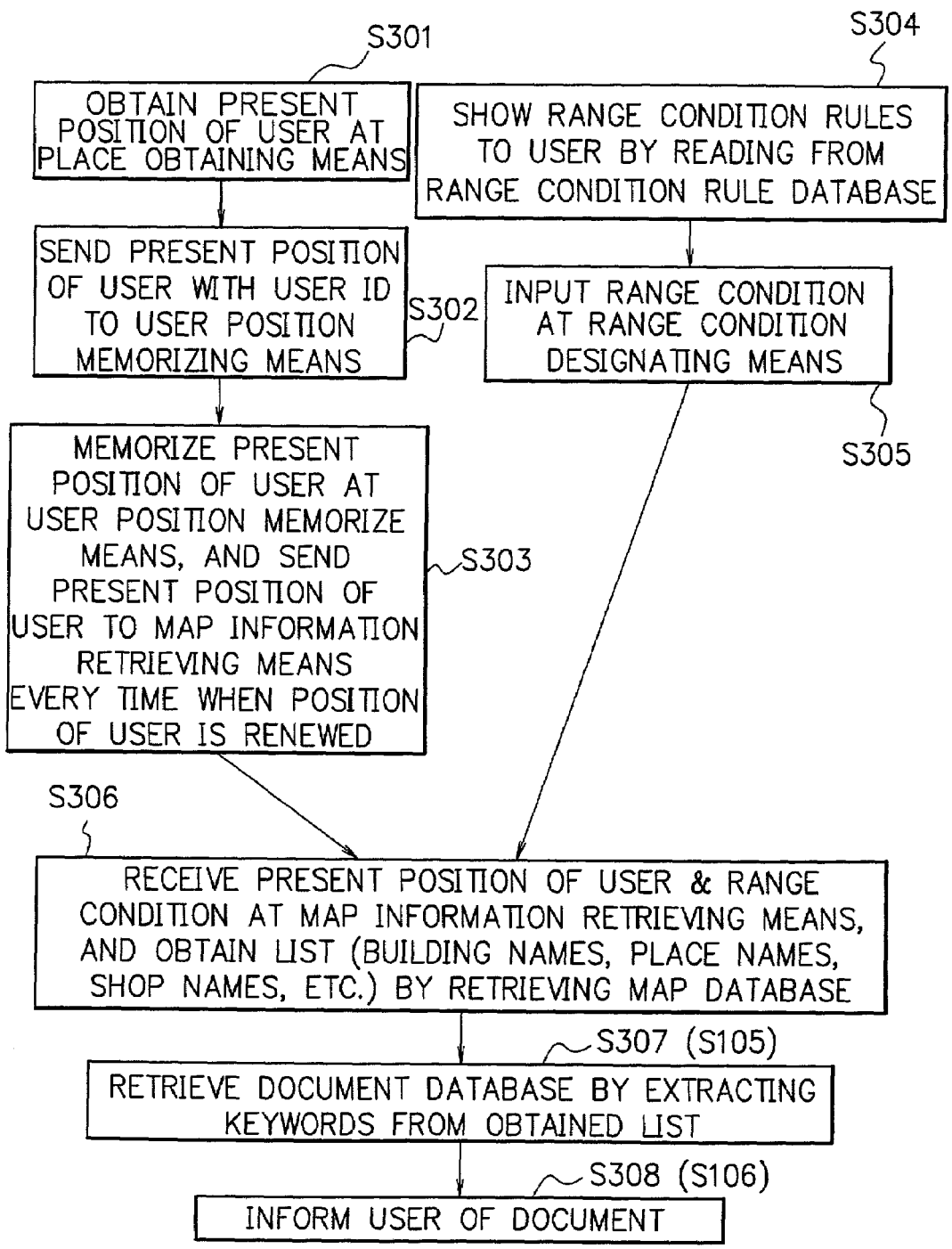
FIG. 12 is a flowchart showing an operation at the fourth embodiment of the information delivery apparatus of the present invention.

FIG. 12 is a flowchart showing the operation at the fourth embodiment of the information delivery apparatus of the present invention. Referring to FIGS. 10 and 12, the operation at the fourth embodiment of the information delivery apparatus of the present invention is explained in detail.

First, when the present position of a user changes in the passage of time, the present position of the user is obtained at the place obtaining means 301 (step S301). The user managing means 102 obtains the present position of the user and identifies the user and and attaches the user ID to the obtained present position of the user, and sends the present position of the user with the user ID to the user position memorizing means 302 (step S302). The user position memorizing means 302 memorizes the position of the user with the user ID and informs the map information retrieving means 105 about the position of the user every time when the position of the user is renewed at the place obtaining means 301 (step S303). Independently of the steps mentioned above, the range condition designating means 303 obtains range condition rules from the range condition rule database 201 and shows the obtained range condition rules to the user (step S304). The user inputs a range condition at the range condition designating means 303 by referring to the range condition rules (step S305). In this, an input instrument that is used by the user is a terminal such as a mobile communication terminal and is not limited to a specific terminal. The map information retrieving means 105 obtains the present position of the user and the range condition, and retrieves a map in the map database 104 and obtains a list being the retrieved result (step S306). As mentioned before, in this list, building names, place names, shop names, and other geographic information are included. The document database retrieving means 107 retrieves a document in the document database 106 by extracting and using keywords from the list (step S307) (the step S105). After this, the informing means 108 informs the user about the document (step S308), as the same as the step S106 at the first embodiment. At the flowchart of the fourth embodiment shown in FIG. 12, the user identification step is omitted. And as shown in FIG. 12, at the fourth embodiment of the present invention, obtaining the present position of the user (the steps S301 to S 303), designating the range condition (the steps S304 and S305), and retrieving geographical information and retrieving a document (the steps S306 and S307), and informing the user about the document (the step S308) were explained.

At the fourth embodiment of the present invention, the case that the position of the user actually changes in the passage of time was explained. However, the fourth embodiment of the present invention can be also applied to a case that the position of a user changes virtually.

And this fourth embodiment can be also applied to the first to third embodiments. For example, at the first to third embodiments, a user renews his/her position continuously at the place condition inputting means 101, and the user interested place database 103 renews the data sending to the map information retrieving means 105 in the passage of time. The map information retrieving means 105 continuously retrieves maps in the map database 104 based on the renewed position of the user. The document database retrieving means 107 retrieves documents in the document database 106 by extracting keywords from the plural retrieved results at the map information retrieving means 105. With this, the same operation as at the fourth embodiment can be applied to the first to third embodiments.

FIG. 13 is a block diagram showing a structure of a fifth embodiment of the information delivery apparatus of the present invention. And also, FIG. 14 is a block diagram showing another structure of the fifth embodiment of the information delivery apparatus of the present invention. Referring to FIGS. 13 and 14, the fifth embodiment of the information delivery apparatus of the present invention is explained.

At the fifth embodiment, as the same as at the second embodiment shown in FIG. 6, the structure is divided into a server and a client. As mentioned above, actually plural clients can be connected to the server, however, in order to make the explanation concise, a case in which one client is used is explained.

As shown in FIG. 13(1), the client provides the place obtaining means 301, the range condition designating means 303, the receiving means 109, and the displaying means 110. And the server provides the user managing means 102, the user position memorizing means 302, the map database 104, the map information retrieving means 105, the document database 106, the document database retrieving means 107, the document informing means 108, and the range condition rule database 201. And as shown in FIG. 13(2), the client provides the user position memorizing means 302, in addition to the structure shown in FIG. 13(1), instead of that the server provides the user position memorizing means 302.

And as shown in FIG. 14(1), the client provides the place obtaining means 301, the user position memorizing means 302, the receiving means 109, and the displaying means 110. And the server provides the user managing means 102, the range condition designating means 303, the map database 104, the map information retrieving means 105, the document database 106, the document database retrieving means 107, the document informing means 108, and the range condition rule database 201. And as shown in FIG. 14(2), the client provides the place obtaining means 301, the receiving means 109, and the displaying means 110, and the remaining means and databases are provided in the server.

At the fifth embodiment shown in FIGS. 13(1) and (2), and 14(1) and (2), the map database 104, the document database 106, and the range condition rule database 201 can be provided independently of the server and the client. In this case, the databases are connected to the server and the client via a network such as the Internet or communication channels, this structure can be also possible.

And also the range condition rule database 201 can be down-loaded into the client from the server, in this case, the newest range condition rules can be down-loaded into the range condition rule database 201 in the client, when the client accesses to the server.

And also, at the fifth embodiment, the server provides the map database 104, the map information retrieving means 105, the document database 106, the document database retrieving means 107, the document informing means 108, and the range condition rule database 201. And the client provides the place obtaining means 301, the user managing means 102, the user position memorizing means 302, the range condition designating means 303, the receiving means 109, and the displaying means 110. This structure is also possible.

And at the structures shown in FIGS. 13(2) and 14(1), the user managing means 102 is disposed behind the user position memorizing means 302. At this structure, the identification of the user ID is executed at the user managing means 102 in the server, after the position of the user was memorized in the user position memorizing means 302. The other processes are the same as those at the fifth embodiment.

And also, the user managing means 102 can be disposed independently of both of the server and the client. In this case, the client being the user matches the user ID at the user managing means 102, after this, the client can be connected to the server.

And in case that the user position memorizing means 302 is not included in both of the server and the client and is connected to the server and the client via a network such as the Internet, the user position memorizing section 302 accesses to the server after matching the user ID with the data registering in the user managing means 102. After this access, the server and the user position memorizing means 302 do not match the user ID again. This is also possible. And the server and the user position memorizing means 302 match the user ID independently, after this, the user position memorizing means 302 is connected to the server via the Internet. This is also possible. As mentioned above, the user position memorizing means 102 can be provided in the server or the client, or can be provided independently of the server and the client and is connected to the server and the client via a network such as the Internet.

The operation at the fifth embodiment of the present invention is the same as that at the fourth embodiment. And in case that the structure shown in FIG. 13(1) is used, the steps S301 and S304 are processed at the client, and in case that the structure shown in FIG. 13(2) is used, the step S303 is processed additionally. And in case that the structure shown in FIG. 14(1) is used, the steps S301 and S303 are processed at the client, and in case that the structure shown in FIG. 14(2) is used, only the step S301 is processed. And the remaining steps are processed at the server.

Figure 15:
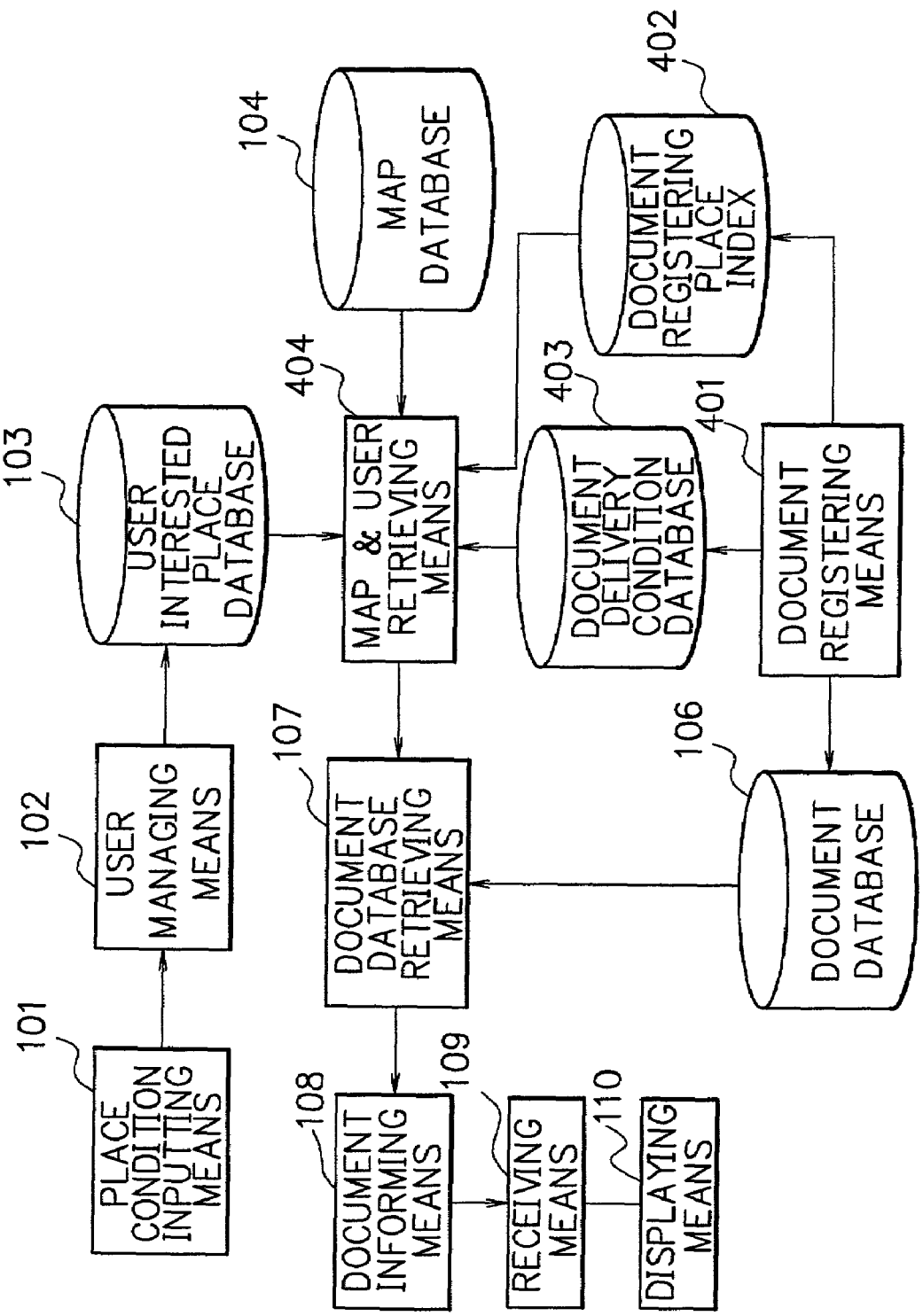
FIG. 15 is a block diagram showing a structure at a sixth embodiment of the information delivery apparatus of the present invention.

Next, referring to the drawing, a sixth embodiment of the information delivery apparatus of the present invention is explained. FIG. 15 is a block diagram showing a structure at the sixth embodiment of the information delivery apparatus of the present invention. At the sixth embodiment of the present invention, a function, which an information supplier can designate conditions at the time when the information supplier delivers document information to a user, is added, compared with the first to fifth embodiments of the present invention.

As shown in FIG. 15, compared with the first embodiment shown in FIG. 1, the structure of the sixth embodiment of the present invention does not provide the map information retrieving means 105, and newly provides a document registering means 401, a document registering place index 402, a document delivery condition database 403, and a map and user retrieving means 404. As mentioned above, the structure of the sixth embodiment mentioned above is different from the first embodiment. Information suppliers register documents that are delivered to users in the document database 106 at the document registering means 401. A relation between a document and its registering delivery place is memorized in the document registering place index 402. Conditions to deliver documents to users are memorized in the document delivery condition database 403. The map and user retrieving means 404, as that the map information retrieving means 105 works at the first embodiment, reads a place where a document has been registered from the document registering place index 402, and also reads a document delivery condition of the document from the document delivery condition database 403, and retrieves the user interested place database 103 by using the read two information, and obtains a list of users who have been registered within a geographic range that meets the conditions.

Next, an operation of the sixth embodiment of the information delivery apparatus of the present invention is explained. First, document information to deliver users such as advertisements is registered in the document database 106 at the document registering means 401 by information suppliers. At this time, the information suppliers register registering delivery places where the information suppliers decide geographic places where the information suppliers desire to deliver the document information, and at the same time register their delivery conditions under which the information suppliers deliver the document information to users. The document registering means 401 issues one document ID for one registering document information. And the document registering means 401 registers a pair of this document ID and the registering delivery place in the document registering place index 402, and also registers a pair of the document ID and the delivery condition in the document delivery condition database 403.

The information of the registering delivery place and the delivery condition at the sixth embodiment corresponds to the information of the interested place information and the range condition of the user at the first embodiment. And as its describing format, for example, as the information of the registering delivery place, building names, place names, a specific spot (for example, inputting by a pointer), shop names, a value of the latitude and longitude, and so on, can be used, as the same as explained at the first to fifth embodiments. For example, a case, which a shop registered a registering delivery place "7-1, Shiba 5-Chome, Minato-Ku, Tokyo" where the shop desires to deliver an advertisement document A, and a delivery condition "within a radius of 1000 m", is explained. This signifies that the advertisement document A is delivered to users who have registered their interested place information within a radius of 1000 m as that "7-1, Shiba 5-Chome, Minato-Ku, Tokyo" is its center. In this, the interested place information of plural users has been registered in the user interested place database 103. The process to register the interested place information is the same that the process explained at the first embodiment.

At the map and user retrieving means 404, the following processes are executed. First, the map and user retrieving means 404 obtains a document ID and document registering delivery place information from the document registering place index 402, and obtains a document delivery condition corresponding to the document ID from the document delivery condition database 403. Second, the map and user retrieving means 404 decides a range where a document is delivered by using the obtained registering delivery place and the delivery condition. Third, the map and user retrieving means 404 retrieves the user interested place database 103 under the condition of the decided range, and obtains a list of the user IDs of the users who have registered their own interested place information in the decided range. Last, the map and user retrieving means 404 informs the document database retrieving means 107 about the obtained list of the user IDs with the document ID.

In case that the range is decided, that is, when it is decided whether the range is matched with the range condition or not, this can be realized by using a function that a general GIS has, in which the user interested place and the document registering delivery place are converted into latitude and longitude information, and calculates a value such as a straight line being necessary at the condition judgement by using the latitude and longitude information. And when a part of the route chosen by the user passes through the range, it can be judged that the range condition was satisfied. As mentioned later, in this case, users can obtain information from an information supplier by a banner advertisement on a Web site, by a digital communication including an e-mail, or a facsimile, and so on.

The document database retrieving means 107 receives the document ID and the list of the user IDs from the map and user retrieving means 404 and retrieves a document corresponding to the received document ID from the document database 106, and informs the document informing means 108 about the retrieved document with the list of the user IDs.

The process at the document informing means 108 is the same at the first embodiment, and the received document is delivered to the users in the list by referring to the user IDs, for example, by an e-mail, or on a Web site. As mentioned at the first embodiment, the document informing means 108 is not limited to a specific means, and an e-mail, on a Web site, other digital communication means, a facsimile can be used as the document informing means 108. Or when the users accessed the Internet, the document can be delivered to the users in its banner advertisement.

Figure 16:
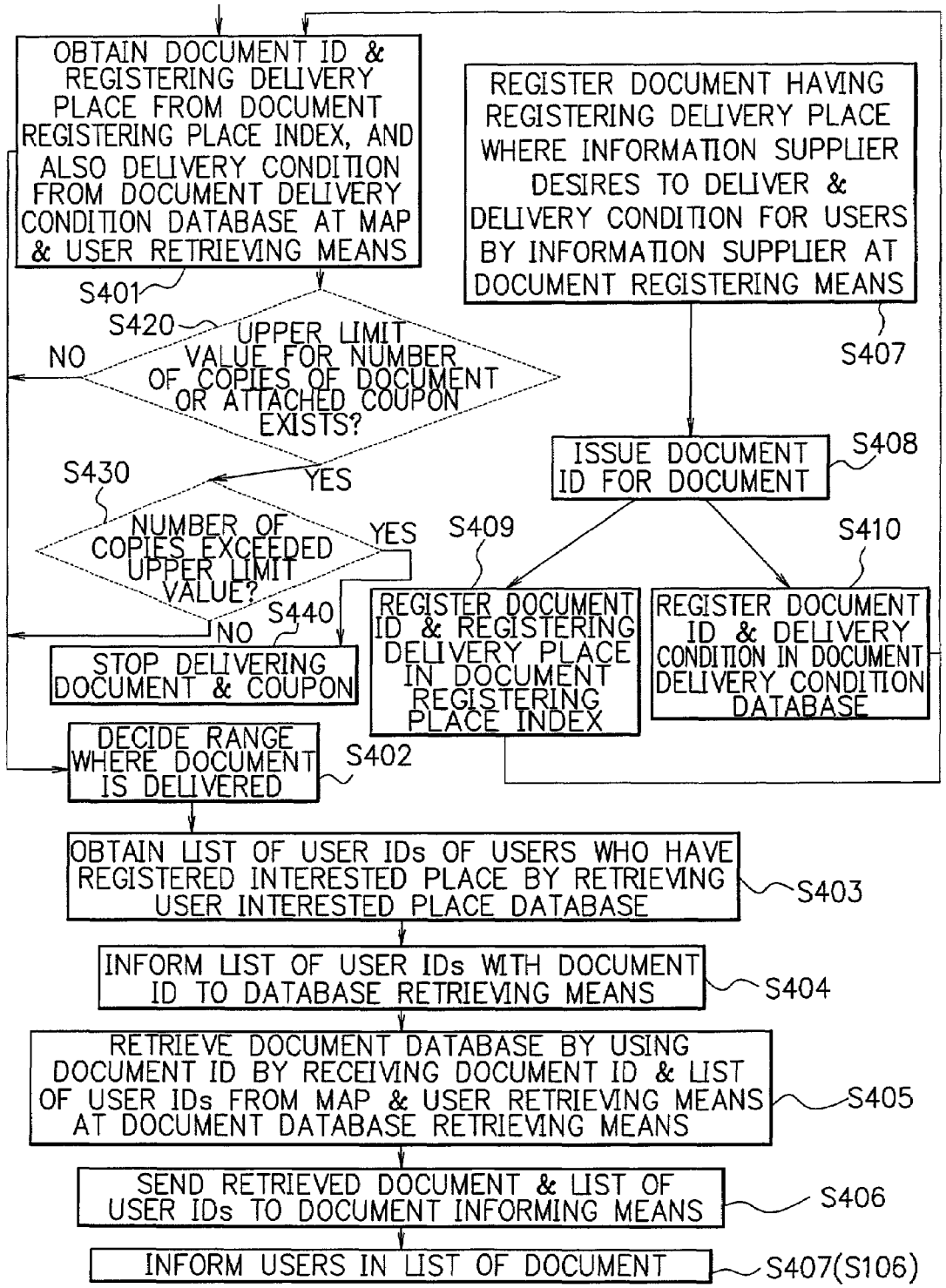
FIG. 16 is a flowchart showing an operation at the sixth embodiment of the information delivery apparatus of the present invention.

FIG. 16 is a flowchart showing the operation at the sixth embodiment of the information delivery apparatus of the present invention. Referring to FIGS. 15 and 16, the operation at the sixth embodiment of the information delivery apparatus of the present invention is explained in detail.

As shown in FIG. 16, an information supplier (a second client) registers information of a document, which has a registering delivery place where the information supplier desires to deliver the information of the document and a delivery condition for users (first clients) in the document database 106 at the document registering means 401 (step S407). The document registering means 401 issues a document ID for the document (step S408). And the document registering means 401 registers the document ID and the registering delivery place of the document in the document registering place index 402 (step S409), and also registers the document ID and the delivery condition in the document delivery condition database 403 (step S410). At this time, in order to keep the security of the information of the document, the document ID is coded or encrypted, or a threshold value is set for the delivery condition, or in case that there is a time limit for the document, a program to delete only the document after the time limit is attached to the document. These additional functions can be added to this operation.

Independently of the document registration mentioned above, the map and user retrieving means 404 obtains the document ID and registering delivery place information from the document registering place index 402, and also obtains the delivery condition of the document from the document delivery condition database 403 (step S401). At this time, in case that the delivery condition of the document has an upper limit or a threshold value for the number of copies of the document, or a coupon is attached to the document, these are confirmed (step S420). When the number of copies of the document exceeded the upper limit value or the threshold value (step S430), the delivery of the document or the coupon is stopped (step S440). At the sixth embodiment of the present invention, the steps S420 to S440 can be omitted.

After the steps mentioned above, the map and user retrieving means 404 decides the range of the delivery of the document by using the obtained registering delivery place and the delivery condition (step S402).

After this, the map and user retrieving means 404 retrieves the user interested place database 103 under the condition of the decided range, and obtains a list of the user IDs of users who have registered the interested place (step S403). And the map and user retrieving means 404 informs the document database retrieving means 107 about the obtained list of the user IDs and the document ID (step S404).

Next, the document database retrieving means 107 receives the document ID and the list of the user IDs, and retrieves the document database 106 by using the document ID (step S405). And the document database retrieving means 107 sends the retrieved result being the document with the list of the user IDs to the document informing means 108 (step S406). And the document informing means 108 informs the users in the list of the user IDs about the document (step S407), this step is the same as the step S106 at the first embodiment, therefore, the same explanation is omitted.

As mentioned above, the operation of the sixth embodiment of the present invention has identifying users (the step S100, not shown), registering the interested place information and range condition (the step S101, not shown), obtaining the document ID, the registering delivery place information, and the delivery condition (the step S401), stopping the delivery of the document (the steps S420 to S440), inputting the delivering information (the steps S407 to S410), extracting the map information and its relating information and obtaining a document (the steps S402 to S406), and informing the document to the users (the step S 407).

As mentioned above, at the sixth embodiment of the present invention, an information supplier can deliver, for example, an advertisement of a shop, which is related to a geographic area, to users neighboring the shop, under that the information supplier sets a geographic delivery condition. At the sixth embodiment, the structure can be divided into a server and a client (user). And the server provides the user managing means 102, the user interested place database 103, the map database 104, the document database 106, the document database retrieving means 107, the document informing means 108, the document registering means 401, the document registering place index 402, the document delivery condition database 403, and the map and user retrieving means 404. And the client provides the place condition inputting means 101, the receiving means 109, and the displaying means 110. This structure is also possible.

Next, a seventh embodiment of the information delivery apparatus of the present invention is explained. FIG. 17 is a block diagram showing a structure at the seventh embodiment of the information delivery apparatus of the present invention. At the seventh embodiment of the present invention, the structure of the sixth embodiment of the present invention is divided into a server and a client (user). As shown in FIG. 17, the client provides the place condition inputting means 101, the user interested place database 103, the receiving means 109, and the displaying means 110. And the server provides the user managing means 102, the map database 104, the document database 106, the document database retrieving means 107, the document informing means 108, the document registering means 401, the document registering place index 402, the document delivery condition database 403, and the map and user retrieving means 404. At the seventh embodiment, the map database 104, the document database 106, the document registering place index 402, and the document delivery condition database 403 can be provided outside of the server, in this case, the server connects to these databases via a network such as the Internet or communication channels.

The operation at the seventh embodiment is almost the same at the sixth embodiment. However, in the flowchart of the sixth embodiment shown in FIG. 16, at the step S403, the user IDs are sent from the user interested place database 103 in the client to the map and user retrieving means 404 in the server, and at the step S407, the retrieved document is sent from the document informing means 108 in the server to the receiving means 109 in the client, at the seventh embodiment. The other steps are mainly processed in the server.

At the seventh embodiment, the structure of the sixth embodiment is divided into the server and the client (user). Further, the structure of the sixth embodiment can be divided into a first client (users who obtain information), a server, and a second client (information suppliers who supply information to the users). FIG. 18 is a block diagram showing another structure at the seventh embodiment of the information delivery apparatus of the present invention.

As shown in FIG. 18, this structure is divided into the first client (user), the server, and the second client (information supplier). The first client is the same structure shown in FIG. 17, and the second client provides the document registering means 401, consequently, the server does not provides the document registering means 401, compared with the structure shown in FIG. 17. When the operation is compared between the structures shown in FIGS. 17 and 18, at the flowchart shown in FIG. 16, since the document registering means 401 is provided in the second client, the steps S407, S409, and S410 are executed between the sever and the second client. Further, the second client can provide a document inputting means 410 and a displaying means 409, in case that the second client provides the document registering means 401.

At the seventh embodiment of the present invention, as the same as at other embodiments, the databases can be provided independently of the server, the first client, and the second client. For example, in case that the user interested place database 103 is not provided in the first client and is provided independently, the first client accesses to the user interested place database 103, after the first client matched its user ID with the ID data registering in the user managing means 102. And after the user ID was matched at the user managing means 102 and the user interested place database 103 accessed to the server, the user interested place database 103 and the server do not need to match the user ID again. Or it is possible that the server and the first client are connected to the user interested place database 103 via the Internet, after the server and the first client matched the user ID independently. As mentioned above, the databases at the seventh embodiment are mainly provided in the server, however, the databases can be provided independently. In this case, the necessary databases are connected to the server, the first client, or the second client via a network such as the Internet.

Figure 19:
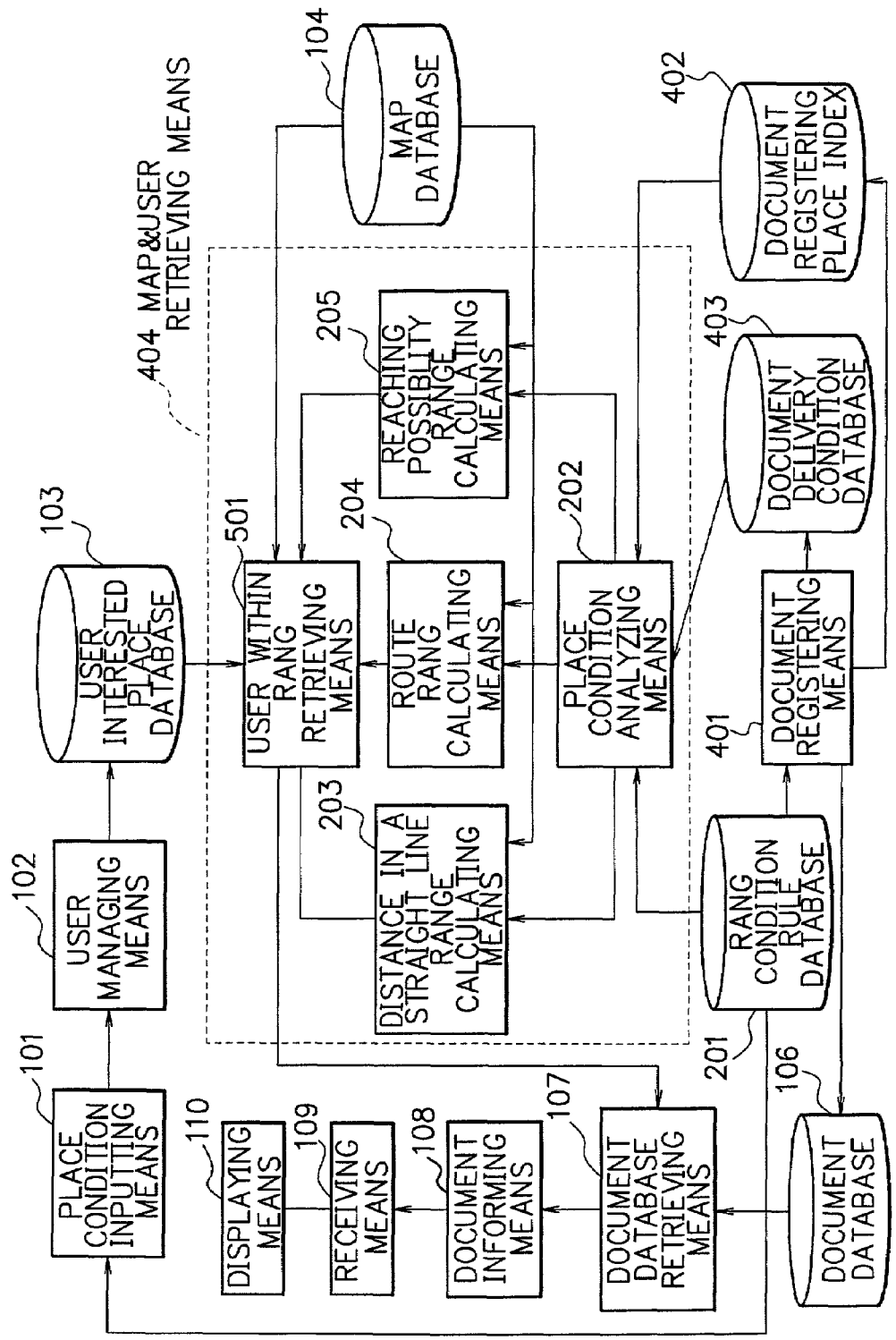
FIG. 19 is a block diagram showing a structure at an eighth embodiment of the information delivery apparatus of the present invention.

Next, referring to the drawings, an eighth embodiment of the information delivery apparatus of the present invention is explained. FIG. 19 is a block diagram showing a structure at the eighth embodiment of the information delivery apparatus of the present invention. At the eight embodiment of present invention, a more detail document delivery condition can be designated, compared with the sixth embodiment of the present invention. As shown in FIG. 19, at the eighth embodiment of the present invention, the map and user retrieving means 404 is structured in more detail, compared with the sixth embodiment shown in FIG. 15. That is, the map and user retrieving means 404 provides the place condition analyzing means 202, the distance in a straight line range calculating means 203, the route range calculating means 204, the reaching possibility range calculating means 205, shown in FIG. 7 at the third embodiment, and a user within range retrieving means 501. Further, the eighth embodiment of the present invention provides the range condition rule database 201 shown in FIG. 7 at the third embodiment. These are different from the sixth embodiment of the present invention at the eighth embodiment of the present invention.

Next, an operation at the eighth embodiment of the information delivery apparatus of the present invention is explained. First, when an information supplier registers a delivery condition in the document delivery condition database 403 by using the document registering means 401, and also registers a place in the document registering place index 402, the information supplier refers to the range condition rules storing in the range condition rule database 201. This is different from the sixth embodiment. And the delivery condition of the document and the registering place corresponds to the range condition and the interested place information at the third embodiment, therefore, their expression format is the same at the third embodiment. Further, the process that the user interested place information is registered in the user interested place database 103 is the same as the process at the third embodiment.

Next, a list of users, who are matched with the delivery condition, is obtained at each means in the map and user retrieving means 404. The processes at the place condition analyzing means 202, the distance in a straight line range calculating means 203, the route range calculating means 204, and the reaching possibility range calculating means 205 are the same at the third embodiment, except that the delivery condition of the document corresponding to the range condition at the third embodiment and the document registering delivery place corresponding to the user interested place information at the third embodiment are received at the eighth embodiment. That is, at the eighth embodiment, a range matching with the conditions is calculated by using the registering delivery place and the delivery condition of the document ID, and the calculated range with the document ID is sent to the user within range retrieving means 501.

The user within range retrieving means 501 receives range information on a map satisfying the delivery condition of the document form one or more of the distance in a straight line range calculating means 203, the route range calculating means 204, and the reaching possibility range calculating means 205. And the user within range retrieving means 501 retrieves an area under the condition of the given range by using the user interested place database 103 and the map database 104 and obtains a list of user IDs of users who have registered their interested place information in spots including in the range, and sends the list of the user IDs with the document ID to document database retrieving means 107. As mentioned at the sixth embodiment, retrieving under the condition of the map range can be realized by using a function of the GIS. At the eighth embodiment, the processes at the document database retrieving means 107 and the document informing means 108 are the same at the sixth embodiment.

Figure 20:
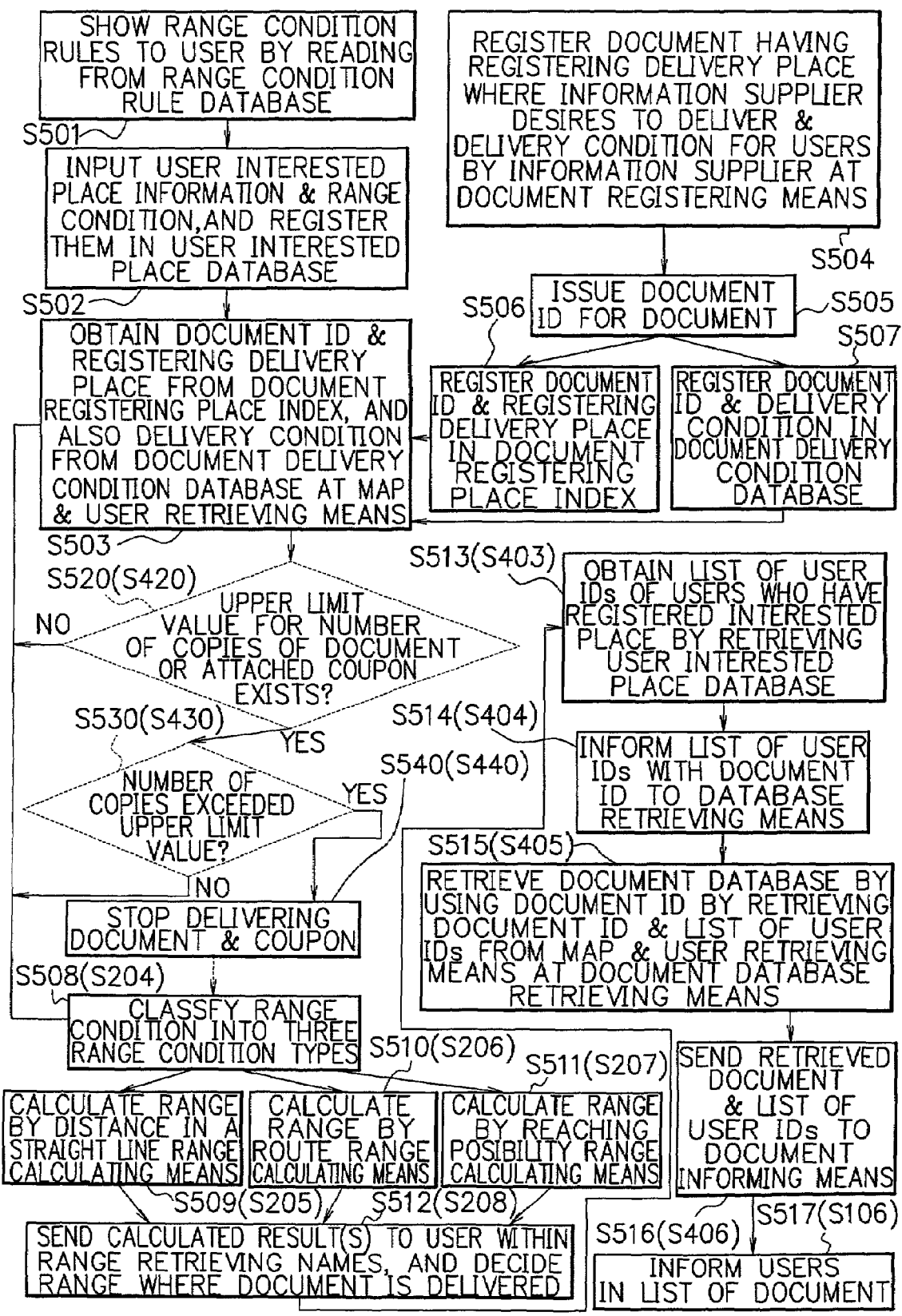
FIG. 20 is a flowchart showing an operation at the eighth embodiment of the information delivery apparatus of the present invention.

FIG. 20 is a flowchart showing the operation at the eighth embodiment of the information delivery apparatus of the present invention. Referring to FIGS. 19 and 20, the operation at the eighth embodiment of the information delivery apparatus of the present invention is explained in detail.

As shown in FIG. 20, an information supplier (a second client) registers a document to be delivered in the document database 106 from the document registering means 401, as the same as at the sixth embodiment. That is, the information supplier registers information of a document having a registering delivery place and a delivery condition for users in the document database 106 (step S504). When the document is registered, the document registering means 401 issues a document ID (step S505). And the document registering means 401 registers the issued document ID and the registering delivery place of the document in the document registering place index 402 (step S506), and also registers the document ID and the delivery condition of the document in the document delivery condition database 403 (step S507).

Independently of the steps mentioned above, the place condition inputting means 101 reads range condition rules from the range condition rule database 201 and shows the range condition rules to a user (step S501). The user received the range condition rules registers user interested place information and a range condition in the user interested place database 103 via the user managing means 102 (step S502). The place condition analyzing means 202 obtains the delivery condition of the document and the document ID from the document delivery condition database 403, and the document registering delivery place and the document ID form the document registering place index 402 (step S503). After this, steps S508 to S512 are processed as the same as the steps S204 to S208 at the third embodiment. And steps S513 to S518 are processed as the same as the steps S403 to S406 at the sixth embodiment, and step S517 is processed as the same as the step S 106 at the first embodiment.

As mentioned above, at the eighth embodiment, the information supplier can deliver information relating to an area by designating the delivery condition of the document in more detail. At the flowchart shown in FIG. 20, the description at the step S100 of the first embodiment is omitted, this identification of a user is generally executed before and after the condition input and the registration (step the S502), after the condition showing (step the S501). However, this identification of the user is not limited to execute at the step mentioned above, and can be executed arbitrary. As mentioned above, at the flowchart of the eighth embodiment, identifying the user (not shown), showing the condition, inputting and registering the condition, stopping the document delivery (steps S520 to S540), calculating the range condition (the steps S508 to S512), inputting information by the information supplier (the second client), retrieving map information, extracting relating document (the step S513 to S516), and informing users of the document (the step S517) are shown. At the eighth embodiment, the structure can be divided into a server, a first client, and a second client, as mentioned at the seventh embodiment in FIG. 18.

Figure 21:
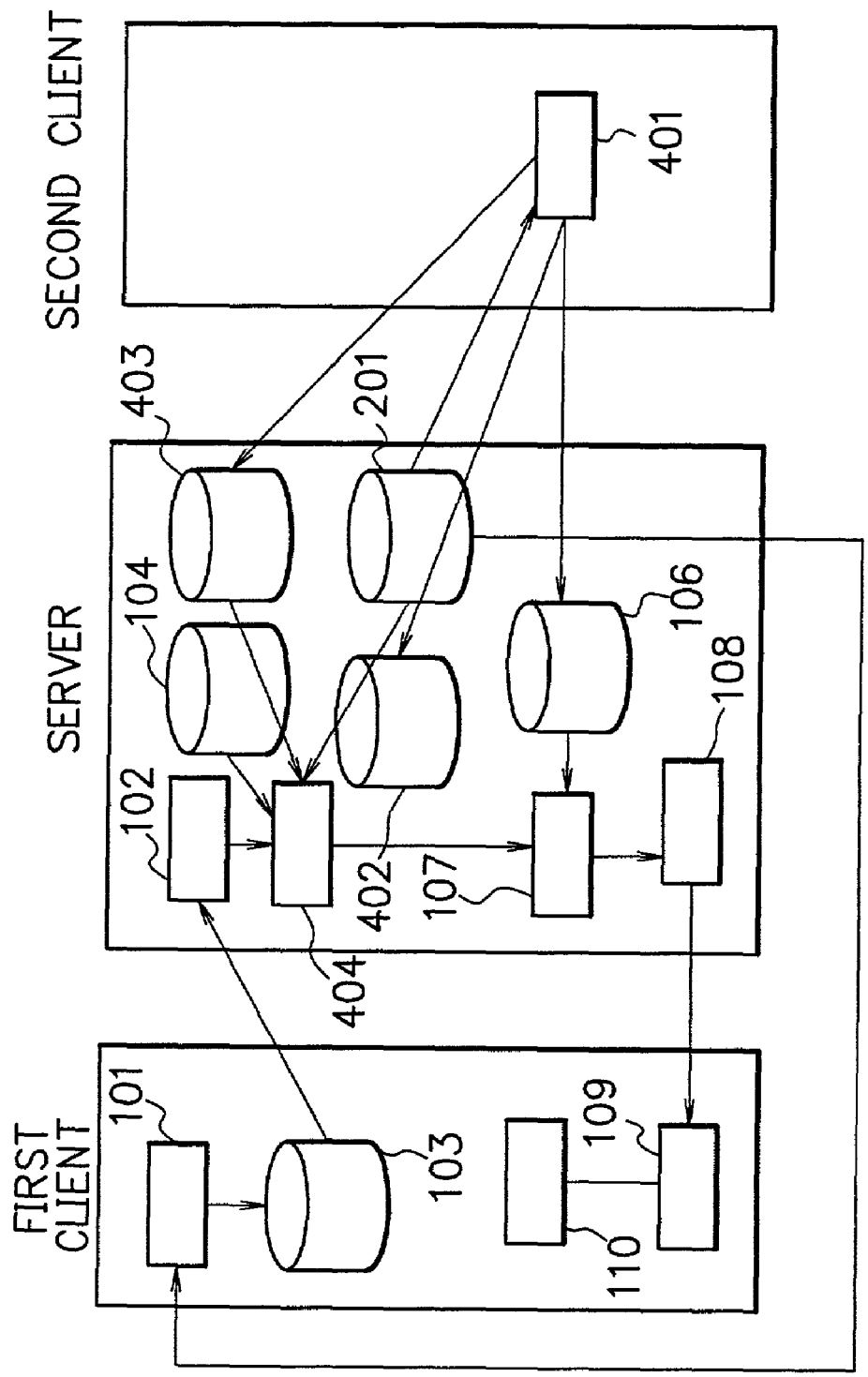
FIG. 21 is a block diagram showing a structure at a ninth embodiment of the information delivery apparatus of the present invention.

Next, referring to the drawing, a ninth embodiment of the information delivery apparatus of the present invention is explained. FIG. 21 is a block diagram showing a structure at the ninth embodiment of the information delivery apparatus of the present invention.

As shown in FIG. 21, the structure of the eighth embodiment shown in FIG. 19 is divided into a first client, a server, and a second client at the ninth embodiment. The first client provides the place condition inputting means 101, the user interested place database 103, the receiving means 109, and the displaying means 110. The server provides the user managing means 102, the map database 104, the document database 106, the document database retrieving means 107, the document informing means 108, the range condition rule database 201, the document registering place index 402, the document delivery condition database 403, and the map and user retrieving means 404. The second client provides only the document registering means 401. In this, the document registering means 401 can provide the user inputting means 410 and the displaying means 409 as shown at the seventh embodiment shown in FIG. 18.

At the ninth embodiment, the structure can be divided into only the first client and the server, in this case, the second client is included in the server. And also the databases can be provided independently of the first client, the server, and the second client. In this case, the first client, the server, and the second client connect to the necessary database via a network such as the Internet.

And the basic operation at the ninth embodiment is the same as at the eighth embodiment. However, at the ninth embodiment shown in FIG. 21, at the step S501, the place condition inputting means 101 in the first client connects to the range condition rule database 201 in the server. At the step S504, the document registering means 401 in the second client connects to the document database 106 in the server. At the step S506, the document registering means 401 in the second client connects to the document registering place index 402 in the server. At the step S513, the user interested place database 103 in the first client connects to the map and user retrieving means 404 in the server via the user managing means 102. And at the step S517, the document informing means 108 in the server connects to the receiving means 109 in the first client.

In this, when the communication between the server and the first client or the second client is executed by a network such as the Internet, the first and the second client need to apply their access to the server by using their own ID or password. And the user managing means 102 can be provided in the first client instead of in the server.

Figure 22:
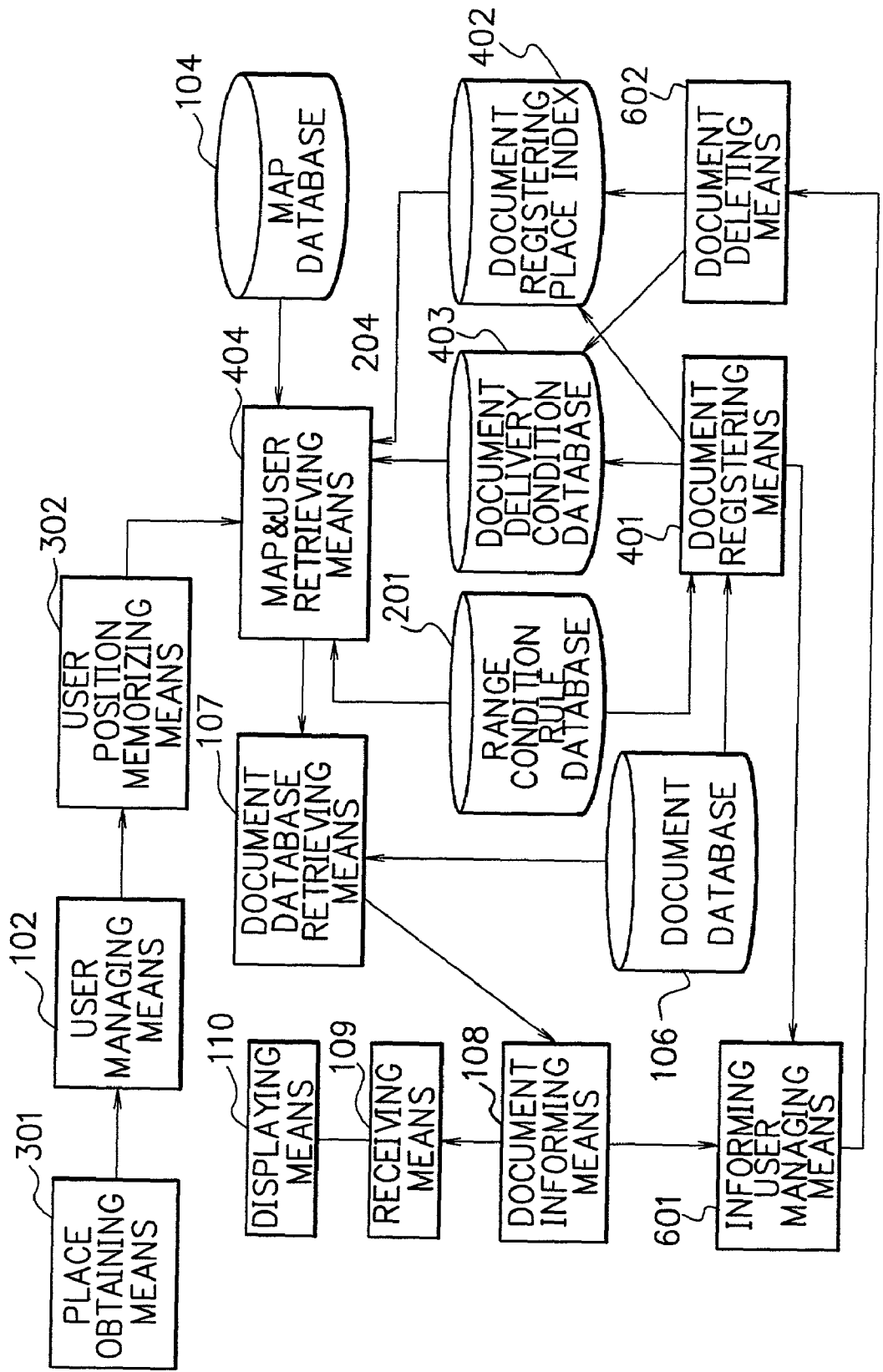
FIG. 22 is a block diagram showing a structure at a tenth embodiment of the information delivery apparatus of the present invention.

Next, referring to the drawings, a tenth embodiment of the information delivery apparatus of the present invention is explained. FIG. 22 is a block diagram showing a structure at the tenth embodiment of the information delivery apparatus of the present invention. As shown in FIG. 22, at the tenth embodiment, the processes from at the place obtaining means 301 to at the user position memorizing means 302 are the same at the fourth embodiment shown in FIG. 10. That is, the place obtaining means 301 obtains a place where a user designates at real time. For example, the user makes a map display on a display of a terminal, and the user designates a place by that the user moves a user position pointer that shows the present position of the user, or the user confirms his/her present position at the position of the pointer, and the user can obtain his/her present position in the passage of time at real time at the place obtaining means 301. And, the user can obtain his/her present position at real time, by that the pointer shows the present position of the user, on a three-dimensional screen that an actual scene is reproduced instead of a two-dimensional plane screen. Further, the user can obtain his/her present position at real time by using the GPS (including D-GPS) apparatus, by not that the user shows the position by using the pointer.

The user managing means 102 attaches the user ID to the position information of the user from the place obtaining means 301, and sends the position information attached the user ID to the user position memorizing means 302. The user position memorizing means 302 has memorized the present positions of plural users with their user IDs. And the user position memorizing means 302 does not send the position information of the users in sequence to the map and user retrieving means 404, and sends the position information only when the map and user retrieving means 404 requests. On the other hand, information suppliers (second client) register their document information such as advertisements with registering delivery places of the documents and their delivery conditions from the document registering means 401, as the same as at the sixth to ninth embodiments. In case that information, which limits the number of users whom the information is delivered by offering a coupon (medium offering a service by using electronic information), is registered, the information supplier registers the upper limit number of users from the document registering means 401, and sends the number with the document ID to an informing user managing means 601. The document registering means 401 is not limited to a specific means, and the server and the second client can choose arbitrary.

Next, the map and user retrieving means 404 reads the document registering place and the delivery condition every document ID from the document delivery condition database 403 and the document registering place index 402, and obtains a list of user IDs that matches with the delivery condition. These processes are the same at the sixth embodiment, however, at the tenth embodiment, the position information of users to be retrieved is not registered beforehand, the positions of the users change at real time, this is different from the sixth embodiment. And also at the tenth embodiment, the user can change his/her own position virtually at the passage of time, by inputting data that change his/her position virtually in sequence. At this case, as mentioned at the fourth embodiment, the place obtaining means 301 and the user position memorizing means 302 are replaced by the place condition inputting means 101 and the user interested place database 103.

Next, the document database retrieving means 107 receives the list of the user IDs and the document ID from the map and user retrieving means 404, and retrieves a document matching with the document ID from the document database 106, and sends the document, the list of the user IDs, and the document ID to the document informing means 108. The document informing means 108 sends the document ID and the list of the user IDs, which the document are delivered to, to the informing user managing means 601, and after this, the document informing means 108 informs the users in the list of the user IDs about the document.

The informing user managing means 601 records the document ID and the list of the user IDs from the document informing means 108 every document ID. And when the upper limit of the number of users whom the document is delivered and the delivery time limit (seasonal limit, time limit such as a long sale period or a short sale period) are set beforehand, the informing user managing means 601 receives these limits from the document registering means 401, and manages these limits with their document IDs. And the informing user managing means 601 compares the delivered number of copies of the document with the upper limit number of the document every document ID, and when the compared result became the same, the informing user managing means 601 informs a document deleting means 602 about that the matched result became the same.

The document deleting means 602 deletes the delivery condition and the information of the registering delivery place of the document ID received from the informing user managing means 601, from the document delivery condition database 403 and the document registering place index 402.

As mentioned above, even for the users who moves in an actual space or in a virtual space at real time, by that the information supplier designates conditions, information relating to the user position can be delivered to the user. And the information delivery whose number of copies of the document is limited can be realized, not only under the condition that the document is delivered to the users who position a place. That is, for example, a coupon whose number is limited can be delivered as the document.

Figure 23:
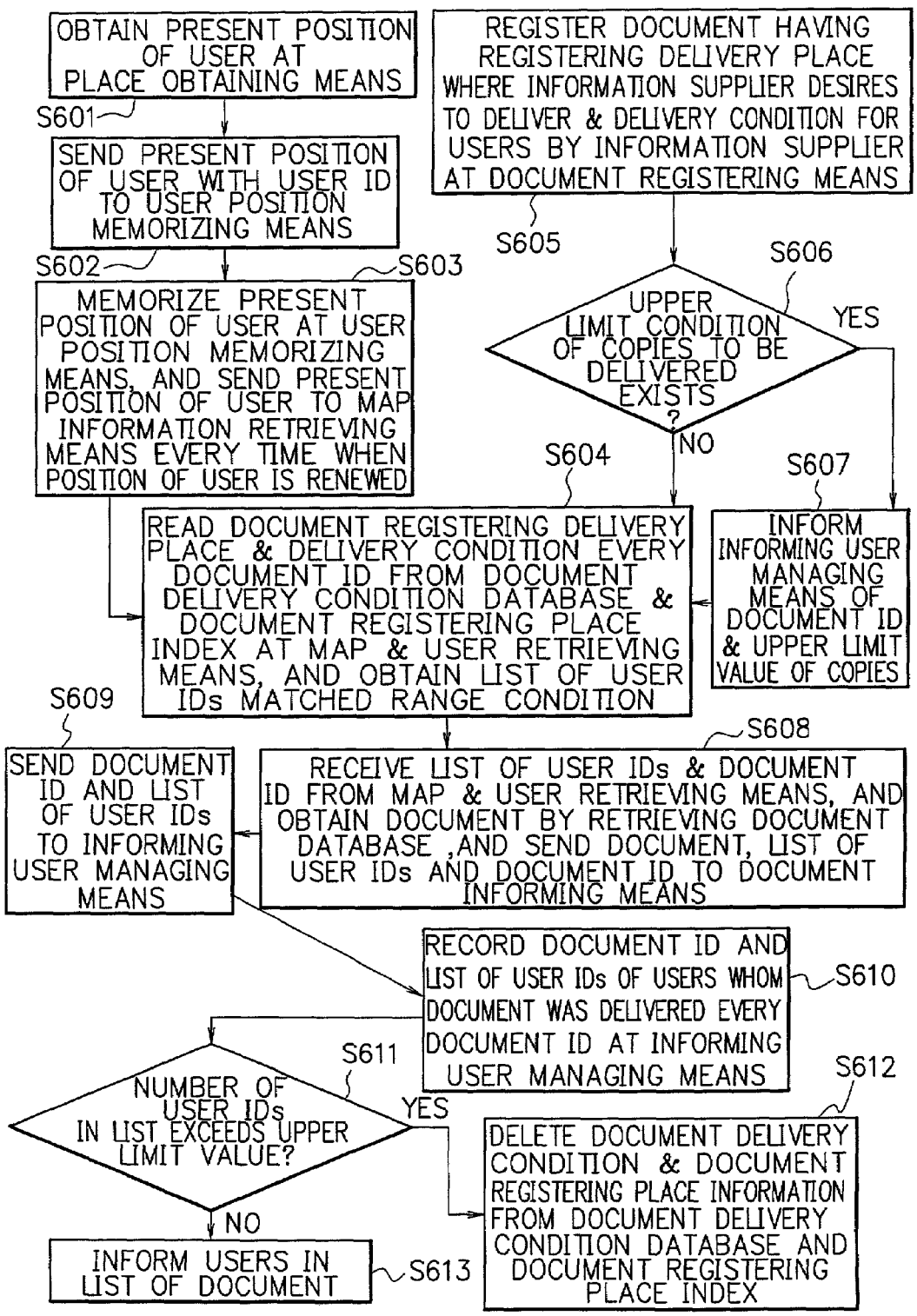
FIG. 23 is a flowchart showing an operation at the tenth embodiment of the information delivery apparatus of the present invention.

FIG. 23 is a flowchart showing an operation at the tenth embodiment of the information delivery apparatus of the present invention. Referring to FIGS. 22 and 23, the operation of the tenth embodiment of the present invention is explained in detail. First, an information supplier registers information of a document with a document registering delivery place and a delivery condition at the document registering means 401 (step S605). And it is judged whether the upper limit condition of copies to be delivered exists or not in this document (step S606). When the upper limit condition exists, the document ID and the upper limit number of copies of the document are informed to the informing user managing means 601 (step S606). When the upper limit condition does not exist, the process goes to step S604.

The present position of a user is obtained at the place obtaining means 301 (step S601). The user managing means 102 attaches the user ID to the present position of the user, and sends the present position with the user ID to the user position memorizing means 302 (step S602). The user position memorizing means 302 memorizes the user position received from the user managing means 102, and sends the user position to the map and user retrieving means 404, every time when the user position is renewed (step S603). The map and user retrieving means 404 obtains the document registering delivery place and the delivery condition every registered document ID from the document delivery condition database 403 and the document registering place index 402, and obtains a list of the user IDs which matches with the range condition (the step S604). The document database retrieving means 107 receives the list of the user IDs and the document ID from the map and user retrieving means 404, and obtains the document of the document ID by retrieving the document database 106, and sends the contents of the document, the list of the user IDs, and the document ID to the document informing means 108 (step S608). The document informing means 108 sends the document ID and the list of the user IDs to the informing user managing means 601 (step S609).

The informing user managing means 601 records the document ID and the list of the user IDs from the document informing means 108 every document ID (step S610). At this time, it is judged whether the number of the user IDs in the list exceeds the upper limit of the number of copies to be delivered or not (step S611). In case that the number of the user IDs exceeded the upper limit (Yes at the step S611), the informing user managing means 601 informs it to the document deleting means 602. In case that the number of the user IDs did not exceed the upper limit (No at the step S611), the document informing means 108 informs the users in the list about the document (step S613). The document deleting means 602, received the information from the informing user managing means 601, deletes the delivery condition of the document and the registering place information from the document delivery condition database 403 and the document registering place index 402 (step S612).

As mentioned above, at the tenth embodiment, the following processes are provided: identifying users (the step S100; not shown), detecting the positions of the users (the steps S601 to S603), stopping the delivery of the document (informing the upper limit copies of the document) (the steps S606 and S607), and deleting the document (the step S612), inputting information by a second client (the step S605), retrieving map information and extracting its relating document (the steps S604 and S608), and informing the document to the users (the step S613).

At the tenth embodiment, the structure can be divided into a client and a server. For example, the client provides the place obtaining means 301, the user position memorizing means 302, the receiving means 109, and the displaying means 110. And the server provides the remaining means and the databases.

Figure 24:
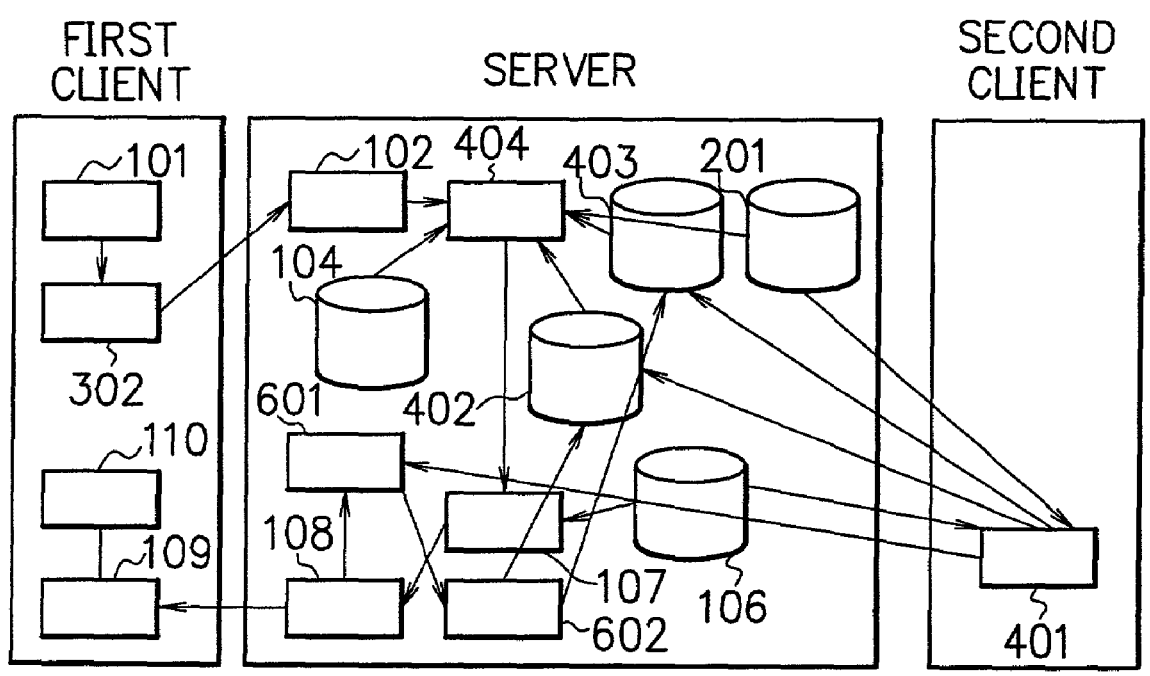
FIG. 24 is a block diagram showing a structure at an eleventh embodiment of the information delivery apparatus of the present invention.

FIG. 24 is a block diagram showing a structure at an eleventh embodiment of the information delivery apparatus of the present invention. As shown in FIG. 24, at the eleventh embodiment, the structure at the tenth embodiment is divided into a first client, a server, and a second client. In this, the second client can be provided in the server, and information suppliers input their information directly to the server or through some information storing medium. The method, with which the information suppliers input their information, is not limited to a specific method, any method can be used, and further, the information can be received via communication channels at the server.

As shown in FIG. 24, the first client provides the place obtaining means 301, the user position memorizing means 302, the receiving means 109, and the displaying means 110. The server provides the user managing means 102, the map database 104, the document database 106, the document database retrieving means 107, the document informing means 108, the range condition rule database 201, the document registering place index 402, the document delivery condition database 403, the map and user retrieving means 404, the informing user managing means 601, and the document deleting means 602. The second client provides the document registering means 401.

The operation at the eleventh embodiment is basically the same at the tenth embodiment, however, the structure is divided into the first client, the server, and the second client, therefore, the operation is executed at the following manner. That is, the process at the step S603 is executed from the user position memorizing means 302 in the first client to the map and user retrieving means 404 in the server. The process at the step S605 is executed from the document registering means 401 in the second client to the document registering place index 402 and the document delivery condition database 403 in the server. And the process at the step S613 is executed from the document informing means 108 in the server to the receiving means 109 in the first client.

Figure 25:
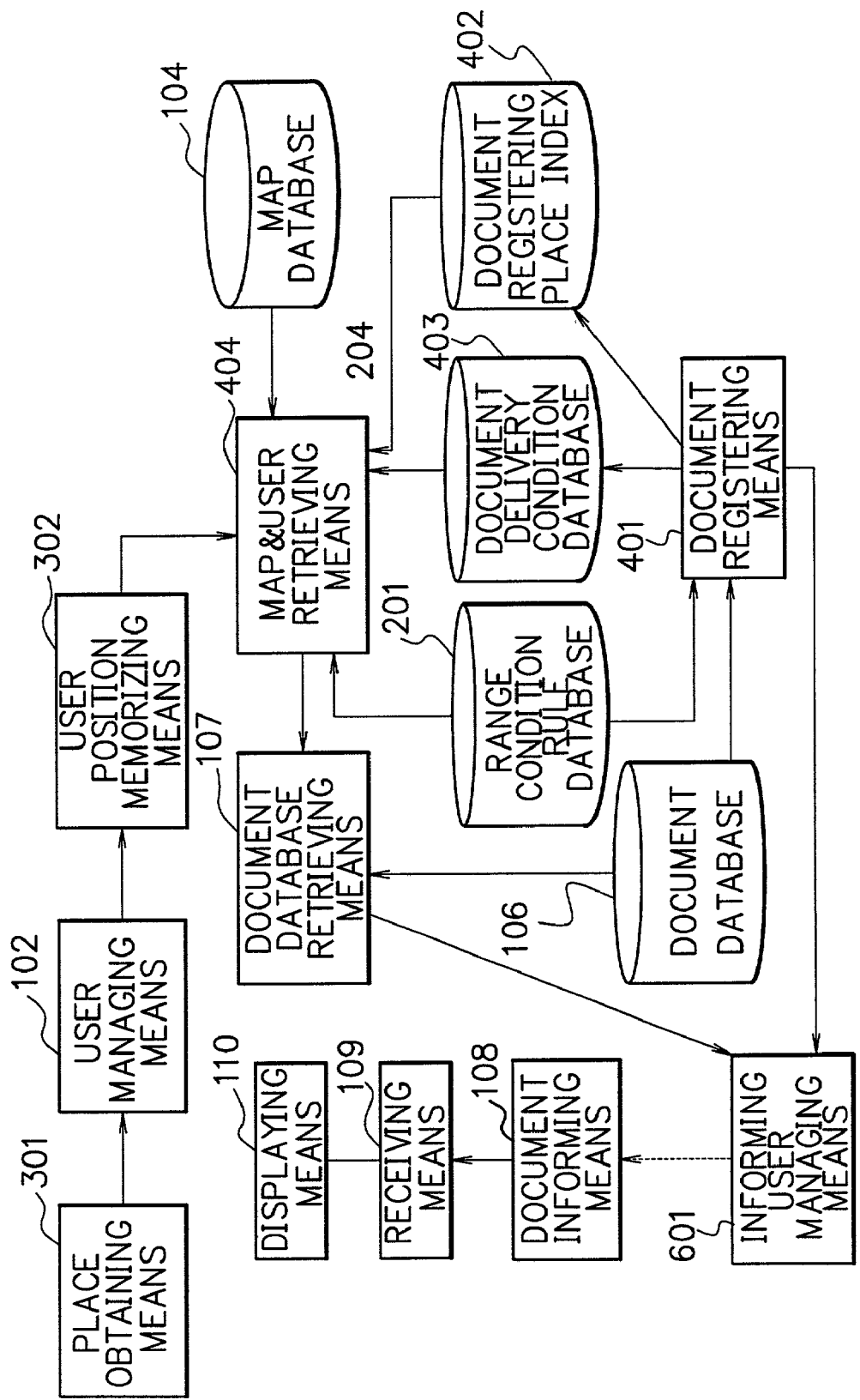
FIG. 25 is a block diagram showing a structure at a twelfth embodiment of the information delivery apparatus of the present invention.

FIG. 25 is a block diagram showing a structure at a twelfth embodiment of the information delivery apparatus of the present invention. As shown in FIG. 25, at the twelfth embodiment, compared with the tenth embodiment shown in FIG. 22, the document deleting means 602 is not provided.

Figure 26:
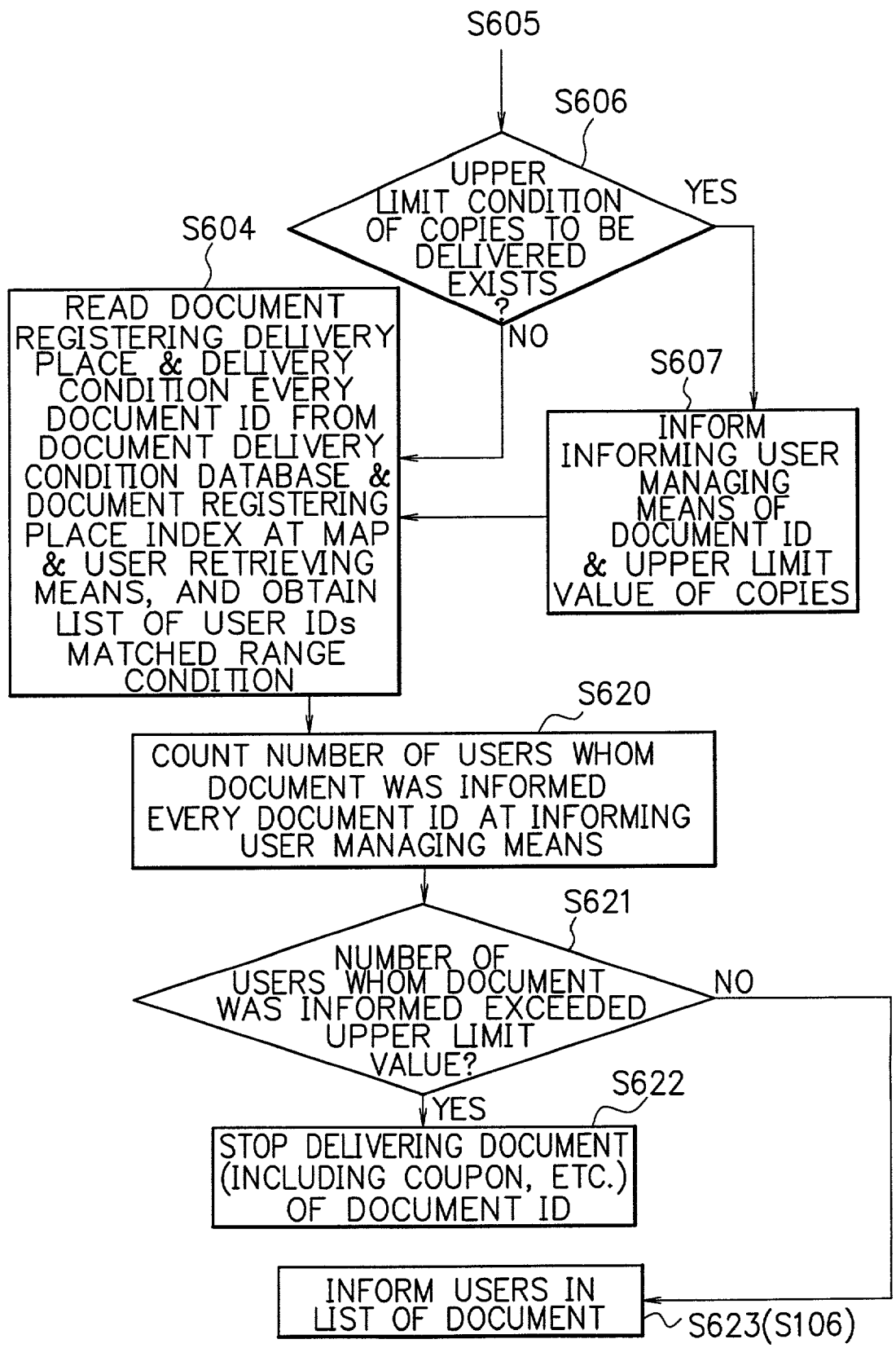
FIG. 26 is a flowchart showing an operation at the twelfth embodiment of the information delivery apparatus of the present invention.

FIG. 26 is a flowchart showing an operation at the twelfth embodiment of the information delivery apparatus of the present invention. In FIG. 26 of the twelfth embodiment, the processes until the step S607 are the same at the tenth embodiment shown in FIG. 23. After this, the informing user managing means 601 receives the upper limit of delivery number of the document from the document registering means 401, and the informing user managing means 601 counts the number of users whom the document was informed every document ID, by obtaining the document ID and the list of the user IDs of the users (step S620). And the informing user managing means 601 compares the counted number with the upper limit value (step S621). In case that the counted number exceeded the upper limit value (Yes at the step S621), the informing user managing means 601 stops delivering the document (including a coupon that gives a service to users) to the users, that is, the informing user managing means 601 does not inform the document informing means 108 (step S622). And in case that the counted number did not exceed the upper limit value (No at the step S621), the informing user managing means 601 informs the document informing means 108 about the document, and the document informing means 108 informs the users in the list about the document (step S623).

As shown in FIG. 26, as the same as at the tenth embodiment, at the twelfth embodiment, the process identifying users is omitted. As mentioned above, the twelfth embodiment provides the following processes: identifying users (the step S100, not shown), detecting the positions of the users (the steps S601 to S603 shown in FIG. 23), informing the upper limit number of the document (the steps S606 and S607), stopping the delivery of the document (the step S 620 to S622), inputting information by a second client (the step S605 shown in FIG. 23), retrieving map information and extracting its relating document (the steps S604 and S608 shown in FIG. 23), and informing the document to the users in the list (the step S623).

Figure 27:
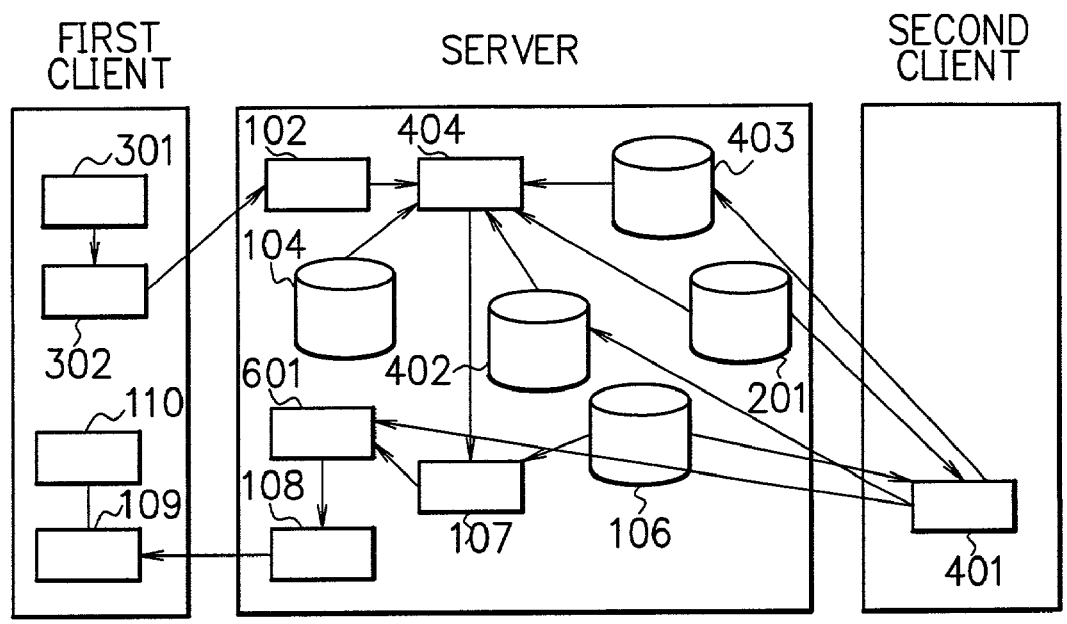
FIG. 27 is a block diagram showing a structure at a thirteenth embodiment of the information delivery apparatus of the present invention.

Next, a thirteenth embodiment of the information delivery apparatus of the present invention is explained. FIG. 27 is a block diagram showing a structure at the thirteenth embodiment of the information delivery apparatus of the present invention.

As shown in FIG. 27, the thirteenth embodiment of the present invention has the same structure that the twelfth embodiment shown in FIG. 25 has. However, at the thirteenth embodiment, the structure is divided into a first client, a server, and a second client. And the first client, the server, and the second client are connected via communication channels effectively. The first client provides the place obtaining means 301, the user position memorizing means 302, the receiving means 109, and the displaying means 110. The server provides the user managing means 102, the map database 104, the document database 106, the document database retrieving means 107, the document informing means 108, the range condition rule database 201, the document registering place index 402, the document delivery condition database 403, the map and user retrieving means 404, and the informing user managing means 601. The second client provides the document registering means 401.

The operation of the thirteenth embodiment is basically the same as at the twelfth embodiment, however, at the step S620, the document registering means 401 in the second client connects to the informing user managing means 601 in the server.

Figure 28:
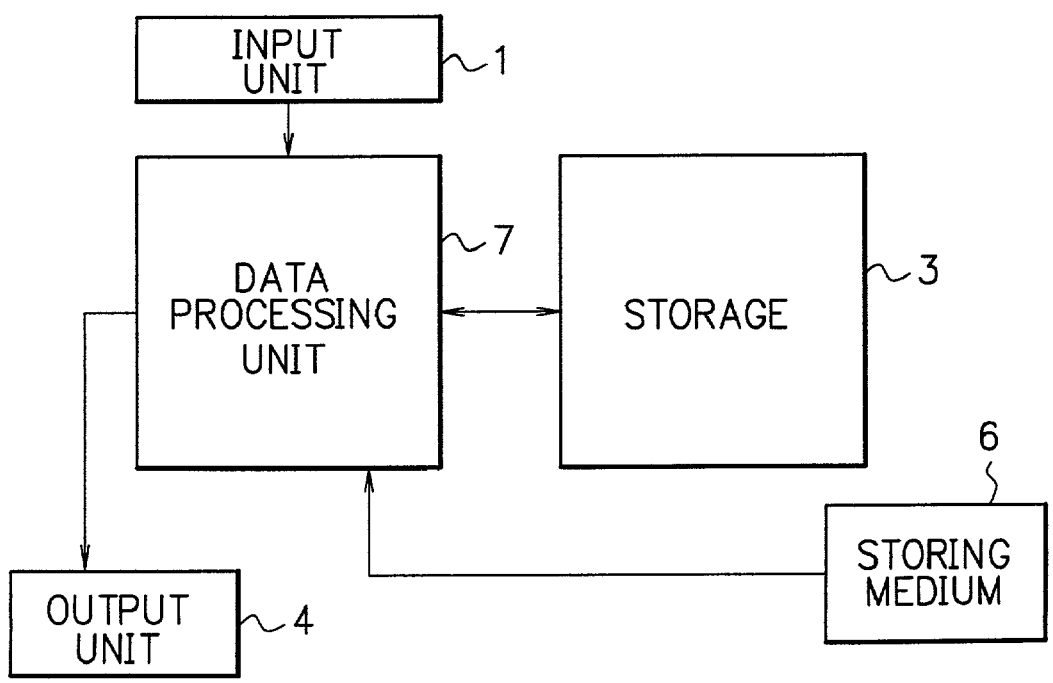
FIG. 28 is a block diagram showing a structure to realize the method of the embodiments of the information delivery apparatus of the present invention.

Next, referring to the drawing, a fourteenth embodiment of the information delivery apparatus of the present invention is explained. At the fourteenth embodiment, the first embodiment of the information delivery apparatus of the present invention shown in FIG. 1 is realized by computer programs. This method to realize the first embodiment of the information delivery apparatus is explained at the fourteenth embodiment. FIG. 28 is a block diagram showing a structure to realize the method of the embodiments of the information delivery apparatus of the present invention. As shown in FIG. 28, the information delivery apparatus at the embodiments of the present invention consists of an input unit 1, storage 3, an output unit 4, a storing medium 6, and a data processing unit 7. And the storing medium 6 stores programs that realize processes for executing the information delivery apparatus. As the storing medium 6, for example, a magnetic disk, a semiconductor memory, a CD-ROM, a DVD-ROM, and another medium that can store the programs, can be used. And also as the storing medium 6, a storing medium, which can permanently store the programs when the programs were stored once, or a storing medium, in which programs can be written again after the programs were stored, or a storing medium, which stores the programs temporarily, can be used. At least one of the storing media is provided in the information delivery apparatus.

At the fourteenth embodiment, first, the programs are read in the data processing unit 7 from the storing medium 6, and at least the map information retrieving means 105 and the document database retrieving means 107 are formed in the data processing unit 7. Further, the place condition inputting means 101, the user managing means 102, the document informing means 108 are formed in the data processing unit 7. The receiving means 109 and the displaying means 110 are formed in a user terminal. The data processing unit 7 executes the same processes at the map information retrieving means 105 and the document database retrieving means 107 at the first embodiment. In this, the user interested place database 103, the map database 104, and the document database 106 can be formed in the storage 3, or can be provided in external storage that is connected to the data processing unit 7 via communication channels. As the communication channels, a universal serial bus (USB) or a bus such as an IEEE 1394 is included. And the place condition inputting means 101 can be provided in either at a user terminal or at the information delivery apparatus, or at an external instrument that can be connected to the information delivery apparatus via wired or radio communication channels. At the input unit 1, information is inputted and the information is sent to the data processing unit 7, and at the output unit 4, the processed result at the data processing unit 7 is outputted. The operation of the fourteenth embodiment is the same at the first embodiment.

Next, a fifteenth embodiment of the information delivery apparatus of the present invention is explained. At the fifteenth embodiment, the second embodiment of the information delivery apparatus of the present invention shown in FIG. 6 is realized by computer programs. This method to realize the second embodiment of the information delivery apparatus is explained at the fifteenth embodiment. At the fifteenth embodiment, both the client and the server provide the same structure shown in the FIG. 28. That is, the both the client and the server provide the input unit 1, the output unit 4, the data processing unit 7, and the storage 3, and further provide the storing medium 6 in which the programs to realize the client or the server are stored. As the storing medium 6, one of the storing media mentioned above can be used.

The programs to control the client are read in the data processing unit 7 in the client from the storing medium 6 in the client, and the place condition inputting means 101 is formed in the client. The user interested place database 103 is provided in the storage 3 in the server. In case that the user interested place database 103 is provided in the client, the user interested place database 103 is provided in the storage 3 in the client. As the receiving means 109 and the displaying means 110, means, which are provided originally in the client, can be used. The programs to control the server are read in the data processing unit 7 in the server from the storing medium 6 in the server, and the map information retrieving means 105, the document database retrieving means 107, the user managing means 102, and the document informing means 108 are formed in the server. The other databases are the same at the fourteenth embodiment.

Next, a sixteenth embodiment of the information delivery apparatus of the present invention is explained. At the fifteenth embodiment, the third embodiment of the information delivery apparatus of the present invention shown in FIG. 7 is realized by computer programs. This method to realize the third embodiment of the information delivery apparatus is explained at the sixteenth embodiment. At the sixteenth embodiment, the information delivery apparatus provides the same structure shown in the FIG. 28.

The programs to control the information delivery apparatus are read in the data processing unit 7 from the storing medium 6, and at least the map information retrieving means 105 and the document database retrieving means 107 are formed, and the place condition inputting means 101, the user managing means 102, and the document informing means 108 are formed. When the place condition inputting means 101 receives the range condition rules from the range condition rule database 201, the format of the range condition rule has been decided beforehand. As mentioned at the fourteenth embodiment, the databases can be provided at the outside of the information delivery apparatus. The operation at the sixteenth embodiment is the same as that at the third embodiment.

Next, a seventeenth embodiment of the information delivery apparatus of the present invention is explained. At the seventeenth embodiment, the fourth embodiment of the information delivery apparatus of the present invention shown in FIG. 10 is realized by computer programs. This method to realize the fourth embodiment of the information delivery apparatus is explained at the seventeenth embodiment. At the seventeenth embodiment, the information delivery apparatus provides the same structure shown in the FIG. 28.

The programs to control the information delivery apparatus are read in the data processing unit 7 from the storing medium 6, and the place obtaining means 301, the user managing means 102, the user position memorizing means 302, the range condition designating means 303, the map information retrieving means 105, the document database retrieving means 107, the document informing means 108 are formed. And the data processing unit 7 accesses to the storage 3, in which the map database 104, the document database 106, and the range condition rule database 201 are stored, and executes the processes. Further the position of the user is renewed by the place condition obtaining means 301. In this, the document informing means 108 can be formed by a means which provides a communicating section being capable of communicating with external equipment and a memory. The operation at the seventeenth embodiment is the same as that at the fourth embodiment.

Next, an eighteenth embodiment of the information delivery apparatus of the present invention is explained. At the eighteenth embodiment, the fifth embodiment of the information delivery apparatus of the present invention shown in FIGS. 13 and 14 is realized by computer programs. This method to realize the fifth embodiment of the information delivery apparatus is explained at the eighteenth embodiment. At the eighteenth embodiment, both the client and the server provide the same structure shown in the FIG. 28. That is, the both the client and the server provide the input unit 1, the output unit 4, the data processing unit 7, and the storage 3, and further provide the storing medium 6 in which the programs to realize the client or the server are stored. As the storing medium 6, one of the storing media mentioned above can be used.

The programs to control the client are read in the data processing unit 7 in the client from the storing medium 6 in the client, and the place obtaining means 301 and the range condition designating means 303 are formed in the client. And further the user position memorizing means 302 can be provided in the client. In this, the programs to control the client can be read in the data processing unit 7 in the client from the storing medium 6 in the server, or from the storage 3 in the server by that the client accesses to the server and down-loads the programs from the server.

The programs to control the server are read in the data processing unit 7 in the server from the storing medium 6 in the server, and as shown in FIG. 13(1), the user managing means 102, the user position memorizing means 302, the map information retrieving means 105, the document database retrieving means 107, and the document informing means 108 are formed in the server. As mentioned above, the map database 104, the document database 106, and the range condition rule database 201 can be provided at the outside of the server. In this, the user position memorizing means 302 can be provided at either the client or the server. As the receiving means 109 and the displaying means 110, means, which are used originally at the client, can be used. And as shown in FIGS. 13(1) and (2), the user position memorizing means 302 is not provided or provided in the client. And also, as shown in FIG. 14(2), the user position memorizing means 302 and the range condition designating means 303 can be provided in the server.

Next, a nineteenth embodiment of the information delivery apparatus of the present invention is explained. At the nineteenth embodiment, the sixth embodiment of the information delivery apparatus of the present invention shown in FIG. 15 is realized by computer programs. This method to realize the sixth embodiment of the information delivery apparatus is explained at the nineteenth embodiment. At the nineteenth embodiment, the information delivery apparatus provides the same structure shown in the FIG. 28.

The programs to control the information delivery apparatus are read in the data processing unit 7 from the storing medium 6, and the map and user retrieving means 404 and the document database retrieving means 107 are formed, and further the place condition inputting means 101 and the user managing means 102 are formed by controlling the operation at the map and user retrieving means 404 and the document database retrieving means 107. And further, at the storage 3, the document registering means 401, by which the information suppliers input information (advertisement) to users, is provided. The user interested place database 103, the map database 104, and the document database 106 can be provided in the information delivery apparatus, or at the outside apparatus to which the information delivery apparatus can connect via communication channels. As the communication channels, as mentioned above, the USB and the bus such as the IEEE 1394 can be used. And the place condition inputting means 101 can be provided in the user terminal or the information delivery apparatus or at the outside instrument to which the information delivery apparatus can connect. And the document delivery condition database 403, and the document registering place index 402 can be provided independently of the document registering means 401, or be provided relating to the document registering means 401. The operation at the nineteenth embodiment is the same as that at the sixth embodiment.

Next, a twentieth embodiment of the information delivery apparatus of the present invention is explained. At the twentieth embodiment, the seventh embodiment of the information delivery apparatus of the present invention shown in FIG. 17 is realized by computer programs. This method to realize the seventh embodiment of the information delivery apparatus is explained at the twentieth embodiment. At the twentieth embodiment, both the client and the server provide the same structure shown in the FIG. 28. That is, the both the client and the server provide the input unit 1, the output unit 4, the data processing unit 7, and the storage 3, and further provide the storing medium 6 in which the programs to realize the client or the server are stored. As the storing medium 6, one of the storing media mentioned above can be used.

The programs to control the client are read in the data processing unit 7 in the client from the storing medium 6 in the client, and the place condition inputting means 101 and the user interested place database 103 are formed in the client. As the receiving means 109 and the displaying means 110, means, which are used originally at the client, can be used. In this, the programs to control the client can be read in the data processing unit 7 in the client from the storing medium 6 in the server, or from the storage 3 in the server by that the client accesses to the server and down-loads the programs from the server.

The programs to control the server are read in the data processing unit 7 in the server from the storing medium 6 in the server, and the user managing means 102, the map and user retrieving means 404, the document database retrieving means 107, the document informing means 108, and the document registering means 401 are formed in the server. As mentioned above, the map database 104, the document database 106, and the document delivery condition database 403 can be provided in the storage 3 in the server or at the outside of the server. And the document delivery condition database 403, and the document registering place index 402 can be provided independently of the document registering means 401, or be provided relating to the document registering means 401.

In case that the structure of the twentieth embodiment is composed of a first client, a server, and a second client as shown in FIG. 18, the second client also has the structure shown in FIG. 28, and provides the document registering means 401. And further, the second client can provides the document inputting means 410 and the document displaying means 409.

Next, a twenty-first embodiment of the information delivery apparatus of the present invention is explained. At the twenty-first embodiment, the eighth embodiment of the information delivery apparatus of the present invention shown in FIG. 19 is realized by computer programs. This method to realize the eighth embodiment of the information delivery apparatus by the computer programs is explained at the twenty-first embodiment. The information delivery apparatus at the twenty-first embodiment also has the same structure shown in FIG. 28.

The programs to control the information delivery apparatus are read in the data processing unit 7 from the storing medium 6, and the means except the receiving means 109 and the displaying means 110 are formed in the information delivery apparatus. For example, the programs to control the range calculating means 203 to 205 in the map and user retrieving means 404 are obtained in the storage 3 from the storing medium 6, and the data processing unit 7 executes the programs. As the receiving means 109 and the displaying means 110, means, which are used originally at the terminal at the user, can be used. As mentioned above, the databases can be provided in the information delivery apparatus or at the outside of the information delivery apparatus.

Next, a twenty-second embodiment of the information delivery apparatus of the present invention is explained. At the twenty-second embodiment, the ninth embodiment of the information delivery apparatus of the present invention shown in FIG. 21 is realized by computer programs. This method to realize the twenty-second embodiment is explained at the twenty-second embodiment. At the twenty-second embodiment, as shown in FIG. 28, all of the first client, the server, and the second client provide the data processing unit 7 and the storage 3, further provide the storing medium 6 in which the programs to realize the first client, the server, or the second client are stored. As the storing medium 6, one of the storing media mentioned above can be used.

The programs to control the first client are read in the data processing unit 7 in the first client from the storing medium 6 in the first client, and the place condition inputting means 101 and the user interested place database 103 are formed in the first client. As the receiving means 109 and the displaying means 110, means, which are used originally at the first client, can be used. In a case, the user managing means 102 can be provided in the first client instead of in the server. In this, the programs to control the first client can be read in the data processing unit 7 in the first client from the storing medium 6 in the server, by that the first client accesses to the server and down-loads the programs from the server.

The programs to control the server are read in the data processing unit 7 in the server from the storing medium 6 in the server, and the user managing means 102, the map and user retrieving means 404, the document database retrieving means 107, and the document informing means 108 are formed in the server. As mentioned above, the map database 104, the document database 106, the range condition rule database 201, the document registering place index 402, and the document delivery condition database 403 are provided in the storage 3 in the server or can be provided at the outside of the server. And the document delivery condition database 403, and the document registering place index 402 can be provided independently of the document registering means 401, or be provided relating to the document registering means 401.

The programs to control the second client are read in the data processing unit 7 in the second client from the storing medium 6 in the second client, and the document registering means 401 are formed in the second client. And in a case, the document registering means 401 can be provided in the server instead of in the second client.

Next, a twenty-third embodiment of the information delivery apparatus of the present invention is explained. At the twenty-third embodiment, the tenth embodiment of the information delivery apparatus of the present invention shown in FIG. 22 is realized by computer programs. This method to realize the tenth embodiment by the computer programs is explained at the twenty-third embodiment. The information delivery apparatus at the twenty-third embodiment also has the same structure shown in FIG. 28.

The programs to control the information delivery apparatus are read in the data processing unit 7 from the storing medium 6, and the means except the receiving means 109 and the displaying means 110 are formed in the information delivery apparatus. And the information delivery apparatus works by the computer programs. As the receiving means 109 and the displaying means 110, means, which are used originally at the terminal at the user, can be used. As mentioned above, the databases can be provided in the information delivery apparatus or at the outside of the information delivery apparatus.

Next, a twenty-fourth embodiment of the information delivery apparatus of the present invention is explained. At the twenty-fourth embodiment, the eleventh embodiment of the information delivery apparatus of the present invention shown in FIG. 24 is realized by computer programs. This method to realize the eleventh embodiment by the computer programs is explained at the twenty-fourth embodiment. At the twenty-fourth embodiment, each of the first client, the server, and the second client has the same structure shown in FIG. 28. That is, each of the first client, the server, and the second client provides the data processing unit 7 and the storage 3, further provides the storing medium 6 in which the programs to realize the first client, the server, or the second client are stored. As the storing medium 6, one of the storing media mentioned above can be used.

The programs to control the first client are read in the data processing unit 7 in the first client from the storing medium 6 in the first client, and the place obtaining means 301 and the user position memorizing means 302 are formed in the first client. As the receiving means 109 and the displaying means 110, means, which are used originally at the first client, can be used. In a case, the user managing means 102 can be provided in the first client instead of in the server. In this, the programs to control the first client can be read in the data processing unit 7 in the first client from the storing medium 6 in the server, by that the first client accesses to the server and down-loads the programs from the server.

The programs to control the server are read in the data processing unit 7 in the server from the storing medium 6 in the server, and the user managing means 102, the map and user retrieving means 404, the document database retrieving means 107, the document informing means 108, the informing user managing means 601, and the document deleting means 602 are formed in the server. As mentioned above, the map database 104, the document database 106, the range condition rule database 201, the document registering place index 402, and the document delivery condition database 403 are provided in the storage 3 in the server or can be provided at the outside of the server.

The programs to control the second client are read in the data processing unit 7 in the second client from the storing medium 6 in the second client, and the document registering means 401 are formed in the second client.

Next, a twenty-fifth embodiment of the information delivery apparatus of the present invention is explained. At the twenty-fifth embodiment, the twelfth embodiment of the information delivery apparatus of the present invention shown in FIG. 25 is realized by computer programs. This method to realize the twelfth embodiment is explained at the twenty-fifth embodiment. The information delivery apparatus at the twenty-fifth embodiment also has the same structure shown in FIG. 28.

The programs to control the information delivery apparatus are read in the data processing unit 7 from the storing medium 6, and the means except the receiving means 109 and the displaying means 110 are formed in the information delivery apparatus. And the information delivery apparatus works by the programs. As the receiving means 109 and the displaying means 110, means, which are used originally at the terminal at the user, can be used. As mentioned above, the databases can be provided in the information delivery apparatus or at the outside of the information delivery apparatus.

Next, a twenty-sixth embodiment of the information delivery apparatus of the present invention is explained. At the twenty-sixth embodiment, the thirteenth embodiment of the information delivery apparatus of the present invention shown in FIG. 27 is realized by computer programs. This method to realize the thirteenth embodiment is explained at the twenty-sixth embodiment. At the twenty-sixth embodiment, each of the first client, the server, and the second client has the same structure shown in FIG. 28. That is, each of the first client, the server, and the second client provides the data processing unit 7 and the storage 3, and further provides the storing medium 6 in which the programs to realize the first client, the server, or the second client are stored. As the storing medium 6, one of the storing media mentioned above can be used.

The programs to control the first client are read in the data processing unit 7 in the first client from the storing medium 6 in the first client, and the place obtaining means 301 and the user position memorizing means 302 are formed in the first client. As the receiving means 109 and the displaying means 110, means, which are used originally at the first client, can be used. In a case, the user managing means 102 can be provided in the first client instead of in the server. In this, the programs to control the first client can be read in the data processing unit 7 in the first client from the storing medium 6 in the server, by that the first client accesses to the server and down-loads the programs from the server.

The programs to control the server are read in the data processing unit 7 in the server from the storing medium 6 in the server, and the user managing means 102, the map and user retrieving means 404, the document database retrieving means 107, the document informing means 108, the range condition rule database 201, and the informing user managing means 601 are formed in the server. As mentioned above, the map database 104, the document database 106, the document registering place index 402, and the document delivery condition database 403 are provided in the storage 3 in the server or can be provided at the outside of the server.

The programs to control the second client are read in the data processing unit 7 in the second client from the storing medium 6 in the second client, and the document registering means 401 are formed in the second client.

As mentioned above, the information delivery apparatus of the present invention is an apparatus to deliver information neighboring a place where users have an interest. Therefore, the users can freely obtain place information that the users do not know corresponding to the desires of the users. The information delivery apparatus of the present invention has various structures mentioned above, and the operation of the information delivery apparatus is executed based on the flowcharts mentioned above. The programs to execute the operation include a main program that retrieves geographic information and extracts a document relating to the geographic information. And programs relating to the main program can be made as sub programs or application software.

As mentioned above, according to the present invention, a map database is retrieved in a geographic range, by that a location of a user being registered by the user or a place where the user has an interest (a spot from where the user wants to obtain information) is made to its reference point. And further, a document database is retrieved again based on building names, place names, and so on, retrieved in the map and existing in the retrieved range. With this, the user can easily obtain information relating to the place (a spot or a starting point from where the user wants to obtain information) registered by the user.

And also, it is not necessary to decide registering places of documents in the document database beforehand, and existing databases can be used in a simple structure of the present invention. Further, as range conditions for retrieving a geographic range, information such as a distance in a straight line, a route range, a reaching possibility is combined arbitrary, therefore, information can be obtained in more detail by that the range conditions are designated by the combination.

And, a means in which a user moves in a virtual space and a means in which the user obtains his/her present position in an actual space are combined, with this, the user can obtain information of a place not relating to the actual present position, and also the user can obtain information of moving places corresponding to the movement of the user at real time.

And an information supplier can add a geographic condition at the time when the information supplier delivers information that includes such as an advertisement, therefore, for the information supplier, the present invention can give an advantage.

And, a distance in a straight line, a route range, a reaching possibility can be combined as a range condition, and this range condition is used as its delivery condition of information. For example, by using a range condition "within 15 minutes on foot from the shop" as the delivery condition, an information delivery, in which a more detail geographic condition is designated, can be executed.

Further, as mentioned above, the information delivery apparatus of the present invention can be structured as a system that provides all means and databases. And also, the information delivery apparatus of the present invention can consist of a client and a server, in which respective means and databases are provided, and further can consist of a first client, a server, and a second client in which respective means and databases are provided. In these cases, the client and the server are connected with wired communication channels or radio communication channels, and also the first client and the server, and the server and the second client are connected with the wired communication channels or the radio communication channels.

Programs to control the information delivery apparatus (system) is not limited to be stored in a specific medium, and can be stored in arbitrary storage or in a storing medium, or can be transferred among them or can be down-loaded from a storing medium. And the programs to execute the operation of the information delivery apparatus include a main program that retrieves geographic information and extracts a document relating to the geographic information. And other programs relating to the main program can be made as sub programs or application software. And the sub programs (application software) include programs, such as identifying users, showing range conditions, extracting and calculating range conditions, informing users, stopping the delivery of a document to users. These main program and sub programs can be obtained by down-loading via communication channels in a state that the programs are combined or are not combined, or as a single program.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An information delivery server, comprising:
   a map information retrieving means to which place information having position information and range conditions that include at least one of a distance, a route, time, and a fare from a place or a place of said position information are inputted, and extracts at least one of facility information and place information relating to said position information under said range conditions from a map database that has facility names and road information connecting and relating to said facility names with coordinate information on a map; and
   a document database retrieving means that receives said facility information and/or said place information extracted from said map information retrieving means, and retrieves a document to be delivered to a user from a document database that has documents by making said received information as keywords.

2. An information delivery server, comprising:
   a user managing means that manages user IDs and receives place information of a place where a user had an interest from a terminal of said user, or receives said place information and range conditions that include at least one of a distance, a route, time, and a fare from a place or said place, and identifies said user and attaches a user ID to said received information;
   a user interested place database that stores said place information, or said range conditions and said place information, with said user ID received from said user managing means;
   a map information retrieving means to which said place information or said place information and said range conditions are inputted, and extracts at least one of facility information and place information relating to said place information under said range conditions or a range condition from a map database that has facility names and road information connecting and relating to said facility names with coordinate information on a map; and
   a document database retrieving means that receives said facility information and/or said place information extracted from said map information retrieving means, and retrieves a document to be delivered to said user from a document database that has documents by making said received information as keywords.

3. An information delivery server, comprising:
   a user managing means that manages user IDs and receives place information of a place where a user had an interest from a terminal of said user, or receives said place information and range conditions that include at least one of a distance, a route, time, and a fare from a place or said place, and identifies said user and attaches a user ID to said received information;
   a map information retrieving means to which said place information or said place information and said range conditions are inputted, and extracts at least one of facility information and place information relating to said place information under said range conditions or a range condition from a map database that has facility names and road information connecting and relating to said facility names with coordinate information on a map; and
   a document database retrieving means that receives said facility information and/or said place information extracted from said map information retrieving means, and retrieves a document to be delivered to said user from a document database that has documents by making said received information as keywords.

4. An information delivery server in accordance with claim 1, further comprising:
   a range condition rule database that stores said range conditions including at least one of a distance, a route, time, and a fare from a place in a rule format; and wherein:
   said map information retrieving means, comprising:
   a place condition analyzing means;
   one or more range calculating means; and
   a map range retrieving means, and wherein:
   said place condition analyzing means classifies said inputted range conditions by referring to range condition rules storing in said range condition rule database,
   said one or more range calculating means calculates a range by receiving said classified range conditions, and
   said map range retrieving means retrieves said document by using said calculated results from at least one of said one or more range calculating means.

5. An information delivery server in accordance with claim 2, further comprising:
   a range condition rule database that stores said range conditions including at least one of a distance, a route, time, and a fare from a place in a rule format; and wherein:
   said map information retrieving means, comprising:
   a place condition analyzing means;
   one or more range calculating means; and
   a map range retrieving means, and wherein:
   said place condition analyzing means classifies said inputted range conditions by referring to range condition rules storing in said range condition rule database,
   said one or more range calculating means calculates a range by receiving said classified range conditions, and
   said map range retrieving means retrieves said document by using said calculated results from at least one of said one or more range calculating means.

6. An information delivery server in accordance with claim 3, further comprising:
   a range condition rule database that stores said range conditions including at least one of a distance, a route, time, and a fare from a place in a rule format; and wherein:
   said map information retrieving means, comprising:
   a place condition analyzing means;
   one or more range calculating means; and
   a map range retrieving means, and wherein:
   said place condition analyzing means classifies said inputted range conditions by referring to range condition rules storing in said range condition rule database,
   said one or more range calculating means calculates a range by receiving said classified range conditions, and
   said map range retrieving means retrieves said document by using said calculated results from at least one of said one or more range calculating means.

7. An information delivery server in accordance with claim 4, wherein:
   said one or more range calculating means, comprising:
   a distance in a straight line range calculating means that calculates a range within a radius of a designated length by making a place designated by said place information as a center, by receiving said place information and said range condition from said place condition analyzing means, in case that a distance in a straight line is designated as said range condition;

a route range calculating means that calculates a range along a designated route, by receiving said place information and said range condition from said place condition analyzing means, in case that a route is designated as said range condition; and a reaching possibility range calculating means that calculates a reaching possible range under said received range condition, by receiving said place information and said range condition from said place condition analyzing means, in case that a reaching possible range is designated as said range condition; and wherein at least one or more said one or more range calculating means is chosen by said place condition analyzing means under the received range conditions.

8. An information delivery server in accordance with claim 5, wherein:

said one or more range calculating means, comprising:

a distance in a straight line range calculating means that calculates a range within a radius of a designated length by making a place designated by said place information as a center, by receiving said place information and said range condition from said place condition analyzing means, in case that a distance in a straight line is designated as said range condition;

a route range calculating means that calculates a range along a designated route, by receiving said place information and said range condition from said place condition analyzing means, in case that a route is designated as said range condition; and a reaching possibility range calculating means that calculates a reaching possible range under said received range condition, by receiving said place information and said range condition from said place condition analyzing means, in case that a reaching possible range is designated as said range condition; and wherein at least one or more said one or more range calculating means is chosen by said place condition analyzing means under the received range conditions.

9. An information delivery server in accordance with claim 6, wherein:

said one or more range calculating means, comprising:

a distance in a straight line range calculating means that calculates a range within a radius of a designated length by making a place designated by said place information as a center, by receiving said place information and said range condition from said place condition analyzing means, in case that a distance in a straight line is designated as said range condition;

a route range calculating means that calculates a range along a designated route, by receiving said place information and said range condition from said place condition analyzing means, in case that a route is designated as said range condition; and a reaching possibility range calculating means that calculates a reaching possible range under said received range condition, by receiving said place information and said range condition from said place condition analyzing means, in case that a reaching possible range is designated as said range condition; and wherein at least one or more said one or more range calculating means is chosen by said place condition analyzing means under the received range conditions.

10. An information delivery server in accordance with claim 1, further comprising:

a document informing means that informs said user about said document retrieved at said document database retrieving means.

11. An information delivery server in accordance with claim 2, further comprising:

a document informing means that informs said user about said document retrieved at said document database retrieving means.

12. An information delivery server in accordance with claim 3, further comprising:

a document informing means that informs said user about said document retrieved at said document database retrieving means.

13. A client, comprising:

a place condition inputting means to which a user inputs place information of a place where said user had an interest, or inputs said place information and range conditions including at least one of a distance, a route, time, and a fare from said place or a place;

a document receiving means that receives a document retrieved at an information delivery server, by that said place condition inputting means inputs said place information and/or said range condition to said information delivery server, and makes said information delivery server extract at least one of facility information and place information from a map database that has facility names and roads connecting and relating to said facility names with coordinate information on a map by using said place information and said range condition, and makes the information delivery server retrieve said document by making said extracted facility information and place information as keywords; and a displaying means that displays said received document.

14. A client, comprising:

a place condition inputting means to which a user inputs place information of a place where said user had an interest, or inputs said place information and range conditions including at least one of a distance, a route, time, and a fare from said place or a place;

a user interested place database that stores said place information and said range conditions inputted at said place condition inputting means;

a document receiving means that receives a document transmitted from an information delivery server, by that said place condition inputting means inputs said place information and/or said range condition to said information delivery server, and makes said information delivery server extract at least one of facility information and place information from a map database that has facility names and roads connecting and relating to said facility names with coordinate information on a map by using said place information and said range condition, and makes the information delivery server retrieve said document by making said extracted facility information and place information as keywords, and makes said information delivery server transmit said retrieved document; and a displaying means that displays said received document.

15. An information delivery method, comprising the steps of:

inputting place information having position information and range conditions that include at least one of a distance, a route, time, and a fare from a place or a place of said position information;

extracting at least one of facility information and place information relating to said position information under said range conditions from a map database that has facility names and road information connecting and relating to said facility names with coordinate information on a map;

receiving extracted said facility information and/or said place information; and retrieving a document to be delivered to said user from a document database that has documents by making said received information as keywords.

16. A storing medium stored programs to make a server execute information delivery, wherein:

said programs, comprising the steps of:

receiving place information having position information and range conditions that include at least one of a distance, a route, time, and a fare from a place or a place of said position information from a client;

extracting at least one of facility information and place information relating to said position information under said range conditions from a map database that has facility names and road information connecting and relating to said facility names with coordinate information on a map;

receiving extracted said facility information and/or said place information;

retrieving a document to be delivered to said client from a document database that has documents by making said received information as keywords; and sending said retrieved document to said client.

17. A storing medium stored programs to make a client execute information inputting and information receiving, wherein:

said programs comprising the steps of:

inputting place information of a place where a user had an interest and range conditions that include at least one of a distance, a route, time, and a fare from a place or said place;

outputting said place information and said range conditions to an information delivery server;

making said information delivery server extract at least one of facility information and place information relating to said place information under said range conditions from a map database that has facility names and road information connecting and relating to said facility names with coordinate information on a map;

making said information delivery server retrieve a document to be delivered to said user from a document database that has documents by making said extracted information as keywords;

making said information delivery server transmit said retrieved document to said client;

receiving said document; and displaying said document on said user.

18. An information delivery server, comprising:

a map information retrieving means that obtains a virtual or actual position of a user at real time, and shows range conditions that include at least one of a distance, a route, time, and a fare from a place or the place of said virtual or actual position of said user to a terminal of said user, and receives range conditions designated by said terminal, and decides a range on a map under said designated range conditions, and extracts at least one of facility names and place names matching with said range conditions from a map database that has facility names and road information connecting and relating to said facility names with coordinate information on a map; and a document database retrieving means that receives said facility names and/or said place names extracted from said map information retrieving means, and retrieves a document to be delivered to said user from a document database that has documents by making said received names as keywords.

19. An information delivery server, comprising:

a user managing means that manages user IDs and receives place information of a virtual or actual place of a user at real time and identifies said user and attaches a user ID to said place information, and sends said place information and said user ID;

a user position memorizing means that receives said place information and said user ID from said user managing means and memorizes them;

a range condition rule database that has range conditions that include at least one of a distance, a route, time, and a fare from a place in a rule format;

a map information retrieving means that obtains said place information of said user from said user position memorizing means, and shows said range conditions to a terminal of said user by referring to said range condition rules from said range condition rule database, and receives said range conditions designated by said terminal at real time, and decides a range on a map under said designated range conditions by referring to said range condition rule database, and extracts at least one of facility names and place names matching with said range conditions from a map database that has facility names and road information connecting and relating to said facility names with coordinate information on said map; and a document database retrieving means that receives said facility names and/or said place names extracted from said map information retrieving means, and retrieves a document to be delivered to said user from a document database that has documents by making said received names as keywords.

20. An information delivery server, comprising:

a user managing means that manages user IDs and receives place information of a virtual or actual place of a user at real time and identifies said user and attaches a user ID to said place information, and sends said place information and said user ID;

a range condition rule database that has range conditions that include at least one of a distance, a route, time, and a fare from a place in a rule format;

a map information retrieving means that obtains said place information of said user from said user managing means, and shows said range conditions to a terminal of said user by referring to said range condition rules from said range condition rule database, and receives said range conditions designated by said terminal at real time, and decides a range on a map under said designated range conditions by referring to said range condition rule database, and extracts at least one of facility names and place names matching with said range conditions from a map database that has facility names and road information connecting and relating to said facility names with coordinate information on said map; and a document database retrieving means that receives said facility names and/or said place names extracted from said map information retrieving means, and retrieves a document to be delivered to said user from a document database that has documents by making said received names as keywords.

21. An information delivery server in accordance with claim 18, further comprising:
a document informing means that informs said user about said document retrieved at said document database retrieving means.

22. An information delivery server in accordance with claim 19, further comprising:
a document informing means that informs said user about said document retrieved at said document database retrieving means.

23. An information delivery server in accordance with claim 20, further comprising:
a document informing means that informs said user about said document retrieved at said document database retrieving means.

24. A client, comprising:
a place obtaining means that obtains place information of a virtual or actual place of a user at real time;
a range condition designating means that designates the present position of said user at real time by using said place information of said user by making range conditions that set a distance, a route, time, and a fare from said place or a place renew for said present position;
a document receiving means that makes an information delivery server renew said place information of said user at real time, and makes said range conditions show at real time for the present position of said user by using said place information of said user, and makes said range conditions output, and makes said information delivery server extract at least one of facility information and place information from a map database that has facility names and roads connecting and relating to said facility names with coordinate information on a map by using said place information and said range condition, and makes the information delivery server retrieve a document to be delivered to said user by making said extracted facility information and place information as keywords from a document database that has documents, and receives said retrieved document from said information delivery server; and
a displaying means that displays said received document.

25. A client, comprising:
a place obtaining means that obtains place information of a virtual or actual place of a user at real time;
a user position memorizing means that memorizes said place information that is renewed at real time at said place obtaining means;
a document receiving means that makes an information delivery server renew said place information of said user at real time, and makes said range conditions show at real time for the present position of said user by using said place information of said user, and makes said range conditions output, and makes said information delivery server extract at least one of facility information and place information from a map database that has facility names and roads connecting and relating to said facility names with coordinate information on a map by using said place information and said range condition, and makes the information delivery server retrieve a document to be delivered to said user by making said extracted facility information and place information as keywords from a document database that has documents, and receives said retrieved document from said information delivery server; and
a displaying means that displays said received document.

26. An information delivery method, comprising the steps of:
obtaining place information of a virtual or actual place of a user at real time;
showing range condition rules that include at least one of a distance, a route, time, and a fare from a place to said user;
inputting said range condition rules designated by said user;
memorizing the position of said user;
informing the position of said user every time when said position of said user is renewed;
retrieving a range on a map from a map database by receiving said informed position of said user and said inputted range condition;
obtaining keywords from said map database;
retrieving a document to be delivered to said user from a document database by using said obtained keywords;
informing said document retrieved from said document database;
receiving said document; and
displaying said document to said user.

27. A storing medium stored programs to make a server execute information delivery, wherein:
said programs, comprising the steps of:
obtaining place information of a virtual or actual place of a user at real time;
showing range condition rules that include at least one of a distance, a route, time, and a fare from a place to a terminal of said user;
receiving range conditions designated by said terminal;
deciding a range on a map under said range conditions;
retrieving at least one of facility names and place names that matches with said range conditions from a map database that has facility names and roads connecting and relating to said facility names with coordinate information on a map;
receiving at least one of said facility names and said place names; and
retrieving a document to be delivered to said user from a document database that has documents by making said received names as keywords.

28. A storing medium stored programs to make a client execute information inputting and information receiving, wherein:
said programs, comprising the steps of:
obtaining place information of a virtual or actual place of a user at real time;
making range condition rules that includes a distance, a route, time, and a fare from a place show;
designating at least one of said range conditions at real time for said virtual or actual place of the present position of said user;
making an information delivery sever renew said place information of said user at real time, and show said range conditions at real time for said present position of said user by using said place information of said user, and output said range conditions;
making said information delivery server retrieve at least one of facility information and place information that matches with said range conditions from a map database that has facility names and roads connecting and relating to said facility names with coordinate information on a map;
making said information delivery server retrieve a document to be delivered to said user from a document database that has documents by making said facility information or said place information as keywords;

making said information delivery server send said retrieved document;

receiving said document; and displaying said document at said terminal of said user.

29. An information delivery server, comprising:

a user interested place database that stores place information of users with user IDs of said users;

a document registering place index that stores a registering delivery place of a document registered from a terminal of an information supplier with a document ID of said document;

a document delivery condition database that stores a document delivery condition that is a range condition under which said document is delivered in a range and is one of range conditions that include a distance, a route, time, and a fare from a place inputted from said terminal with said document ID;

a map and user retrieving means that retrieves said registering delivery place from said document registering place index, and obtains said document delivery condition of said document corresponding to said document ID from said document delivering condition database, and decides a range where said document is delivered from said registering delivery place and document delivery condition, and retrieves a map database that has facility names and road information connecting and relating to said facility names with coordinate information on a map, and said user interested place database, under said range condition, and obtains a list of user IDs of users who have registered within a range that matches with said range condition, and outputs said list of said user IDs with said document ID; and a document database retrieving means that receives said list of said user IDs with said document ID from said map and user retrieving means, and retrieves a document to be delivered to said users in said list of said user IDs from a document database that has documents by using said document ID.

30. An information delivery server, comprising:

a user managing means that manages user IDs and receives place information having position information of a place from a terminal of a user, and identifies said user and attaches a user ID to said received information;

a user interested place database that stores said place information with said user ID by receiving from said user managing means;

a document registering place index that stores a registering delivery place of a document registered from a terminal of an information supplier with a document ID of said document;

a map and user retrieving means that outputs a document delivery condition that is a range condition under which said document is delivered in a range and is one of range conditions that include a distance, a route, time, and a fare from a place inputted from said terminal of said information supplier with said document ID, and retrieves a map database and obtains a list of user IDs of users who have registered within a range that matches with said range condition, and outputs said list of said user IDs with said document ID;

a document database retrieving means that receives said list of said user IDs with said document ID from said map and user retrieving means, and retrieves a document to be delivered to said users in said list of said user IDs from a document database that has documents by using said document ID; and a document informing means that informs said users in said list of said user IDs about said document retrieved at said document database retrieving means.

31. An information delivery server in accordance with claim 25, further comprising:

a range condition rule database that stores said range conditions including a distance, a route, time, and a fare from a place in a rule format;

a place condition analyzing means that receives said registering delivery place with said document ID from said document registering place index and also receives said document delivery condition corresponding to said document ID from said document delivery condition database, and classifies said range conditions by referring to range condition rules storing in said range condition rule database, a distance in a straight line range calculating means that calculates a range within a radius of a designated length by making a place designated by said place information as a center, by receiving said place information and said range condition from said place condition analyzing means, in case that a distance in a straight line is designated as said range condition;

a route range calculating means that calculates a range along a designated route, by receiving said place information and said range condition from said place condition analyzing means, in case that a route is designated as said range condition;

a reaching possibility range calculating means that calculates a reaching possible range under said received range condition, by receiving said place information and said range condition from said place condition analyzing means, in case that a reaching possible range is designated as said range condition;

a user within range retrieving means that receives at least one of said calculated results at said distance in a straight line range calculating means, said route range calculating means, and said reaching possibility range calculating means, and also receives said range condition designated by said terminal of said information supplier, and obtains a list of user IDs of users who have registered in said range from said map database and said user interested place database, and sends said list of said user IDs and said document ID to said document database retrieving means.

32. A client being an information supplier, comprising:

an inputting means from which an information supplier inputs a document that is delivered to users in an information delivery server; wherein:

said information supplier further inputs a registering delivery place where said document is delivered and a delivery condition under which said document is delivered from said inputting means to said information delivery server, and said information delivery server delivers said document to said users who matched with said registering delivery place and said delivery condition.

33. A client, comprising:

a place condition inputting means to which a user inputs place information of a place where said user had an interest, or inputs said place information and range conditions including at least one of a distance, a route, time, and a fare from said place or a place;

a user interested place database that stores said place information and said range conditions inputted at said place condition inputting means;

a document receiving means that receives a document transmitted from an information delivery server, by that said place condition inputting means inputs said place information and said range condition to said information delivery server, and makes said information delivery server decide obtain a document delivery condition corresponding to a document ID, and makes said information delivery server decide a range where said document is delivered by a document registering delivery place and a document delivery condition, and makes said information delivery server retrieve a map database that has facility names and roads connecting and relating to said facility names with coordinate information on a map and said user interested place database under said range condition, and makes said information delivery server obtain a list of user IDs that match with said conditions and a document from a document database, and makes said information delivery server transmit said retrieved document with said list of said user IDs; and a displaying means that displays said received document.

34. A client being an information supplier, comprising:
an inputting means from which an information supplier inputs a document that is delivered to users in an information delivery server; wherein:
said client makes said information delivery server store said document with a document ID and a registering delivery place, and makes said information delivery server retrieve said document under a document delivery condition and obtains a list of user IDs that match with said document deliver condition, and makes said information delivery server send said document to said list of said user IDs.

35. An information delivery method, comprising the steps of:
obtaining place information of a virtual or actual place of a user at real time;
showing range condition rules that include at least one of a distance, a route, time, and a fare from a place;
inputting said range condition rules designated by said user;
memorizing the position of said user;
informing the position of said user every time when said position of said user is renewed;
retrieving a range on a map from a map database by receiving said informed position of said user and said inputted range condition;
obtaining keywords from said map database;
retrieving a document to be delivered to said user from a document database by using said obtained keywords;
informing said document retrieved from said document database;
receiving said document; and
displaying said document to said user.

36. A storing medium stored programs to make a client execute information inputting and information receiving, wherein:
said programs, comprising the steps of:
inputting place information of a place where a user had an interest or said place information and range conditions that include at least one of a distance, a route, time, and a fair from said place or a place;
outputting said place information and said range conditions to an information delivery server;

making said information delivery server obtain a document delivery condition corresponding to a document ID;
making said information delivery sever decide a range where a document is delivered from a document registering delivery place and said document delivery condition;
making said information delivery server retrieve a map database that has facility names and roads connecting and relating to said facility names with coordinate information on a map and a user interested place database, under said conditions;
making said information delivery server obtain a list of user IDs that have been registered in a range that matches with said conditions and a document that matches with said condition;
making said information delivery server send said obtained document;
receiving said document; and
displaying said document at said terminal of said user.

37. A storing medium stored programs to make a client being an information supplier execute information registering and information delivering, wherein:
said programs, comprising the steps of:
registering a document that is delivered to users in an information delivery server;
making said information delivery server store said document with a document ID and a registering delivery place;
making said information delivery server retrieve said document under a document delivery condition;
making said information delivery server obtain a list of user IDs that match with said document deliver condition; and
making said information delivery server send said document to said list of said user IDs.

38. A storing medium stored programs to make a server execute information delivery, wherein:
said programs, comprising the steps of:
storing place information of users with user IDs in a user interested place database;
storing a registering delivery place of a document registered from a terminal of an information supplier with a document ID of said document in a document registering place index;
storing a document delivery condition that is a range condition under which said document is delivered in a range and is one of range conditions that include a distance, a route, time, and a fare from a place inputted from said terminal with said document ID in a document delivery condition database;
retrieving said registering delivery place from said document registering place index;
obtaining said document delivery condition of said document corresponding to said document ID from said document delivering condition database;
deciding a range where said document is delivered from said registering delivery place and document delivery condition;
retrieving a map database that has facility names and road information connecting and relating to said facility names with coordinate information on a map, and said user interested place database, under said range condition;
obtaining a list of user IDs of users who have registered within a range that matches with said range condition;

retrieving a document to be delivered to said users in said list of said user IDs from a document database that has documents by using said document ID.

39. An information delivery server, comprising:

a place condition obtaining means that obtains place information of a virtual or actual place of a user at real time;

a user position memorizing means that receives said place information of said virtual or actual place of said user from said place condition obtaining means and memorizes them;

a document registering place index that stores a registering delivery place of a document registered from a document registering means of a terminal of an information supplier with a document ID of said document;

a document delivery condition database that stores a document delivery condition that is a range condition under which said document is delivered in a range and is one of range conditions that include a distance, a route, time, and a fare from a place inputted from said terminal with said document ID;

a map and user retrieving means that obtains said registering delivery place from said document registering place index, and also obtains said document delivery condition of said document corresponding to said document ID from said document delivering condition database, and decides a range where said document is delivered from said registering delivery place and document delivery condition, and retrieves a map database that has facility names and road information connecting and relating to said facility names with coordinate information on a map, and said user position memorizing means, under said range condition, and obtains a list of user IDs of users who have registered within a range that matches with said range condition, and outputs said list of said user IDs with said document ID;

a document database retrieving means that receives said list of said user IDs with said document ID from said map and user retrieving means, and retrieves a document to be delivered to said users in said list of said user IDs from a document database that has documents by using said document ID;

a document informing means that receives said document from said document database retrieving means and informs said users in said list of said user IDs about said document;

an informing user managing means that manages said document ID of said document, which is informed to said users from said document informing means, and said user IDs, and informs a document deleting means about said document ID so that said document deleting means deletes said document of said document ID when the number of users whom said document was delivered exceeded a number designated by said document registering means; and said document deleting means that receives said document ID of said document whose delivered number of users exceeded said designated number (an upper limit), and deletes said document delivery condition and said document registering place index corresponding to said received document ID from document delivery condition database and said document registering place index.

40. An information delivery server, comprising:

a user managing means that manages user IDs and identifies a user and attaches the user ID of said user to place information of a virtual or actual place of a user obtained from a first terminal at real time;

a user position memorizing means that receives said place information and said user ID of said user from said user managing means and memorizes them;

a document registering place index that stores a registering delivery place of a document registered from a document registering means of a second terminal with a document ID of said document;

a document delivery condition database that stores a document delivery condition that is a range condition under which said document is delivered in a range and is one of range conditions that include a distance, a route, time, and a fare from a place inputted from said second terminal with said document ID;

a map and user retrieving means that obtains said registering delivery place from said document registering place index, and also obtains said document delivery condition of said document corresponding to said document ID from said document delivering condition database, and decides a range where said document is delivered from said registering delivery place and document delivery condition, and retrieves a map database that has facility names and road information connecting and relating to said facility names with coordinate information on a map, and said position memorizing means, under said range condition, and obtains a list of user IDs of users who have registered within a range that matches with said range condition, and outputs said list of said user IDs with said document ID;

a document database retrieving means that receives said list of said user IDs with said document ID from said map and user retrieving means, and retrieves a document to be delivered to said users in said list of said user IDs from a document database that has documents by using said document ID;

a document informing means that receives said document from said document database retrieving means and informs said users in said list of said user IDs about said document;

an informing user managing means that manages said document ID of said document, which is informed to said users from said document informing means, and said user IDs, and informs a document deleting means about said document ID so that said document deleting means deletes said document of said document ID when the number of users whom said document was delivered exceeded a number designated by said document registering means; and said document deleting means that receives said document ID of said document whose delivered number of users exceeded said designated number (an upper limit), and deletes said document delivery condition and said document registering place index corresponding to said received document ID from document delivery condition database and said document registering place index.

41. An information delivery server, comprising:

a user position memorizing means that memorizes place information of a virtual or actual place of a user with a user ID of said user;

a document registering place index that stores a registering delivery place of a document registered from a document registering means of a second terminal with a document ID of said document;

a document delivery condition database that stores a document delivery condition that is a range condition under which said document is delivered in a range and is one of range conditions that include a distance, a route, time, and a fare from a place inputted from said second terminal with said document ID;

a map and user retrieving means that obtains said registering delivery place from said document registering place index, and also obtains said document delivery condition of said document corresponding to said document ID from said document delivering condition database, and decides a range where said document is delivered from said registering delivery place and document delivery condition, and retrieves a map database that has facility names and road information connecting and relating to said facility names with coordinate information on a map, and said user position memorizing means, under said range condition, and obtains a list of user IDs of users who have registered within a range that matches with said range condition, and outputs said list of said user IDs with said document ID;

a document database retrieving means that receives said list of said user IDs with said document ID from said map and user retrieving means, and retrieves a document to be delivered to said users in said list of said user IDs from a document database that has documents by using said document ID; and an informing user managing means that manages said document ID of said document that is informed to said users and said user IDs of users whom said document is delivered, and does not instruct to deliver said document when the number of users whom said document was delivered exceeded a number designated by said document registering means.

42. An information delivery server, comprising:

a user managing means that manages user IDs and identifies a user and attaches the user ID of said user to place information of a virtual or actual place of said user obtained from a first terminal at real time;

a user position memorizing means that receives said place information and said user ID of said user from said user managing means and memorizes them;

a document registering place index that stores a registering delivery place of a document registered from a document registering means of a second terminal with a document ID of said document;

a document delivery condition database that stores a document delivery condition that is a range condition under which said document is delivered in a range and is one of range conditions that include a distance, a route, time, and a fare from a place inputted from said second terminal with said document ID;

a map and user retrieving means that obtains said registering delivery place from said document registering place index, and also obtains said document delivery condition of said document corresponding to said document ID from said document delivering condition database, and decides a range where said document is delivered from said registering delivery place and document delivery condition, and retrieves a map database that has facility names and road information connecting and relating to said facility names with coordinate information on a map, and said user position memorizing means, under said range condition, and obtains a list of user IDs of users who have registered within a range that matches with said range condition, and outputs said list of said user IDs with said document ID;

a document database retrieving means that receives said list of said user IDs with said document ID from said map and user retrieving means, and retrieves a document to be delivered to said users in said list of said user IDs from a document database that has documents by using said document ID;

an informing user managing means that manages said document ID of said document that is informed to said users and said user IDs of users whom said document is delivered, and does not instruct to deliver said document when the number of users whom said document was delivered exceeded a number designated by said document registering means; and a document informing means that informs said users in said list of said user IDs about said document by an instruction from said informing user managing means.

43. A client, comprising:

a place condition obtaining means that obtains place information of a virtual or actual place of a user at real time;

a receiving means that receives a document from an information delivery server, by making said information deliver server register a document to be delivered to said user by attaching a document registering place index and a document delivery condition, and store said place information that is renewed from said place obtaining means at real time, and extract at least one of facility names and place names from a map database that has facility names and road information connecting and relating to said facility names with coordinate information on a map, by using said place information and said document delivery condition, and retrieve a document to be delivered to said user from a document database that has document by making said extracted facility names or place names as keywords, and confirms whether said document has its upper limit delivery number or not, and delete said document, said document registering place, and said document delivery condition of said document, when the delivered number of said document exceeded said upper limit, and send said document when the delivered number of said document did not exceed said upper limit; and a displaying means that receives said document and displays said document.

44. A client, comprising:

a place condition obtaining means that obtains place information of a virtual or actual place of a user at real time;

a receiving means that receives a document from an information delivery server, by making an information deliver server register a document to be delivered to said user by attaching a document registering place index and a document delivery condition, and store said place information that is renewed from said place obtaining means at real time, and extract at least one of facility names and place names from a map database that has facility names and road information connecting and relating to said facility names with coordinate information on a map, by using said place information and said document delivery condition, and retrieve a document to be delivered to said user from a document database that has document by making said extracted facility names or place names as keywords, and confirm whether said document has its upper limit delivery number or not, and instruct not to deliver said document when the delivered number of said document exceeded said upper limit, and instruct to send said document when the delivered number of said document did not exceed said upper limit; and a displaying means that receives said document and displays said document.

45. A client being an information supplier, comprising:

an inputting means from which an information supplier inputs a document that is delivered to users in an information delivery server; wherein:

said information supplier further inputs a registering delivery place where said document is delivered and a document delivery condition under which said document is delivered to said information delivery server from said inputting means, and makes said information delivery server deliver said document to said users under conditions of said registering delivery place and said document delivery condition.

46. A client being an information supplier, comprising:

an inputting means from which an information supplier inputs a document that is delivered to users in an information delivery server; wherein:

said information supplier further inputs a registering delivery place where said document is delivered and a document delivery condition under which said document is delivered to said information delivery server from said inputting means, and makes said information delivery server deliver said document to said users under conditions of said registering delivery place and said document delivery condition, and further inputs an upper limit of delivering number of said document as a document delivery condition to said information delivery server from said inputting means, and when the delivered number of said document exceeded said upper limit, makes said information delivery server stop delivering said document and delete said registering delivery place and said document delivery condition of said document, and when the delivered number of said document did not exceed said upper limit, makes said information delivery server deliver said document.

47. A client being an information supplier, comprising:

an inputting means from which an information supplier inputs a document that is delivered to users in an information delivery server; wherein:

said information supplier further inputs a registering delivery place where said document is delivered and a document delivery condition under which said document is delivered to said information delivery server from said inputting means, and makes said information delivery server deliver said document to said users under conditions of said registering delivery place and said document delivery condition, and further inputs an upper limit of delivering number of said document as a document delivery condition to said information delivery server from said inputting means, and when the delivered number of said document exceeded said upper limit, makes said information delivery server stop delivering said document, and when the delivered number of said document did not exceed said upper limit, makes said information delivery server continue to deliver said document.

48. An information delivery method, comprising the steps of:

registering a document that a second client wants to deliver to users in a document database;

registering a registering delivery place where said document is delivered in a document registering place index from said second client, and storing them with a document ID;

registering a document deliver condition under which said document is delivered to users in a document delivery condition database from said second client, and storing them with said document ID;

judging whether said document has an upper limit of delivering number as one of said document delivery condition or not;

informing said upper limit of delivering number of said document and said document ID, when said upper limit of delivering number exists;

attaching a user ID to the present position of user and memorizing said present position of said user;

informing the present position of said user when said present position of said user is renewed;

obtaining said document delivery condition every document ID from said document delivery condition database;

obtaining said registering delivery place every document ID from said document registering place index;

obtaining a list of user IDs of users under conditions of the present position of users, said registering delivery place, and said document delivery condition;

obtaining a document to be delivered to said users in said list of said user IDs by retrieving said document database by using said document ID and said list of said user IDs;

sending said document, said document ID, and said list of said user IDs;

delivering said document to said users in said list of said user IDs;

judging whether the delivered number of said document exceeded said upper limit or not in case that said document has said upper limit;

stopping delivering said document and deleting said document delivery condition and said registering delivery place from respective said document delivery condition database and said document registering place index when the delivered number of said document exceeded said upper limit; and continuing delivering said document when the delivered number of said document did not exceed said upper limit.

49. An information delivery method, comprising the steps of:

registering a document that a second client wants to deliver to users in a document database;

registering a registering delivery place where said document is delivered in a document registering place index from said second client, and storing them with a document ID;

registering a document deliver condition under which said document is delivered to users in a document delivery condition database from said second client, and storing them with said document ID;

judging whether said document has an upper limit of delivering number as one of said document delivery condition or not;

informing said upper limit of delivering number of said document and said document ID, when said upper limit of delivering number exists;

attaching a user ID to the present position of user and memorizing said present position of said user;

informing the present position of said user when said present position of said user is renewed;

obtaining said document delivery condition every document ID from said document delivery condition database;

obtaining said registering delivery place every document ID from said document registering place index;

obtaining a list of user IDs of users under conditions of the present position of users, said registering delivery place, and said document delivery condition;

obtaining a document to be delivered to said users in said list of said user IDs by retrieving said document database by using said document ID and said list of said user IDs;

sending said document, said document ID, and said list of said user IDs;

delivering said document to said users in said list of said user IDs;

counting the number of users whom said document was delivered every document ID;

judging whether the delivered number of said document exceeded said upper limit or not by said counted result; and stopping delivering said document when said counted number exceeded said upper limit, and continuing delivering said document when said counted number did not exceed said upper limit.

50. An information delivery method, comprising the steps of:

registering a document that a second client wants to deliver to a first client in a document database;

registering a registering delivery place where said document is delivered and a document delivery condition under which said document is delivered to said first client in a server from said second client;

attaching a document ID to said registering delivery place and said document delivery condition by said server;

judging whether said document has an upper limit of delivering number as one of said document delivery condition or not by said server;

informing said upper limit of delivering number of said document and said document ID, when said upper limit of delivering number exists;

receiving the present position of said first client from said first client, and attaching a user ID to said present position of said first client, and memorizing said present position of said first client with said user ID by said server;

receiving said present position of said first client every time when said present position of said first client was renewed by said server;

obtaining said registering delivery place and said document delivery condition every document ID by said server;

obtaining a document that matches with said present position of said first client, said registering delivery place, and said document delivery condition, from said document database by said server;

informing said first client about said obtained document by said server;

counting the number of users being said first client whom said document was delivered by said server;

stopping delivering said document to said users being said first client when said counted number reached said upper limit of delivering number by said server; and continuing delivering said document to said users being said first client when said counted number did not reach said upper limit of delivering number by said server.

51. An information delivery method, comprising the steps of:

registering a document that a second client wants to deliver to a first client in a document database;

registering a registering delivery place where said document is delivered and a document delivery condition under which said document is delivered to said first client in a server from said second client;

attaching a document ID to said registering delivery place and said document delivery condition by said server;

registering an upper limit of delivering numbers of said document with said document ID in said server from said second client;

receiving the present position of said first client from said first client, and attaching a user ID to said present position of said first client, and memorizing said present position of said first client with said user ID by said server;

receiving said present position of said first client every time when said present position of said first client was renewed by said server;

obtaining said registering delivery place and said document delivery condition every document ID by said server;

obtaining a list of user IDs of said first client being users that match with said present position of said first client, said registering delivery place, and said document delivery condition by said server;

obtaining a document that match with said present position of said first client, said registering delivery place, and said document delivery condition, from said document database by said server;

informing said users in said list of said user IDs being said first client about said obtained document by said server;

recording the number of user IDs of said users being said first client whom said document was delivered by said server;

judging whether said recorded number of user IDs reached said upper limit of delivering number at said sever;

stopping delivering said document to said users being said first client and deleting said registering delivery place and said document delivery condition when said recorded number reached said upper limit of delivering number by said server; and continuing delivering said document to said users being said first client when said recorded number did not reach said upper limit of delivering number by said server.

52. An information delivery method, comprising the steps of:

registering a document that a second client wants to deliver to a first client in a document database;

registering a registering delivery place where said document is delivered and a document delivery condition under which said document is delivered to said first client in a server from said second client;

attaching a document ID to said registering delivery place and said document delivery condition by said server;

registering an upper limit of delivering numbers of said document with said document ID in said server from said second client;

receiving the present position of said first client from said first client, and attaching a user ID to said present position of said first client, and memorizing said present position of said first client with said user ID by said server;

receiving said present position of said first client every time when said present position of said first client was renewed by said server;

obtaining said registering delivery place and said document delivery condition every document ID by said server;

obtaining a list of user IDs of said first client being users that match with said present position of said first client, said registering delivery place, and said document delivery condition by said server;

obtaining a document that match with said present position of said first client, said registering delivery place, and said document delivery condition, from said document database by said server;

informing said users in said list of said user IDs being said first client about said obtained document by said server;

counting the number of user IDs of said users being said first client whom said document was delivered by said server;

judging whether said counted number of user IDs reached said upper limit of delivering number at said sever;

stopping delivering said document to said users being said first client when said recorded number reached said upper limit of delivering number by said server; and continuing delivering said document to said users being said first client when said recorded number did not reach said upper limit of delivering number by said server.

53. A storing medium stored programs to make a server execute information delivery, wherein:

said programs, comprising the steps of:

memorizing place information of a virtual or actual place of each of users with each user ID in a user position memorizing means;

storing a registering delivery place, where a document is delivered, of said document inputted from a terminal, with a document ID in a document registering delivery place index;

storing a document delivery condition, which is a range condition, within said range said document is delivered, and is at least one of a distance, a route, time, a fare from a place where said terminal inputted, with said document ID in a document delivery condition database;

obtaining said registering delivery place with said document ID from said document registering delivery place index and also said document delivery condition with said document ID from said document delivery condition database;

retrieving a map database that has facility names and roads connecting and relating to said facility names with coordinate information on a map and said place information of said users memorizing in said user position memorizing means, under conditions of said obtained registering delivery place and said document delivery condition;

obtaining a list of user IDs of said users within a geographic range that match with said place information of said users, said registering delivery place, and said document delivery condition, and sending said obtained list of said user IDs with said document ID to a document database retrieving means;

retrieving a document that matches with said document ID from a document database that has documents to be delivered to said users at said document retrieving means, and sending said document to a document informing means with said list of said user IDs;

informing said users in said list of said user IDs about said retrieved document at said document informing means;

stopping delivering said document to said users when the delivered number of said document exceeded a predetermined upper limit at an informing user managing means that manages said user IDs and said document IDs; and deleting said registering delivery place and said document delivery condition of said document ID of said document whose delivered number exceeded said upper limit.

54. A storing medium stored programs to make a server execute information delivery, wherein:

said programs, comprising the steps of:

memorizing place information of a virtual or actual place of each of users with each user ID in a user position memorizing means;

storing a registering delivery place, where a document is delivered, of said document inputted from a terminal, with a document ID in a document registering delivery place index;

storing a document delivery condition, which is a range condition, within said range said document is delivered, and is at least one of a distance, a route, time, a fare from a place where said terminal inputted, with said document ID in a document delivery condition database;

obtaining said registering delivery place with said document ID from said document registering delivery place index and also said document delivery condition with said document ID from said document delivery condition database;

retrieving a map database that has facility names and roads connecting and relating to said facility names with coordinate information on a map and said place information of said users memorizing in said user position memorizing means, under conditions of said obtained registering delivery place and said document delivery condition;

obtaining a list of user IDs of said users within a geographic range that match with said place information of said users, said registering delivery place, and said document delivery condition, and sending said obtained list of said user IDs with said document ID to a document database retrieving means;

retrieving a document that matches with said document ID from a document database that has documents to be delivered to said users at said document database retrieving means, and sending said document to a document informing means with said list of said user IDs;

informing said users in said list of said user IDs about said retrieved document at said document informing means; and stopping delivering said document to said users when the delivered number of said document exceeded a predetermined upper limit at an informing user managing means that manages said user IDs and said document IDs.

55. A storing medium stored programs to make a client execute information inputting and information receiving, wherein:

said programs, comprising the steps of:
obtaining place information of a virtual or actual place of each of users at real time at said client;
making an information delivery server register a document that is delivered to said users with a registering delivery place where said document is delivered and a document delivery condition under which said document is delivered;
making said information delivery server memorize said place information that is renewed at real time from said place obtaining means;
making said information delivery server retrieve at least one of facility names and place names from a map database that has facility names and roads connecting and relating to said facility names with coordinate information on a map by using said registering delivery place and said document delivery condition;
making said information delivery server retrieve a document to be delivered to said users from a document database that has documents by making said facility names or said place names as keywords, and confirm whether said document has an upper limit of delivering number or not;
making said information delivery server send said retrieved document to said client;
receiving said document at said client;
displaying said document at said client; and
making said information delivery server stop informing said client about said document when the delivered number exceeded said upper limit, and delete said document and said registering delivery place and said document delivery condition.

56. A storing medium stored programs to make a client execute information inputting and information receiving, wherein:
said programs, comprising the steps of:
obtaining place information of a virtual or actual place of each of users at real time at said client;
making an information delivery server register a document that is delivered to said users with a registering delivery place where said document is delivered and a document delivery condition under which said document is delivered;
making said information delivery server memorize said place information that is renewed at real time from said place obtaining means;
making said information delivery server retrieve at least one of facility names and place names from a map database that has facility names and roads connecting and relating to said facility names with coordinate information on a map by using said registering delivery place and said document delivery condition;
making said information delivery server retrieve a document to be delivered to said users from a document database that has documents by making said facility names or said place names as keywords, and confirm whether said document has an upper limit of delivering number or not;
making said information delivery server send said retrieved document to said client;
receiving said document at said client;
displaying said document at said client; and
making said information delivery server stop informing said client about said document when the delivered number exceeded said upper limit.

57. A storing medium stored programs to make a client being an information supplier execute information registering and information delivering, wherein:
said programs, comprising the steps of:
registering a document that is delivered to users in an information delivery server;
registering a registering delivery place where said document is delivered and a document delivery condition under which said document is delivered in said information delivery server;
registering an upper limit of delivering number of said document in said information delivery server, if necessary;
making said information delivery server deliver said document to said users under conditions of said registering delivery place and said document delivery condition; and
making said information delivery server stop delivering said document to said users when the delivered number of said document exceeded said upper limit, delete said document, said registering delivery place, and said document delivery condition.

58. A storing medium stored programs to make a client being an information supplier execute information registering and information delivering, wherein:
said programs, comprising the steps of:
registering a document that is delivered to users in an information delivery server;
registering a registering delivery place where said document is delivered and a document delivery condition under which said document is delivered in said information delivery server;
registering an upper limit of delivering number of said document in said information delivery server, if necessary;
making said information delivery server deliver said document to said users under conditions of said registering delivery place and said document delivery condition; and
making said information delivery server stop delivering said document to said users when the delivered number of said document exceeded said upper limit.

* * * * *